US008280822B2

(12) United States Patent  
McKeown et al.

(10) Patent No.: US 8,280,822 B2  
(45) Date of Patent: Oct. 2, 2012

(54) PERFORMANCE DRIVEN COMPENSATION FOR ENTERPRISE-LEVEL HUMAN CAPITAL MANAGEMENT

(75) Inventors: Robert C McKeown, Holliston, MA (US); David B Turetsky, Ashland, MA (US); Timothy Downey, Leominster, MA (US); John Erb, Sudbury, MA (US)

(73) Assignee: ADP Workscape, Inc., Marlborough, MA (US)

( * ) Notice: Subject to any disclaimer, the term of this patent is extended or adjusted under 35 U.S.C. 154(b) by 339 days.

(21) Appl. No.: 12/579,966

(22) Filed: Oct. 15, 2009

(65) Prior Publication Data

US 2010/0100427 A1  Apr. 22, 2010

Related U.S. Application Data

(60) Provisional application No. 61/105,593, filed on Oct. 15, 2008, provisional application No. 61/105,615, filed on Oct. 15, 2008.

(51) Int. Cl.  
*G06Q 10/00* (2012.01)

(52) U.S. Cl. ........................................ 705/320; 705/1.1

(58) Field of Classification Search ........................ None  
See application file for complete search history.

(56) References Cited

U.S. PATENT DOCUMENTS

| | | | |
|---|---|---|---|
| 7,069,229 | B1 | 6/2006 | Richardson et al. |
| 7,113,933 | B1 | 9/2006 | Imholte |
| 2004/0254939 | A1 | 12/2004 | Dettinger et al. |
| 2005/0273350 | A1 | 12/2005 | Scarborough et al. |
| 2008/0193100 | A1 | 8/2008 | Baum et al. |

OTHER PUBLICATIONS

"International Application Serial No. PCT/US2009/060839 , Search Report and Written Opinion mailed Feb. 1, 2010", , 15 Pgs.

*Primary Examiner* — Jonathan Ouellette  
(74) *Attorney, Agent, or Firm* — GTC Law Group LLP & Affiliates

(57) ABSTRACT

In embodiments of the present invention improved capabilities are described for a human resource management platform that includes applications targeted to solve a variety of human resource, compensation, and performance management problems. Applications of the human resource management platform include business applications such as performance driven compensation that may provide a single solution for driving employee performance and organizational success by automation of goal setting, performance measurement, and employee rewards by directly linking performance results to rewards.

20 Claims, 33 Drawing Sheets

FIG. 2

| | | | | | |
|---|---|---|---|---|---|
| 202 — PRESENTATION | HTML | FLEX | JASPER REPORTS | PDF | |
| | | USER INTERFACE | | | |
| | ANALYTICS | GUIDELINES | HELP | WIZARDS | |
| | COMPENSATION | EMPLOYEE PROFILE | | ELIGIBILITY AND ENROLLMENT | |
| | PERFORMANCE | | | VENDOR MANAGEMENT | |
| | SUCCESSION | ADMINISTRATION TOOLS | | COBRA ADMIN | |
| 204 — BUSINESS LOGIC | MARKET DATA | | | FSA / HAS | |
| | COMPETENCIES | DOMAIN MODEL | | DB / DC | |
| | OTHER TMS | | | OTHER OBA | |
| | | EFFECTIVE DATING | | | |
| | | PLATFORM | | | |
| 208 — PERSISTENCE | SMART SYNC | PERSISTENCE | GROUP MANAGER | SECURITY | |
| | | DATABASE | | | |

100

| ACTIONS | EMPLOYEE | | STATUS | APPROVED ON | PROGRESS | OBSTACLES | MY RATING | SELF RATING |
|---|---|---|---|---|---|---|---|---|
| | | | | 2009 PERFORMANCE PLANNING | | | LAST PERFORMANCE PERIOD | |
| ⚲ » | | JIM ARG<br>ANALYST | PLANNING | -NA- | 62% | MINOR:1<br>—1112 | ★★★☆☆ | ★★☆☆☆ |
| ⚲ » | | JIM ARM<br>SENIOR HR REP | NOT<br>STARTED | -NA- | 70% | NONE | ★★★☆☆ | ★★☆☆☆ |
| ⚲ » | | JIM ASSISTANT<br>SENIOR HR REP | NOT<br>STARTED | -NA- | 0% | NONE | ★★★☆☆ | ★★☆☆☆ |
| ⚲ » | | JOAN GEMBRY<br>ANALYST | NOT<br>STARTED | -NA- | 0% | NONE | ★★★☆☆ | ★★☆☆☆ |
| ⚲ » | | JOHN GENDRON<br>ANALYST | NOT<br>STARTED | -NA- | 0% | NONE | ★★★☆☆ | ★★☆☆☆ |

| | | | | | 1302 | | 1304 | | 1308 | | |
|---|---|---|---|---|---|---|---|---|---|---|---|
| ACTIONS | EMPLOYEE | | 9 B... | SUCCESSORS | FLIGHT RISK | LOSS IMPACT | WARNING LEVEL | CAREER PATH | POTENTIAL |
| 🔍» | JIM ARG ANALYST | | 9 | 2 | 40 | 79 | 44 | 1 | LOW |
| 🔍» | JIM ARM SENIOR HR REP | | 9 | 2 | 15 | 40 | 21 | 0 | HIGH |
| 🔍» | JIM ASSISTANT SENIOR HR REP | | 9 | 0 | 75 | 20 | 61 | 1 | MEDIUM |
| 🔍» | JOAN GEMBRY ANALYST | | 9 | 0 | 10 | 30 | 45 | 1 | MEDIUM |
| 🔍» | JOHN GENDRON ANALYST | | 9 | 0 | 25 | 0 | 38 | 2 | LOW |

*FIG. 13*

| | | | | | |
|---|---|---|---|---|---|
| | | | | | FRED DISILVA (ID:3003) 5 YOU HAVE 5 NOTIFICATIONS THAT WORKSCAPE.COM HELP CHANGE PASSWORD SIGN OUT<br>VP OF HR REQUIRE YOUR ATTENTION WORKSCAPE |
| | | | | | MY PROFILE \| MY TEAM \| JIM ARG: FULL PROFILE ×  |
| | | | | | SELECT GROUP: (CREATE NEW) SELECT A VIEW OF YOUR TEAM |
| | | | | | DIRECT REPORTS ▷ DASHBOARD \| PERFORMANCE \| SUCCESSION/CAREER PATH \| COMPENSATION |
| | | | | | FILTER WITHIN GROUP: |
| | | | | | ENTER NAME OR ID TO FILTER ⊥ PLAN FOR MY TEAM \| COMPENSATION REPORTS |
| | | | | | ▤ LIST ▤ CARD ☐ GROUP<br>BY JOB 1402 1408 1404 1410 1412 |
| ACTIONS | | EMPLOYEE | SALARY COMPARED TO SALARY RANGE | HIRE DATE | FLSA |
| 🔍 » | 👤 | JIM ARG<br>ANALYST | 78,000 ├──○──┤<br>50,000 66,666 83,333 100,000 | 5/14/2004 | E |
| 🔍 » | 👤 | JIM ARM<br>SENIOR HR REP | 88,000 ├────○┤<br>50,000 66,666 83,333 100,000 | 5/14/2004 | E |
| 🔍 » | 👤 | JIM ASSISTANT<br>SENIOR HR REP | 94,000 ├─────○┤<br>50,000 66,666 83,333 100,000 | 5/14/2004 | E |
| 🔍 » | 👤 | JOAN GEMBRY<br>ANALYST | 78,000 ├──○──┤<br>50,000 66,666 83,333 100,000 | 5/14/2004 | E |
| 🔍 » | 👤 | JOHN GENDRON<br>ANALYST | 66,000 ├○────┤<br>50,000 66,666 83,333 100,000 | 5/14/2004 | E |

DEVELOPMENT ACTIVITY NAME*
ENTER THE ACTIVITY NAME HERE (REQUIRED)

[ MEETING SKILLS ]

DESCRIPTION*
DESCRIBE THE DEVELOPMENT ACTIVITY
HERE (REQUIRED)                              *2104*

SEARCH FOR COURSES

KEYWORDS [ MEETIN ]   [ SEARCH ]

EFFECTIVELY USING CUSTOMER-FOCUSED RESEARCH MEETINGS
CONDUCTING EFFECTIVE SALES RESEARCH MEETINGS
TEAM LEADERSHIP-CONDUCTING PRODUCTIVE TEAM MEETINGS
FACILITATING MEETINGS AND WORK GROUPS

SE

[ SELECT A COURSE (OPTIONAL)...  |▽ ]

DEVELOPMENT DRIVER
YOU MAY OPTIONALLY SPECIFY A DRIVER FOR THIS ACTIVITY

[ SELECT A DRIVER (OPTIONAL)...  |▽ ]

[ ADD ACTIVITY ]   CANCEL

*FIG. 21B*

FRED DISILVA (ID:3003) [5] YOU HAVE 5 NOTIFICATIONS THAT REQUIRE YOUR ATTENTION
VP OF HR

WORKSCAPE.COM  HELP  CHANGE PASSWORD  SIGN OUT
WORKSCAPE

EMPLOYEE SEARCH
YOU ARE SEARCHING FOR EMPLOYEES TO ADD TO THE JIM ARG SUCCESSORS POOL

EMPLOYEE NAME
ENTER A FULL OR PARTIAL NAME. SEPARATE MULTIPLE NAMES WITH COMMAS

KEYWORDS
EXAMPLES: USABILITY, MANAGEMENT, "FLUENT IN FRENCH"

ADDITIONAL FILTERS
SEARCH WITHIN [ENTIRE ORGANIZATION ▽]

☐ ONLY RETURN HIGH POTENTIAL EMPLOYEES
☐ LAST PERFORMANCE RATING MUST BE AT LEAST [HIGH ▽]

SEARCH   DONE

[ASSIGN SELECTED AS SUCCESSOR]  [COMPARE SELECTED EMPLOYEES]

| NAME | JOB TITLE | PROMOTION POTENTIAL | WILLING TO RELOCATE |
|---|---|---|---|
| JIM ARG | ANALYST | LOW | |
| JIM ARM | SENIOR HR REP | HIGH | |
| JIM ASSISTANT | SENIOR HR REP | MEDIUM | |
| JOAN GEMBRY | ANALYST | MEDIUM | |
| JOHN GENDRON | ANALYST | LOW | |

PERFORMANCE DRIVEN COMPENSATION FOR ENTERPRISE-LEVEL HUMAN CAPITAL MANAGEMENT

CROSS-REFERENCE TO RELATED APPLICATIONS

This application claims the benefit of the following provisional applications, each of which is hereby incorporated by reference in its entirety: U.S. Provisional Patent Application Ser. No. 61/105,593, filed Oct. 15, 2008; and U.S. Provisional Patent Application Ser. No. 61/105,615, filed Oct. 15, 2008.

BACKGROUND

1. Field

The inventive methods and systems described herein generally relate to human capital management and particularly relate to a scalable platform for enterprise level human capital management including performance, compensation, benefits, and the like.

2. Description of the Related Art

Human resource management systems must provide support for diverse applications such as compensation planning and execution, performance appraisal and management, alignment of compensation and performance, benefits administration, benefits user self service, and the like. There exists a need for a scalable human resource management system that facilitates the effective application of these services to a wide range of entity sizes, structures, and business processes while ensuring a high degree of configurability and client data separation for use on distributed, networked computing environments.

SUMMARY

In an aspect of the invention, methods and systems for accessing human capital domain model in accordance with various embodiments of the present invention are provided. The aspect may include a persistence layer for storing a human capital domain model, a business logic layer comprising the domain model, a plurality of human capital management applications, and a presentation layer comprising a user interface for accessing the domain model via the applications.

The aspect may also include storing a compensation domain model in a persistence layer of a human capital platform, manipulating domain objects of the domain model with compensation management applications, configuring the compensation management applications within a business logic layer of the platform, and presenting a user interface for facilitating user interaction with the applications using a presentation layer of the platform.

In the aspect of the invention, the plurality of applications may include a performance driven compensation application, a compensation planner application, and the like. In the aspect of the invention, the compensation planner application may facilitate in cycle and out of cycle planning. In the aspect of the invention, the plurality of applications may also include a compensation application, a succession application, a competencies application, a performance application, or other types of applications. In the aspect of the invention, the performance application may facilitate manager and employee self-service.

In the aspect of the invention, the persistence layer may include a database for storing the human capital domain model, smart synchronization facilities for updating the domain model, and the like. In the aspect of the invention, updating the domain model may include bulk updating. In the aspect of the invention, the persistence layer may also include group manager functionality for allocating employees to human capital management groups. In the aspect of the invention, the groups may be configured independently of a hierarchy associated with the entity. In the aspect of the invention, the persistence layer may further include security for limiting access to the database. In the aspect of the invention, the security may allow a plurality of independently accessible domain models to be stored in the database. In the aspect of the invention, the independently accessible domain models may be stored in separate schemas.

In the aspect of the invention, the user may be an employee, a manager, a platform administrator, and the like. In the aspect of the invention, the domain model may comprise domain objects representing employee compensation information, employee performance information, or some other type of domain objects. In the aspect of the invention, the compensation management applications may include a performance driven compensation application, a compensation planner application, or the like. In the aspect of the invention, the compensation planner may facilitate in cycle and out of cycle planning. In the aspect of the invention, the compensation management applications may also include a compensation application, a succession application, a competencies application, a performance application, or some other type of application. In the aspect of the invention, the performance application may facilitate manager and employee self-service.

In the aspect of the invention, the persistence layer may include a database for storing the compensation domain model, smart synchronization facilities for updating the domain model, and the like. In the aspect of the invention, updating the domain model may include bulk updating. In the aspect of the invention, the persistence layer may further include group manager functionality for allocating employees to compensation management groups. In the aspect of the invention, the groups may be configured independently of an employee hierarchy that is accessible in the domain model. In the aspect of the invention, the persistence layer may also include security for limiting access to the database. In the aspect of the invention, the security may allow a plurality of independently accessible domain models to be stored in the database. In other embodiments, the independently accessible domain models may be stored in separate schemas.

In an aspect of the invention, methods and systems for updating a domain model of a human resource management platform in accordance with various embodiments of the present invention are provided. The aspect may include receiving information describing a current state of employee human resource data, using a processor to compare items contained in the received information with domain model information based on an information item key that is common to the received information and the domain model information, detecting differences in the domain model information based on the comparison, determining actions to update the model based on the differences; and executing the actions to update the model. In the aspect of the invention, the actions may include computing model state information.

In the aspect of the invention, the domain model may be a model of employee compensation data. In the aspect of the invention, the domain model may be stored in a database that is accessible to the processor.

In an aspect of the invention, methods and systems for selectively updating objects in a domain model in accordance with various embodiments of the present invention are provided. The aspect may include receiving a set of changes to domain object data, using a processor to store a copy of a portion of the domain model, creating a shadow model; configuring an update filter for the shadow model, the update filter determining frozen portions of the shadow model; and applying changes in data with a processor to the domain model, and to the shadow model based on the update filter. The aspect may further include committing the changes to a database that is accessible by the processor.

In the aspect of the invention, the domain model may represent human resource management data, at least one of compensation information and performance management information, and the like. In the aspect of the invention, the domain model may further include using the processor to change human resources data contained in the shadow model.

The aspect for updating a human resources domain model may also include determining updates to portions of domain objects; using a processor to store a copy of a portion of the domain model, creating a shadow model; configuring an update filter for the shadow model, the update filter determining frozen portions of the shadow model; and using the processor to apply the updates to the domain model, and to the shadow model based on the update filter. In the aspect of the invention, the processor may also be used to apply the updates to the domain model, and to the shadow model based on the update filter.

In an aspect of the invention, methods and systems for interacting with a human resource management platform in accordance with various embodiments of the present invention are provided. The aspect may include transmitting human resource management information from a server to a remote computing facility over a network; presenting the human resource management information in a user interface to a user using the computing facility; receiving a response to the human resource management information from the user using the computing facility; transmitting the response to the server; computing changes to the human resource management information based on the response; and updating a server-accessible domain model of the human resource management information based on the computed changes. The aspect may further include transmitting the changes to the computing facility.

In the aspect of the invention, transmitting the human resource management information from the server to the remote computing facility may include retrieving the human resource management information from the domain model. In the aspect of the invention, retrieving the human resource management information may be based on a user identifier provided from the web browser. In the aspect of the invention, the user interface may run in ADOBE FLASH technology and may be developed using ADOBE FLEX technology.

In the aspect of the invention, the user may be an employee. In the aspect of the invention, the human resource management information of the employee may include one or more of: goals data, performance data, salary data, salary range data, development activities, performance feedback, salary history, and employee profile. In the aspect of the invention, the response of the employee may impact one or more of: goals data, performance data, salary data, salary range data, development activities, performance feedback, salary history, and employee profile.

In the aspect of the invention, the user may be a manager. In the aspect of the invention, the human resource management information of the manager may include one or more of: goals alignment data, flight risk data, performance data, direct reports data, successors data, loss impact data, warning level data, career path data, potential data, salary data, salary range data, required actions, development activities, performance feedback, salary history, and employee search. In the aspect of the invention, the response of the manager may impact one or more of: goals data, performance data, salary data, salary range data, development activities, performance feedback, salary history, employee profile, goals alignment data, flight risk data, performance data, direct reports data, successors data, loss impact data, warning level data, career path data, potential data, salary data, salary range data, required actions, development activities, performance feedback, salary history, and employee search.

In the aspect of the invention, the user interface may display a timeline of the human resource management data.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 2 depicts an architecture view of the platform.

FIG. 11 depicts a performance tab of a team in a human resource management system.

FIG. 12 depicts selecting an individual in a performance tab of a team in a human resource management system.

FIG. 13 depicts a succession/career path tab of a team in a human resource management system.

FIG. 14 depicts a compensation tab of a team in a human resource management system.

FIG. 15 depicts a notifications window of a human resource management system.

FIG. 16 depicts an individual profile of a team member in a human resource management system.

FIG. 17 depicts a new goal creation window.

FIG. 21A depicts a Development Activities add window.

FIG. 21B depicts an enlarged view of the Development Activities add window.

FIG. 21C depicts a schedule view of the Development Activities section of a profile.

FIG. 22 depicts selecting an individual in a Succession/Career Path tab of a team in a human resource management system.

FIG. 23A depicts searching for an employee to add as a successor.

FIG. 25 depicts a goals tab of a performance evaluation.

FIG. 28 depicts a Review and Submit tab of a performance evaluation.

FIG. 29 depicts a Confirmation tab of a performance evaluation.

DETAILED DESCRIPTION

Figure 1:
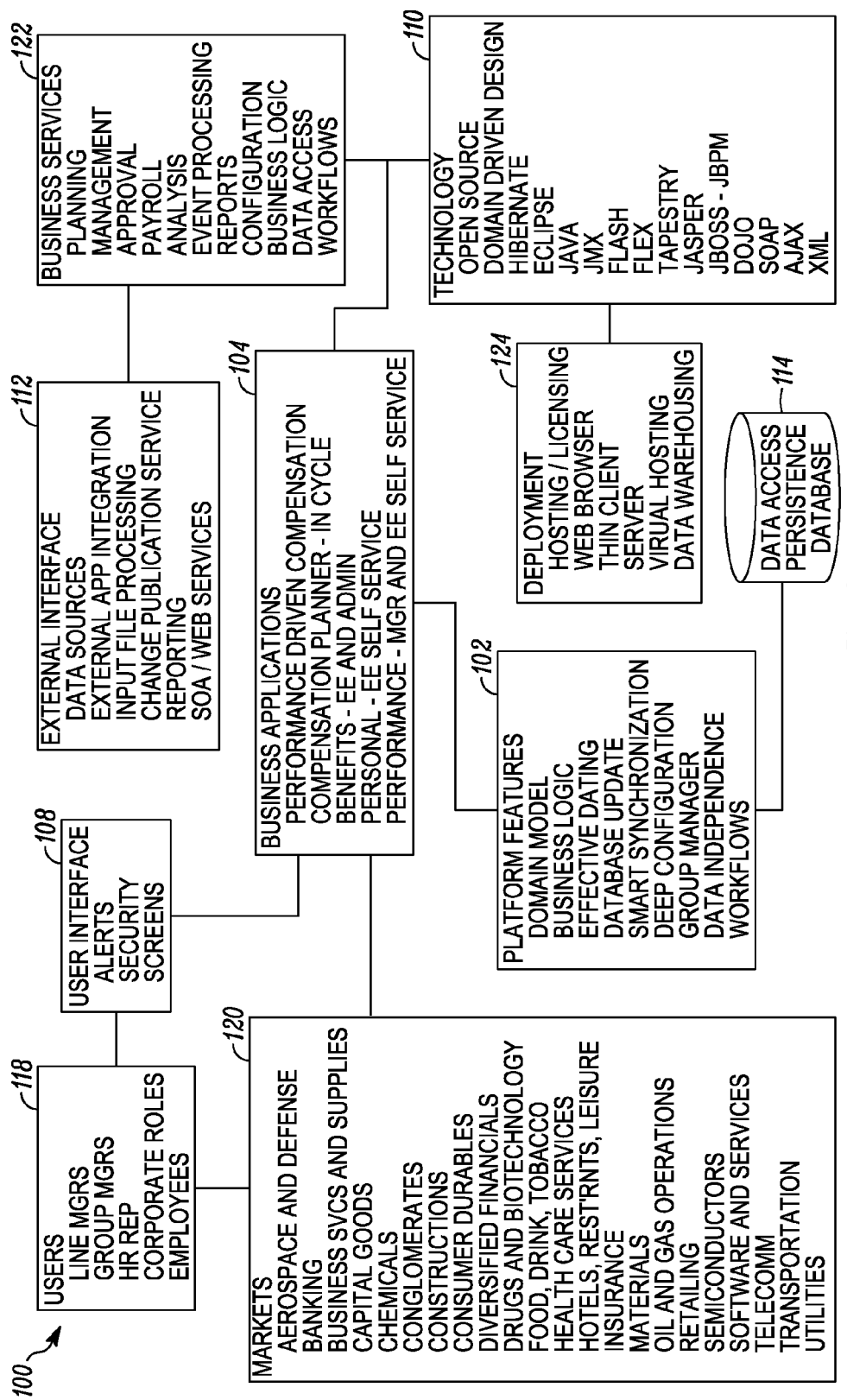
FIG. 1 depicts diverse elements of a human resource management platform.

A human resource management platform may include a centralized domain model where application logic comes together in one place; a deep and mature configuration model that provides extensive configurability; a unique design for groups and hierarchies that facilitates leveraging them for natural and efficient rule distribution; smart synchronization features to facilitate loading bulk data and recomputing ramifications of changes detected in the data; data independence and pending world features that allow the platform to maintain independent data sets pertaining to the same core entity or organization concurrently while allowing a wide range of data update options; an effective dating framework that may facilitate accurately maintaining chronological states of the platform and its associated data in the past, present, and future at the same time; high-performance, scalable, and enterprise-class support; and many other features and capabilities as described herein.

The platform may include domain driven design features that may be well suited to a scalable product family that can be readily tailored to a variety of client needs. Business logic may be centrally located in the domain model, which may form an object-oriented backbone to the platform.

The platform may include a deep configuration model that may provide rich model-based configuration capabilities that can be prepared externally and loaded into the platform to handle a wide range of requirements from clients. The configuration model may include configuring values, structures, scripted functionality, and the like.

The platform may provide a rich user experience through an intuitive and interactive user interface that is centered on the user's experience, using a combination of textual and graphical means to present information relevant to the user's job.

The platform may be scalable to support large population sizes and feature sets. The platform may support deployments of 400,000 users or more. Feature sets may be expanded to meet requirements that fall outside the bounds of the deep configuration model capabilities.

Applications in human resource management must have high volume file processing capabilities. Information for which a client is the system of record may be regularly loaded through full file processing, and information derived within the platform 100 must be sent to various parties in formats that they require. Therefore, the platform may be open to integration with other systems and facilities in areas such as specialized decision support tools, supplying data feeds, receiving data, and the like. Integration may be provided through front and back end integration points, flexible input and output file mapping capabilities, and the like.

The platform 100 may support third party integration to facilitate bringing together the best content and user experience to solve human resource management challenges. The platform 100 may present several mechanisms for integrating third parties into the system, providing a seamless experience to the end user, including: linking to remote content—a user interface can be easily tailored to provide context-sensitive links to content provided by a client or third party; accessing local content—certain content may be accessed from within a firewall or through a server, such as for security purposes. The user interface can be tailored with internal content links to provide internal content; consuming web services—the platform 100 contains web service integration support that enables applications to consume web services from third parties. In an example, users may be directed to third party control, with connections initiated and results obtained through web services; publishing web services—third party tools may also use portions of application functionality provided by web services that can be published by the platform 100 or by a provider of the platform 100. In an example, publishing web services may be used for real-time data synchronization by clients or for information queries and updates by internal tools; data import and export—the platform 100 may support batch loading of full or partial updated files from clients, and export of files formatted for specific recipients.

Because human capital management operation can be very complex, with a variety of special cases, and seemingly ad hoc rules that must be followed, users may be subjected to software in this space that reflects that complexity in its user interfaces and support requirements. In contrast, the platform is designed to control substantially all of the complexity through a high degree of automation for client feature development, production code generation, specialized tools creation, and product build and deployment processes.

Referring to FIG. 1 which depicts various elements that may be associated with embodiments of the human resource management platform 100, platform features 102 may include a domain model that may include business logic, an effective dating framework, database update or synchronization capabilities, smart synchronization facilities for updating data and the domain model in the database with enterprise business system data, deep configuration features, group manager features, data independence functionality, workflows, and the like. The platform 100 may also be associated with business applications 104 such as performance driven compensation applications, compensation planning applications that supports both in-cycle (focal) and out-of-cycle planning, benefits applications that can be used by employees, human resource administrators, and third parties, employee and manager self service applications, performance planning, appraisal, and feedback applications that support input from employees, co-workers, and managers, and other business applications as may be described herein or may be envisioned or needed for effective use of the human resource management platform. The platform 100 may be associated with a user interface that may provide alert capabilities, access security, and a wide variety of user interface screens, such as those associated with each of the business applications 104. The platform 100 maybe associated with various technologies 110 that may be used for development, deployment, operation, maintenance, upgrade, and the like.

Platform technologies 110 may include open source software, domain driven design, JBOSS HIBERNATE, ECLIPSE, JAVA, JMX, ADOBE FLASH, ADOBE FLEX, TAPESTRY, JASPER, DOJO, SOAP, AJAX, XML, and the like. The platform 100 may be associated with and support external interfaces 112 such as business system data sources, external application linking and integration, web services, input file processing and compliance checking, change publication services, reporting, and the like. The platform 100 may include or be associated with one or more databases 114 that may provide persistence of data and access to input data and derived data including the domain model. The platform 100 may be associated with users 118 that may include line managers, group managers, human resource administrators, various other corporate roles, information technology specialists, employees, third parties, and the like. The platform 100 may be deployable in a wide variety of markets 120, some of which may include large entities. Markets may include aerospace and defense, banking, business services, capital goods, chemicals, conglomerates, construction, consumer goods, diversified financials, drugs and bio technologies, food, beverage, and tobacco businesses, health care, hotel service, travel and leisure services, insurance, materials, oil and gas production and distribution, retailing, semiconductors, telecommunications, transportation, utilities, and the like. The platform 100 may be associated with and may beneficially support business services 122 such as planning, management, financial approval, payroll, employee-related analysis, event processing, reporting requirements, business system configuration, business logic realization, secure employee data access, workflows, and the like. The platform 100 may also be associated with deployment 124 that may facilitate hosting, licensing, web browser integration, thin client deployment, server-based deployment, virtual computing, virtual data warehousing, and the like.

Referring to FIG. 2, a functionality view of the platform 100, the platform 100 may include a presentation layer 202, a business logic layer 204, and a persistence layer 208. The presentation layer 202 may facilitate user access through a web-based interface that may be almost entirely implemented in ADOBE FLEX, running in the user's web browser, and communicating to a platform server through an SSL connection. The user may interact with the platform 100 over a secure connection, and may be authenticated via single sign-on to use the platform either through a third party security portal or through a login screen associated with the platform 100. Functionality and visibility to certain data may be restricted from the user due to platform 100 authorization rules. Administrators may get access to additional functionality and visibility of additional data, which may include access to workflow results, historical and auditing information. Other portions of the platform may provide services to the presentation layer 202 through which users access the services and functionality of the platform 100. The presentation layer 202 may also include HTML capabilities, provide support for a reporting mechanism (e.g. Jasper reporting or other equivalent reporting mechanisms), provide PDF formatted documents, and the like.

The platform 100 may provide a business logic layer 204 that generally can be understood to be a middle tier in the product architecture where substantially all of the application logic is disposed. A rich object model, which may be stored on a server, interacts with the presentation layer 202, computes implications of data input to the platform, and may store itself in a database that may be part of a persistence layer 208. Configuration loaded into the platform creates and modifies objects, and web services may be published or consumed to provide a communication path with the model to outside partners. Application components build on this model, adding capabilities such as succession, performance, compensation, benefits administration, and the like.

The platform 100 may provide a persistence layer 208 that may be largely automated in the platform, with an object-relational mapping strategy for synchronizing a database and an in-memory model using database synchronization software such as JBoss Hibernate. As described herein, the platform may include an effective dating framework that may be automated with this layer. The database that is accessed through the persistence layer 208 may contain no business logic so that it can provide a fast storage and query response for objects in the model. The persistence layer 208 may include denormalized representations of portions of the database to support analytics, reporting, and the like. The persistence layer 208 also implements some security aspects and provides a basis for fast data loading and separation of data sets.

The human resource management platform 100 may provide facilities for updating the object model and database based on data received from external business systems, such as financial, organizational, legal, and the like. Generally, human resource management systems rely on data captured and managed in external business systems that may be used for strategic and operational purposes by businesses. External data may include insurance, benefit programs, and the like from third parties. The platform 100 provides smart synchronization facilities that enable bulk loading of data from these systems on a regular basis while providing rules driven, time efficient automatic updating of the data and model content used by the platform 100. Smart synchronization may support various computing environments, such as parallel processing or distributed computing architectures to benefit updating data in deployments of the platform in large organizations (e.g. utility companies with more than one hundred thousand employees, large numbers of transactions, and the like).

Figure 3:
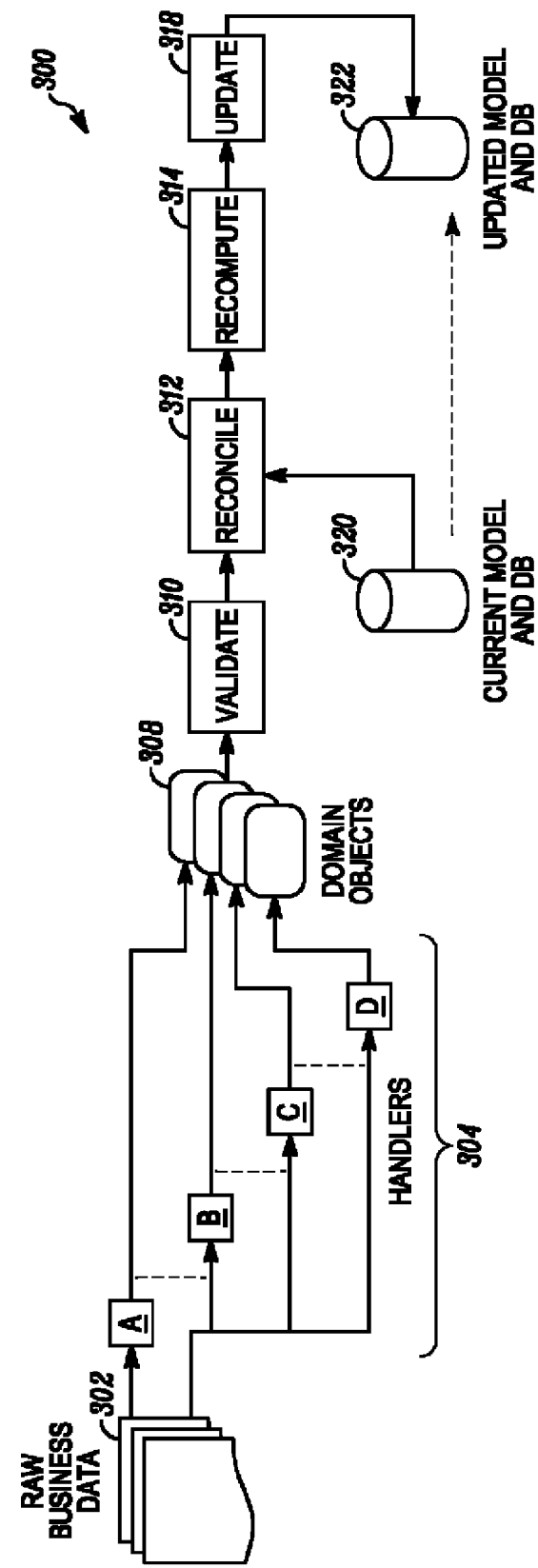
FIG. 3 depicts smart synchronization aspects of the platform.

Referring to FIG. 3, which depicts a smart synchronization facility 300 of the platform 100, bulk loading of data may benefit the various business applications supported by the platform 100 such as performance driven. Smart synchronization 300 may provide capabilities to bring the bulk data into the platform 100 rapidly and upload the model/database quickly. Smart synchronization 300 may also support effective dated objects as described herein and may support receiving data in industry standard formats (HRXML and other consortium formats). Although data received and processed through smart synchronization 300 eventually results in a database update, changes are applied to the object model and the updated object model elements are persisted in the database through a bulk database update process.

The smart synchronization facilities 300 may be designed as a pipeline architecture with a series of transformations that convert raw business data 302 into object data 308 using handlers 304. The object data 308 is validated for errors and the like (e.g. raw data 302 contains 200 job descriptions, yet the current model holds 10,000 job descriptions). The validated object data is then reconciled 312 with the current model data 320 to determine differences, such as changes in salary, new employees, new jobs, organizational changes, and the like. The changes may be provided to a recomputation engine 314 that recomputes all derived model data, taking into consideration the changes provided by the reconcile process 312. As the object data in the model is updated through the recomputation process 314, it may be organized into groups of like database transactions to improve the efficiency of these updates. In an example, if an organization of 7,000 employees is moved in an organizational hierarchy, the hierarchy link of each of these employees may be grouped and forwarded to the database update engine 318 to improve the efficiency of the update. When all derived model data is recomputed through the recomputation engine 314 and the model data is persisted in the database through the update facility 318, the object model and database now references the updated model and database 322.

Portions of smart synchronization 300 may be implemented as a pipeline to support operation on separate processors, servers, and the like. This may be facilitated by the inherent separation of employee data. While the types of data required for each employee may be the same, the information is very unique and can be processed independently. Similarly, although data and formulas for processing data for a business application such as performance driven compensation may be different when compared to processing data for benefits administration, the main smart synchronization steps and algorithms may be the same. Smart synchronization 300 may be similar to and/or may be used to implement coverage repair in a benefits administration business application. This is further described in co-pending application, Ser. No. 12/579,985 titled "BENEFITS MANAGEMENT FOR ENTREPRISE-LEVEL HUMAN CAPITAL MANAGEMENT".

Smart synchronization 300 may also be embodied as a rules engine that allows a company to decide how data in the platform 100 reacts to changes in the data that is sent into the platform 100 on a regular basis such as from various other business systems.

Smart synchronization 300 may operate in parallel on any plurality of instances of the current model 320 as may be required with data independence described herein elsewhere.

Smart synchronization 300 also supports a full audit trail of all changes made, which may be important for regulatory compliance and other change verification processes.

Because smart synchronization 300 recomputes all derived data, planned changes that are recorded in the platform 100 and are not yet effective in the current model 320, but will be effective at a future point in time, if a data item that impacts these planned changes is received, the computations that affect the planned change will automatically be executed. In an example, if a manager has entered plans for merit increases for eight of her employees and the external business data indicates that one of these employees is to be transferred to another manager before the merit increase is to be effective, smart synchronization 300 will detect this employee change and compute the data necessary to support the planned employee transfer and the planned merit increases. Changes may include: moving an employee compensation budget from the first manager to the second manager; ensuring that any pending authorization workflows for the merit increase are moved to the role responsible for authorizing merit increases for the second manager; adjusting other aspects of the employee compensation (e.g. bonus) based on the department rules of the second manager, and the like. In this way, the updated model 322 reflects these planned changes so that each manager can see how the planned changes will impact their departments in the future.

Recomputation of derived data may be required because all of the budgets, guidelines, workflows, and the like may be configured into the platform 100 but may not be inherent in the external business systems. Therefore, any given change made outside the platform 100 (ex: an employee is hired, transferred, fired, quits, etc) and input to the platform 100 for synchronization has no way of knowing what the downstream impact to other parts of the platform 100 will be. This automatic recomputation allows managers and administrators to focus on the business of the specific change (dealing with an employee resignation) rather than the complexities of the impact of the change to the platform 100.

Smart synchronization 300 may include separating external business data 302 into separate files or categories of data, such as data that relates to jobs, salary, employees, groups, workflow approvers, and the like. Alternatively the data may already be separated into individual files, such as a job file, an employee file, and the like. Each file or category of data may be processed separately, which may further improve the efficiency of the synchronization process.

The reconcile process 312 may infer a deletion or a change of an item based on a comparison of the raw business data 302 and the current model 320. Using an example of a job description, the reconciliation process 312 may compare each existing job with the jobs in the job data input file; determine what is new, what has changed, and what has been removed. In this example each job may be assigned a unique identifier. If the unique identifier in the input data 302 matches to a job in the current model 320, then reconciliation 312 determines if the job data has changed by comparing the input job data to the current model job data. If the unique identifier in the input data 302 does not exist in the current model 320, the input data job is flagged as a new job to be added during the recomputation process 314. If one or more unique job identifiers in the current model 320 is not found in the input data, then these jobs in the current model 320 are tagged as to be deleted. The job is not directly deleted because it may be used or referenced elsewhere in the platform 100. Although the platform 100 does not receive a 'delete job' action, smart synchronization 300 infers that an entry in the platform 100 that is not included in the current job input file is to be removed. An item that is tagged to be deleted may result in the recompute process 314 archiving the job to ensure proper traceability for regulatory and governance compliance.

The platform 100 is scalable to facilitate support of entities with very high employee counts. Entities with upwards of 400,000 employees can be supported by the platform 100. Smart synchronization 300 facilitates scalability through memory management techniques that may include using caching and pagination to perform the synchronization process on large model elements with a reasonable amount of memory. Because of the widely diverse impact of a change that relates to employee groups that are defined and/or maintained within the platform through the group manager functionality (described elsewhere herein), recomputation 314 requires very large amounts of data to be available for processing. One memory management technique used includes keying input data with a natural key (e.g. social security number for employee, hierarchy key for a group, and the like). The natural key may be used in conjunction with the individual object model element unique identifier to cache relevant data so that the recomputation processing 314 can be executed very efficiently.

Smart synchronization 300 includes an update facility 318 that persists the recomputed model data to produce the updated model and database 322. As described herein, techniques to make this update process efficient include, among other techniques, grouping like database transactions together into a single update request. Even if calculations are simple, due to the large quantity of calculations and database changes required each time that smart synchronization 300 is performed the data to be updated is ordered to facilitate batching the update requests.

In an example, a database update tool, such as HIBERNATE may be used because it supports efficient batching of requests. With HIBERNATE, the platform 100 may accumulate a large number of updates (e.g. 10,000) into a single request rather than issuing 10,000 individual requests. Batching is also used when data is read out of the database for reconciliation 312 or recomputation 314 so that fewer transaction requests must be processed during the smart synchronization process 300.

Smart synchronization 300 may also include handlers 304 that may operate in a pipeline or may themselves be composed of a pipeline of data processing sections. The organization, order, and features of the handlers 304 may be configured as part of a build time configuration process. This handler 304 customization may allow receiving data that is unique for a deployment of the platform 100 (e.g. adding or handling a special job code). Although handlers 304 are generally ordered to process data from the most generic (e.g. jobs) to the more specific (e.g. groups), the order of the handlers can be changed so that a group handler 304A may be executed before or after a job handler 304B. Handlers 304 can execute a wide variety of tasks, such as to copy data, check a length of description, and the like. Configuring handlers 304 may be performed with an interface coded using Java.

Effective dating is a strategy for managing data that changes over time. Traditional data processing takes place in the present, and results are stored from now until they are changed in the future. With effective dating, you can set the effective date to a date or date range, and read data as it was (or is projected to be), or write data for the present, past or future. Most effective dating designs fail due to poor performance or overly complex logic, passing dates and date ranges throughout the code and obscuring the business logic. The platform 100 includes a sophisticated layer that separates dates from the application logic and manages effective dates deep in the architecture outside of application logic, keeping the logic itself simple. For certain business applications supported by the platform 100, effective dating is fundamental. For example, in benefits administration, benefits eligibility, plan changes, coverage effective dates, pending coverage and events all occur at various times, making it difficult to keep track of the benefits and costs associated with employees at any time. The platform 100 provides tools to create an effective dated model implementation and persistence layer. This unique capability provides a scriptable, simple point-in-time programming model to developers, for customizations, and scripted configuration. It also effective dates a configuration of the platform 100 itself, so that changes in configuration can be scheduled to take effect at some point in the future, or retroactively in the past. Automation and layering may be techniques that make this successful. The effective dating framework also has a built-in capability referred to as pending worlds which allows a type of long-lived transaction. Unlike a true transaction, however, it is not totally isolated. Rather, it is a branching strategy that allows write-through from the main non-pending world. This allows live what-if scenarios that are automatically updated when non-pending information is changed that may affect the pending world. For example, in benefits administration, if an employee declares a birth event, a new pending world is created where the new dependent and any elections are stored until the event is approved. If a subsequent plan changes affects eligibility or changes rates, the benefits in both the pending and non-pending worlds will be updated accordingly.

Figure 4:
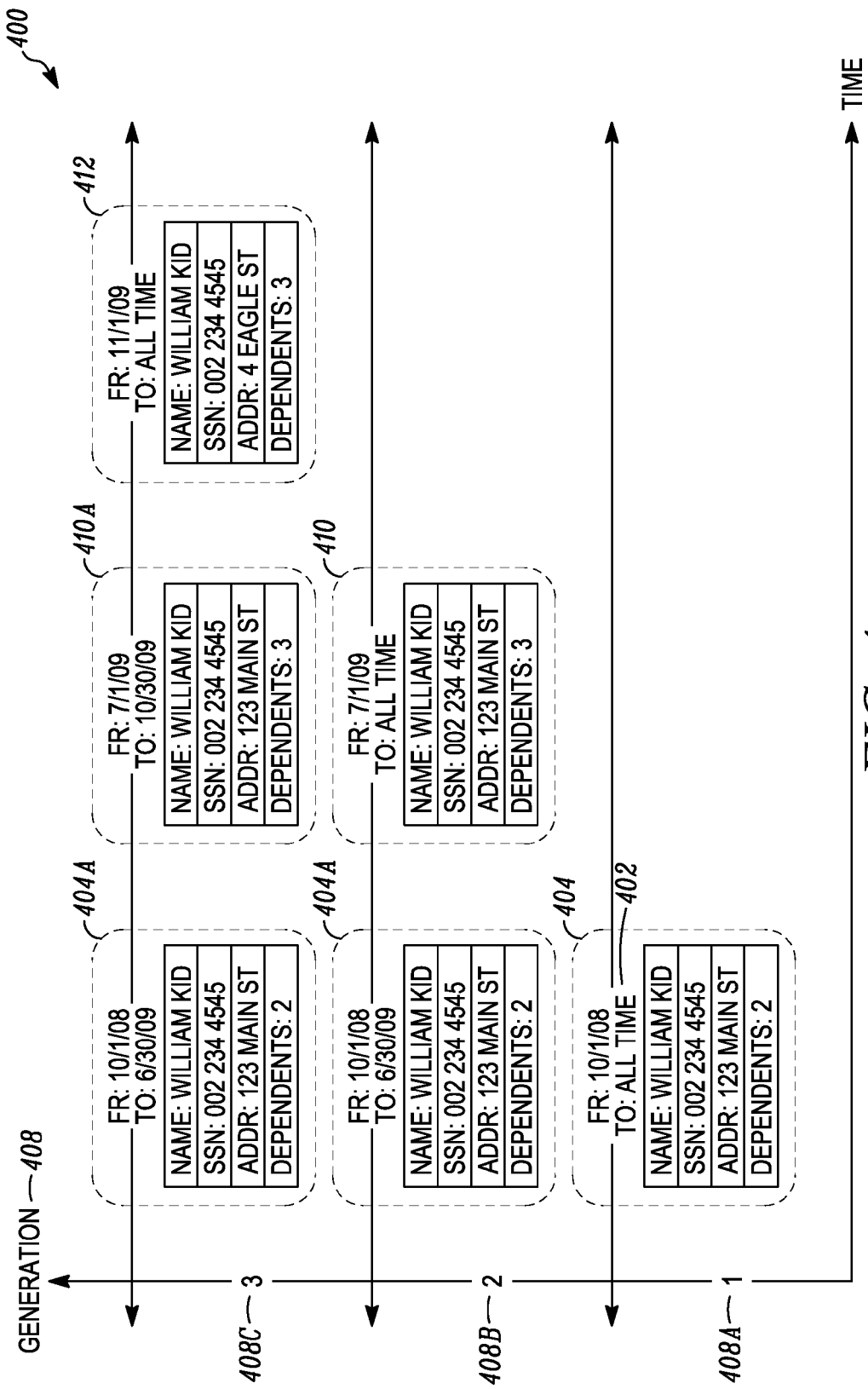
FIG. 4 depicts effective dating aspects of the platform.

Referring now to FIG. 4, which depicts a simplified embodiment of effective dating, effective dating 400 may enable changes made to each domain object 404 to be associated with an effective date 402 and with a generation 408. Tracking of changes to domain objects may be supported with a two dimensional effective dating mechanism. When placed on an X-Y chart, as shown in FIG. 4, the X axis may represent an effective date time line and the Y axis may represent generations of an object. Within each object generation 408 (each 'value' of Y), each effective-date-differentiated version of the object is tracked based on effective dates known when the object generation is saved (e.g. when it is persisted in the persistence layer). The current object generation (indicated by its Y value) includes the previous object generation effective dated object versions, plus additional changes introduced since the previous object generation was saved. Once the current object generation is saved, any further changes that impact the object will be applied to a new object generation (indicated by a new Y value) that starts out as a clean copy of the most recently saved object generation.

Each version of a domain object has an effective date that may include an effective 'from' date and an effective 'to' date to allow selective access of a version of the object based on this effective date range.

FIG. 4 includes three object generations, generation 1 (408A), generation 2 (408B), and generation 3 (408C). In the simplified example of FIG. 4, generation 1 includes one version of the object 404 with effective dates Oct. 1, 2008 to all time. Generation 2 includes a copy 404A of the object 404 from generation 1 with effective dates adjusted to Oct. 1, 2008 to Jun. 30, 2009 and a second version 410 of the copy 404A that includes certain changes and has effective dates Jul. 1, 2009 to all time. Generation 3 includes a copy of object version 404A, a copy 410A of object version 410 with adjusted effective dates Jul. 1, 2009 to Oct. 3, 2009, and an updated version 412 of the object version 410A that includes certain changes and an effective date of Nov. 1, 2009 to all time.

In the example of FIG. 4, when the change in the number of dependents from 2 to 3 is entered, the generation 1 object version 404 is saved and a copy 404A of the generation 1 object version is allocated to generation 2. The effective 'to' date of the object version 404A is set based on the 'from' effective date of the number of dependents change. A copy 410 of object version 404A is created in generation 2, the dependent changes are made to it and it is effective dated so that there is no gap between the 404A version and the 410 version of the object.

Once generation 2 is saved to the database, a subsequent object change (in this example an address change) is applied to a new generation (generation 3) of the object. Generation 3 starts as a copy of generation 2 and includes object version 404A and a copy 410A of object version 410 with an adjusted effective 'to' date based on the effective date of the address change. The object version 410A is copied to a new object version 412, the address change is applied and the effective dates are set.

Although the example of FIG. 4 is a simplified example of effective dating, the order of changes could be different and the end result would be the same. If in the example the 408C change occurred first (with an effective date of November 1) and then in a next generation the 408B change occurred (with an effective date of July 1) the changes would result in the same final generation because the platform 100 allow updates to be applied in any effective dating order.

Execution instances of a business application (e.g. compensation quarterly planning) may be associated with a target date that may represent the calendar date for which the business application is being executed. In an example of how a target date may be interpreted by an object to provide the data effective on the target date, generation 3 of FIG. 4 represents an object being queried. An instance of a business application associated with a target date of Jun. 1, 2009 will access information from object version 404A because Jun. 1, 2009 falls within the effective date range Oct. 1, 2008 to Jun. 30, 2009 of version 404A. This includes the user name, social security number, address of 123 Main St, and dependent count of 2. A business application being executed with a Sep. 1, 2009 target date will access object version 410A which includes the user name, social security number, address of 123 Main St, and dependent count of 3. An instance of a business application being executed with a target date of Nov. 1, 2009 will access version 412 which includes the user name, social security number, address of 4 Eagle St, and dependent count of 3. This example is specifically simplified to show how effective dating 400 may be used by business applications in the platform 100. Note that all this is operating on the latest generation—that is, updated with the latest information and further including all values that were in effect in any domain object version. Generally, only an administrator inspecting auditing information and selected reports may look at older domain object generations. However, the entire platform 100 can operate with a target date set to any previous date in such a way that the platform 100 would read from the earlier generation that was available at that target date.

An objective of effective dating may be to support point-in-time simplicity in the platform 100 that allows selecting a target date similarly to setting a clock to a particular date/time and getting access to only the information effective at the set date/time. The business applications operate based on the target date so that an applications programmer does not need to create any logic to determine which entry to use; the underlying platform provides the correct data. Effective dating 400 allows for an application to identify a particular time and access to the data is implemented by the platform below the business application/logic layer, but above the database. Effective dating 400 may be different from prior attempts that created separate database tables for different times. The prior attempts generally do not perform well on large databases, do not support bulk data loading, and do not support using data caching for updates. One embodiment indicates that a future state is kept in a separate table that is copied to a currently active model shortly after midnight to bring the current model to the current (no longer future) state. While this may be effective, it may not meet the performance requirements of large enterprise-class deployments. Other prior attempts at effective dating included creating separate tables or change tables and then pass dates throughout the business applications to try to figure out what a state of an object was at a specific date. This puts an onerous burden on a programmer and makes the application code significantly more complex and brittle. These differences may substantially improve the value and effectiveness of using effective dating 400.

A benefits administration business application executing in association with the platform 100 may use the effective dating mechanism 400 described above to provide the 'point-in-time' simplicity within the application to deal with events in each subscriber's life that affects benefits. Application logic in the application may control the target time so that it becomes the context that all objects implicitly reference to provide data from the version that has an effective date that includes the target time. The application controlled target time can be in the past, present, or future.

Effective dating 400 may facilitate making a record of events and changes over time. Effective dating 400 can also be used to infer events. In an example, if a change in an employee's address is detected in the raw input business data, an employee move event that occurred effective with the date that the new address was introduced to the platform 100 may be inferred from the data change. Effective dating 400 may be applied to dates themselves, providing a record of changes to dates. In an example, correcting an employee hire date may create two hire dates for the employee, one in effect up until the correction was made, and the other in effect after the correction. Therefore, an accrual that is dependent on an employee start date can be automatically corrected when the system performs coverage repair based on the new hire date. Coverage repair is a process used in the benefits administration application for reconciling effective dated data changes introduced into the system with business rules in effect during that time. The configuration model that has all the rules of the objects is also effective dated so we can access the rules (model definition) with an effective date.

In an example of effective dating used in a benefits administration management business application, an object may include a current salary of an employee. The employee's manager may enter a change to the employee salary with an effective 'from' date in the future (a planned salary change). This change may trigger an automatic function that processes object versions and generations as described above. Queries of the model that include a date request that is before planned salary change 'from' date will reflect the current employee salary. Queries of the model that include a date request that is on or after the future effective date of the planned salary change will reflect the planned salary.

Changes to an object (e.g. an employee changes his address) may also affect all versions of the object with a future 'from' effective date. This ensures that when the version of the object with the future 'from' effective date is accessed, the data provided from the object includes all changes made prior to the 'from' effective date that are still pertinent. Further in the planned salary change example described above, after the manager enters the planned salary change, the employee changes his residential address. This change may result in creating a new generation of the object that includes a new version of the object that has a 'from' effective date based on the date the employee moves. This change will also result in updating the employee residential address contained in the version of the object that reflects the planned salary change. Therefore, when the planned salary change object becomes effective, the updated employee residential address will be present in the model.

Effective dating 400 may be based on an effective dating framework that can be applied to any standard object model design. A compile-time effective dating framework tool may be used to create an effective dated model from any object model such as object oriented designs, classes, states, and the like. The compile-time effective dating tool may be executed against a client-specific adaptation of the domain model to make objects time sensitive. Effective dating 400 as used within the platform 100 facilitates supporting time tracking at a low level that is separate from the object model and therefore allowing applications to retrieve database state data from different time spaces without having to carry any time dependencies into the object API in the application layer.

Effective dating 400 may also facilitate auditing. While conventionally, auditing is based on keeping track of all changes through some sort of audit table (e.g. tracking who made a change, etc) to ensure meeting regulations, the effective dating 400 framework allows each object to manage its own history and allow a view of the system at any point in time. Because all changes are effective dated, the platform 100 offers many layers of state that can be rolled back for auditing or any other purpose. Such complete and independent auditing is not necessarily inherent in any other domain model-based environment.

Data being imported or exported can be effective dated. Exported data may include effective dates represented as portions of a record for use by third parties such as insurance providers. When data from external business systems is input, such as with smart synchronization 300, if there is no date information associated with records that can be used to generate the effective date, the date of first synchronization of the data records may be considered the effective date. Smart synchronization 300 may be configured to recognize a date that is associated with an input record that is to be used to generate an effective date for the entry.

The platform may support managing employees within groups and hierarchies to facilitate hierarchical management of compensation, performance, benefits, and other human resource related activities. Hierarchies may be applied to data structure, creation, organization, and the like in performance and compensation planning and management. The platform may facilitate organizing employees into groups and/or hierarchies that may mirror the reporting and functional groups and hierarchies of the entity. The performance and/or compensation hierarchy may include aspects of the functional hierarchy of a company, while including aspects that are independent of the functional hierarchy. The performance and/or compensation hierarchy may include adaptations or modifications of functional hierarchies of an organization. In an example, a functional hierarchy may identify directors as higher in the hierarchy than senior managers. However, a compensation hierarchy may place experienced senior managers and junior directors at the same level in the hierarchy. In this way, senior managers, who may be performing many director levels responsibilities, may be evaluated for compensation similarly to junior directors. An example of this is long-term incentive awards which are usually awarded to managers only by senior directors or executives. Alternatively, the compensation hierarchy may be independent of a reporting or functional hierarchy. In an example, all directors, independent of their reporting or functional hierarchy in the business may share a common hierarchy level which may be related in a compensation hierarchy to all senior managers who share a different hierarchy level. An organization with geographically diverse business units and even different languages may find relating directors from a first region and senior managers from a second region provides a more competitive compensation offering. Organizing the compensation of a large business in a compensation hierarchy may allow visibility to compensation factor differences between different business units.

The human resources management platform 100 may also provide group management facilities that allow for managing hierarchies within the platform that may be different from organizational and reporting hierarchies that may be represented in business system data input to the platform. Matrix management may be represented in the platform 100 so that an employee who has business-line reporting to a first manager and is working on a project that is under the management responsibility of a second manager, may be grouped with the other project members under the second manager. Although a business system view of this employee may show the employee working directly for the first manager, a performance and compensation view may be adjusted to show this employee in a group managed by the second manager. Group management facilities provide benefits to users of the platform 100 that include not needing to create complex conversion software programs that adjust the business group view to the matrix group view so that a compensation planning system can accommodate matrix management.

Figure 5:
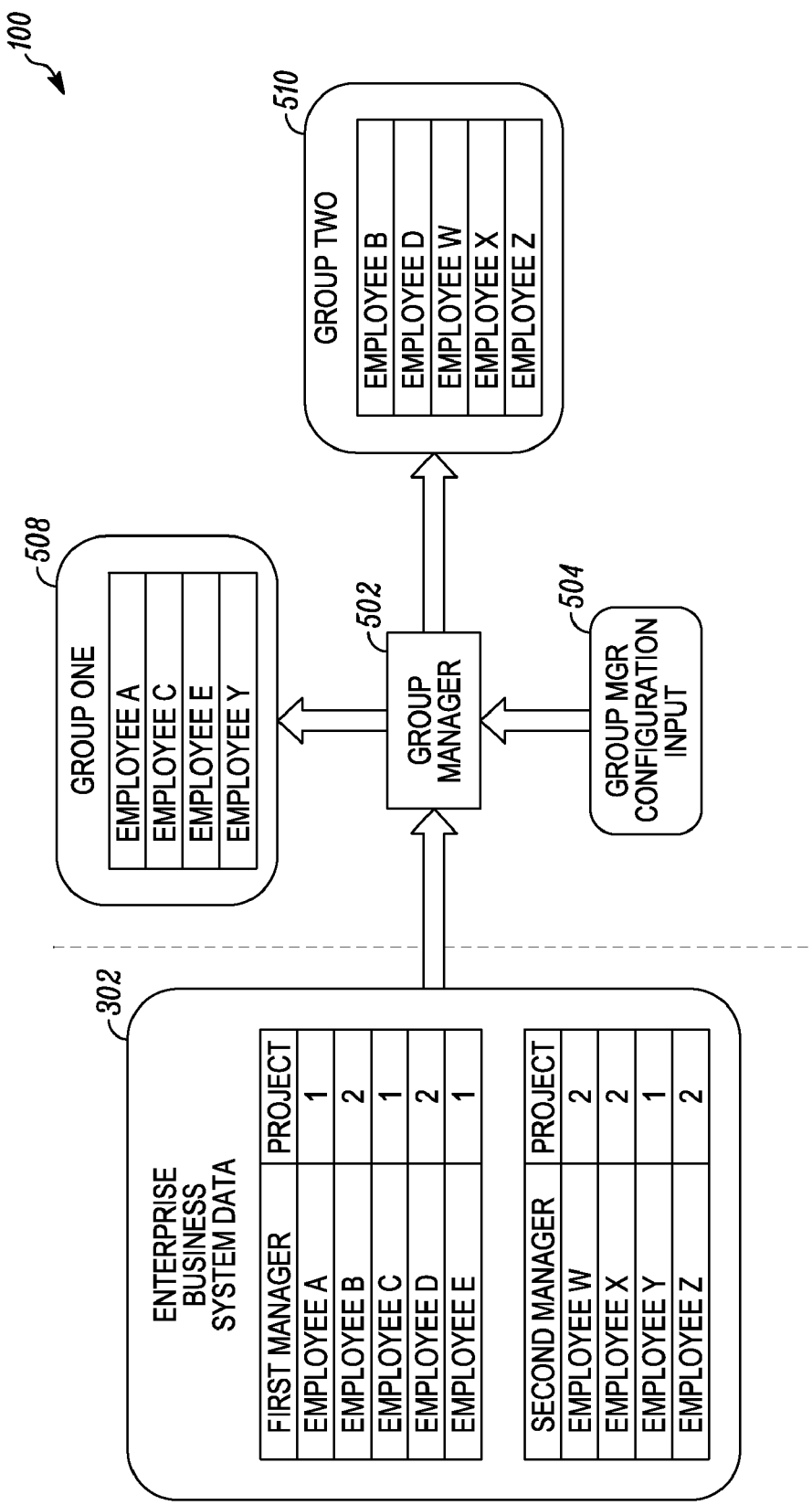
FIG. 5 depicts group manager facilities of the platform.

Referring to FIG. 5, that depicts a functional view of group manager facilities operating within the platform 100, enterprise business system data 302 may include line management grouping or hierarchies as shown. In the example of FIG. 5, a first line manager manages five employees—A, B, C, D, and E. A second line manager manages four employees—W, X, Y, and Z. In the example, each employee is currently assigned to work on one of two projects, project 1 and project 2. When this business system data 302 is supplied to the platform 100, the group manager 502 may be configured through configuration input 504 to detect each employee's project assignment as a natural key for grouping. The five employees of the first manager and the four employees of the second manager may be grouped into two groups within the platform 100: group one 508 that may include employees A, C, E, and Y who are associated with project 1; and group two 510 that may include employees B, D, W, X, and Z who are associated with project 2. Through this simplified example, an embodiment of the group manager 502 is used to organize employees into groups other than those known and represented in the enterprise business system data 302.

Group manager 502 may be associated with smart synchronization 300 in that the data that is processed through the smart synchronization process may include grouping through group manager 502. Group manager can be used to define a specific hierarchy to control how the data being received from the external business systems 302 impacts groups that are defined through group manager 502. Group manager 502, when combined with smart synchronization 300 may also facilitate avoiding the creation and support of complex software that modifies data extracted from the business system 302 so that certain changes in the data only impact members of a work group. In an example, if a bonus program for employees working on project 1 is changed, either the individual managers have to maintain the data manually for each project 1 employee or special export software must be used adjust the bonus for each employee working on project 1 as the data is transferred from the business system to the platform 100. The group manager 502 significantly benefits human resource administrators and managers so that data can be handled in groups that they define, rather than wrangling with data in the business system to overcome its limitations.

The group manager 502 allows for specific assignment of an employee to a group. However, the group manger 502 also allows criteria based employee and functional department grouping. Users of the group manager 502 may identify certain criteria, such as project assignment as a definition for group membership. In this way, by identifying an attribute associated with employees (e.g. employees with currently vested stock options, sales people, non-exempt employees, and the like), a group of these employees may be defined within the platform 100. Business applications, such as a performance driven compensation application may use these criteria defined groups to apply rules, perform processing and the like. In an example, a bonus plan may be established for non-exempt employees. By grouping employees by this criteria (non-exempt status), the bonus plan can be automatically applied to only non-exempt employees in all departments.

The platform 100 may support data independence techniques that may allow independent update of parts of the model, such as those parts that correspond to compensation or performance plans. In an example, one planning session may require a freeze on the reporting hierarchy while another planning session uses a continuously updated hierarchy. Data independence may also facilitate an alternate state of the whole model that allows modeling, "what-if" scenarios, and the like.

Separate datasets, also referred to herein as shadow datasets or shadow models may be created through the data independence framework for specific application needs, such as salary or benefits planning. Each dataset may include rules that control which objects or data elements may be updated as information is provided to the platform from external business systems. A shadow of the entire model may also be created. Each data set starts with a copy of the current model, but may be configured to stop receiving updates after some date, while the current data set continues to always reflect the latest data loads.

A performance-driven compensation application of the platform 100 may access a current dataset. The current dataset contains objects that reflect the latest information provided by the external business systems. Because external business systems provide data from a snapshot in time (e.g. "today") the current dataset reflects that snapshot. The current dataset can be thought of as simply a dataset that does not filter any changes resulting from an update of data from the external business systems. The current dataset may have no notion of what may have existed in the dataset before an update and there is no notion of pending or future changes.

Data independence may allow each dataset to be configured to allow specific updates and to prevent (freeze out) others through a update filter configuration feature. Because each data set is updated based on its update filter configuration, some data sets freeze all information, rejecting anything new, while others may reject all updates, or accept only certain types of information changes. Datasets can be configured with filters that only allow the updates that the filters are configured to allow, while holding all of the other data in the dataset frozen.

The current dataset may be a reference copy of the latest data that may be stored elsewhere in the model, such as in other datasets. Alternatively, the current data set may be a logical representation of the model based on using the current date to access an appropriate version of each object in the model based on the effective dating mechanism described herein.

Figure 6:
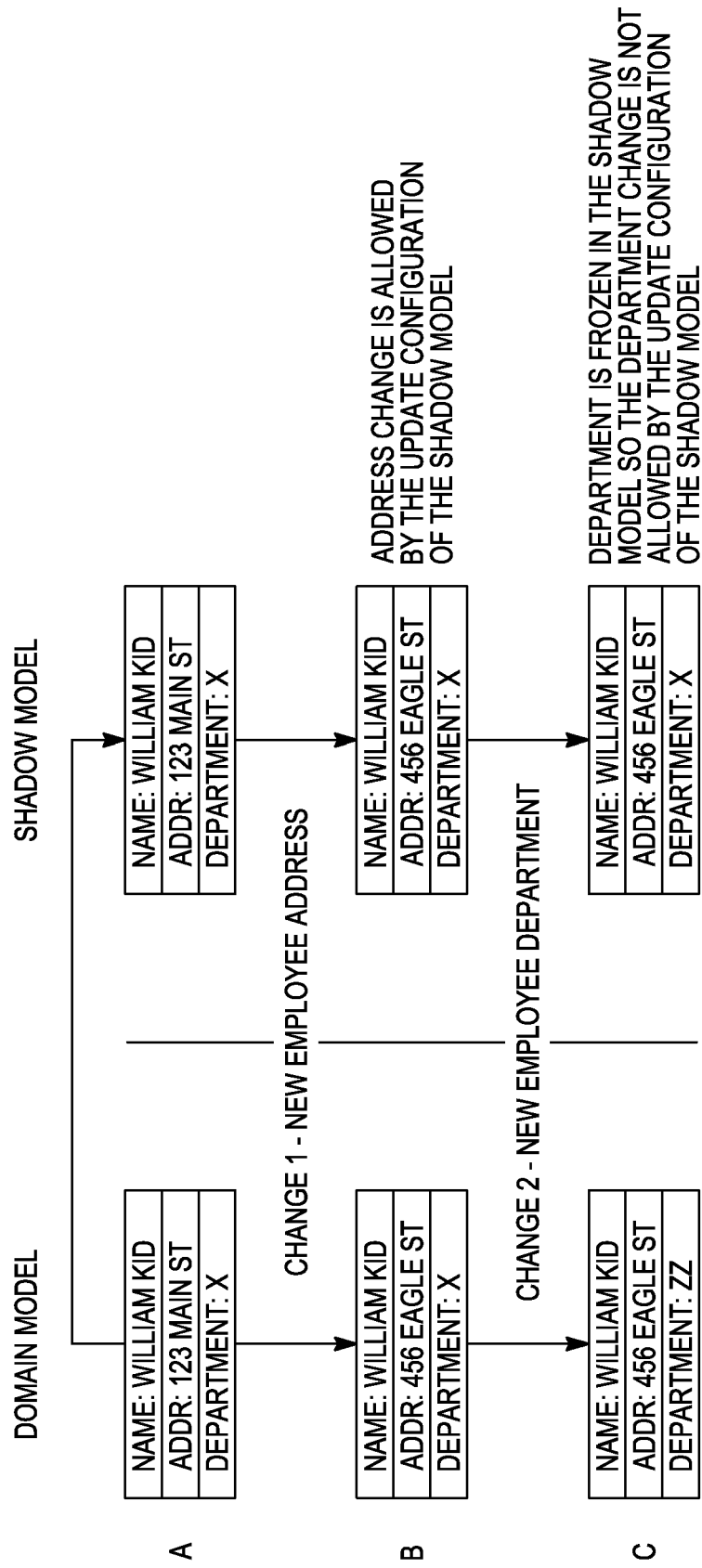
FIG. 6 depicts a data independence embodiment.

Referring to FIG. 6 which depicts how data independence may be used advantageously by business applications of the platform 100, a shadow model may be established when data independence is required for a particular purpose, such as compensation planning FIG. 6 depicts the domain model on the left side and the data independent shadow model on the right side of the figure. Three instances of the domain model and the shadow model are shown: instance A, B, and C. Instance A represents the domain and shadow models when the shadow model is established to support a compensation planning session. A change is introduced into the platform that may impact the data in the domain model and in the shadow model. The change introduced is a new address for an employee. The result of processing this change is shown in instance B of the domain model and the shadow model. In both the domain and the shadow model the change may be implemented because this piece of data is determined to not be relevant to the compensation planning session. A second change is introduced. The second change is a change of the department of the employee. Because this change is relevant to the compensation planning session, it is implemented in the domain model but it is frozen out of the shadow model so that the compensation planning session can proceed without the change causing undesirable results. The impact of the second change is depicted in instance C in which the department change is made to the domain model but not to the shadow model.

A user of the platform 100 may have reasons to want to have different sets of data available to their employees and managers for various business application tasks. A focal-based compensation planning session may require data that is updated differently (or not at all) than data for an off-cycle based compensation planning session. Focal-based planning is done at a focal-point in time may involve looking at data across a static population—the populate in the organization at the time the focal-based plan is being prepared). Off-cycle compensation planning is generally dominated by making changes based on current manager input, so currently updated data (rather than data frozen in time) may be required. To support both of these needs, data independence facilitates effectively stopping the updating of data for any group defined in the platform 100. In one embodiment, data independence establishes the shadow model by making a copy of domain model data that a manager needs to run an application (e.g. comp planning) and freezing out any subsequent changes to that copy of the data. By freezing the data for the specific purpose, other uses (e.g. off-cycle) or other focal-point activities can make and see data changes made after data is frozen. At some point a user may want to open up the frozen data and update or not update the data. However, all changes made since the data was frozen may be implemented. The manager who requested the data to be frozen may not be able to choose which changes to allow.

The platform 100 may include pending state and pending world features that may be useful to a benefits administration application because today's decisions (e.g. an election of benefits) may result in a pending state, which includes pending approvals (e.g. changes are entered but are conditional and therefore do not take effect until they are approved). A pending state could also be a declaration of a new dependent, which may require approval or simply an election which cannot take effect until evidence of qualification is received. Because the changes are conditional until approved, they are independent from the 'current state of the model' until the change is approved and effective. Therefore, pending states can be created in the platform so that the pending data is not used in activities before the pending data is approved, such as sending data to the suppliers of these benefits. Another purpose of the pending world is to maintain a complete and up-to-date view of the model that would be in effect if all the pending state were approved, as the user may expect it to be once all the conditions are met.

Changes may be introduced while the pending state is still outstanding. Subsequent changes that do not require approval may be implemented during the interval of time between when the election or change is entered and the approval is finalized. Therefore the platform 100 supports updating both the current object and the pending state so that changes that are not pended are made during the pending event. To support pending events and a pending world of pending events, an automated function may be executed during compilation of the software to be deployed for a client installation. This automated function may detect model classes that require a pending event state and may configure these classes to hold the pending event information when it is entered. In this way the current domain model or the pending events can be accessed based on a set of rules rather than requiring a pending identifier to be accessed during run time or needing to switch between a pending object and a current domain object.

In particular, each object may be associated with pending events. An object may be configured to have a pending state that is maintained in a pending delegate which is accessible through the object based on an assertion of the pending state within a business application. A pending delegate may be a copy of an object that includes changes to elements of the object that are not yet approved (i.e.: pending changes). In an example, when an employee makes a first pending decision, a pending world is created for that employee, and each object changed as a result of that pending decision maintains those changes in its pending delegate. The pending world is asserted by the application when functioning on behalf of an employee who has pending state at that time. A pending delegate is maintained in parallel with the object so that all non-pending changes are implemented in the object and its pending delegate. If and when a pending change is approved, the approved change is applied to the object through the object change process described in reference to the effective dating framework described here, thus ensuring that all dependencies of the change are made within the object and within the model. The information in the pending delegate that has been approved is no longer pending, so if there are no other pending changes in the pending delegate, the pending delegate may be marked as deleted from that time forward. If there are additional pending changes in the pending delegate, the pending delegate remains alive until all pending changes are either approved or denied, at which point that pending world can be discarded. If the pending change is denied approval, it may be removed from the pending delegate and may be archived for audit purposes and the pending world discarded.

The changes recorded in the pending delegate are only visible when an application specifically requests access to pending delegate information. This may be done through changing a context of the application that may be specific to an employee so that pending information is returned from the object when the application accesses the object. In an example, a business application of the platform 100 may be serving multiple users at the same time, so the pending state may be specific to a processing thread associated with a user. This allows multiple threads to keep separate pending state so that one user thread may have no pending state and is shown only current information, and another user thread accesses object data based on a pending world established by pending state in that user thread.

A deployment of the platform 100 may be configured to support a pending world by configuring actions and activities to trigger the use of the pending state. With this global pending context set, changes to an aspect of an object that has been configured to handle pending events may result in the automatic creation of a pending delegate. If the changes are directed at an aspect that itself is configured to support a pending state, a pending delegate of the object is created on demand by creating a copy of the object and passing the change to be handled by the delegate.

The pending state functionality may be implemented as part of the effective dating framework where pending delegates and their associations to non-pending objects are both fully effective dated objects.

The platform 100 provides a very flexible solution to managing deployed client data that supports both the down-market and the complex enterprise market. The platform 100 supports building the database schema as part of the client deployment build process, such that a client's data is maintained in its own database schema. This separation strategy satisfies many clients' concerns about data separation from other clients, and allows the flexibility to either co-locate the schema with others in the same database instance, or dedicate an instance to the client. This allows deploying more than one client's model and persistent data within one physical or logical database without any risk of exposing client information to other clients. Clients without domain model customizations or build-time configuration can share the application binaries, since runtime configuration results in only data content changes and no change in application code or database schema. This per-schema client strategy also allows applying table-level or schema-level encryption on a client by client basis so that encryption may be applied for a first client and not for a second client within the same database that is accessed by the same application binary.

Each client's data is maintained in a schema separate from other clients' data. This has several benefits. Each schema has its own access credentials, which prevents one client from accessing the others data, and prevents an application from unintentionally mixing data from two clients. This flexibility facilitates co-locating client deployments on virtual or non-virtual environments based on scale, performance metrics, usage patterns, and the like. It helps to use the platform 100 to exploit the characteristics of the low-touch down-market client while still delivering on the strict requirements of the complex enterprise-class client within the same platform 100 architecture.

The platform may provide reporting facilities. The reporting facilities may be accessible from each of a performance application, compensation application, benefits application, and any other application, user interface, administrative interface, or data interface associated with the platform. Reporting facilities may provide reports of information stored in one or more databases and domain models associated with the applications. Reports supported by the reporting facilities may include ad-hoc, standard, custom, and other reports such as customized, template based, automatic, interactive, scheduled, and the like. The reporting facilities may also interact with the domain model and one or more databases of the platform to generate one or more denormalized databases (e.g. reporting database) for facilitating reporting, such as customized reporting. A denormalized database may include domain model information, database data, computed data, referenced data, indirect data, consolidated data, third party data, formatted data, variable data, report templates, and other data or calculations that allow a user to report information based on the user's preferences. A denormalized database may be a compilation of information from one or more databases of the platform, one or more domain models of the platform, data gathered from sources external to the platform, user defined computed data, default computed data, and the like. The denormalized database may be updated periodically, such as each day, thereby providing a timely snapshot of information relevant to a user's reporting preferences. In addition to periodic updates, information in the denormalized database may be updated as needed, such as when information affecting a report is changed in the domain model or database. Providing a denormalized database may also improve report response time because report requests may not have to access either the domain model or the full database. Providing a denormalized database may also allow the use of industry standard or publicly available reporting software and techniques for reporting off of the denormalized database. A denormalized database may be organized to further optimize report response time such as by arranging most frequently accessed data to be readily available. A denormalized database may also be organized to allow a user to retrieve information, such as in a report, in ways that coordinate with their business processes, workflows, or preferences.

The custom reporting facilities may take advantage of the denormalized database and allow a user to report information out of the platform in ways that the user would normally want to get data. With custom reporting, the user may match reports to existing or predefined formats in which a user's current business process generates data. In an example, a user may already have various data in customized Access or Excel tables that, when viewed, present their data in a specific format or matching a preferred organization of the data. A custom report may be configured to deliver the required information to be viewed like the Access or Excel tables.

The ad-hoc reporting facilities and standard reporting facilities may query the domain model for data to satisfy a report request. By accessing the domain model, instead of the database, ad-hoc and standard reporting may reduce the transactional loading of the database, thereby improving overall platform performance. Reports based on the domain model may still query the database. However, they may benefit from using a single implementation of logic in the objects (e.g. business layer), rather than requiring implementing reporting logic on top of raw data and risking conflicts or taking on maintenance problems of duplicated logic. Alternatively, ad-hoc and standard reporting facilities may query the denormalized database. Any type of reporting facility may access any of the domain model, databases, and denormalized database as needed or specified to retrieve data to satisfy report requests.

The platform may simultaneously support ad-hoc, standard, and custom reporting so that a user may select one or more types of reporting on demand. Custom reporting may be based on templates that may also be used to organize or identify data to be retrieved, calculated, consolidated and the like into the denormalized database. By identifying the data requirements of the denormalized database based on the reports to be generated from it, the denormalized database may be automatically adjusted based on a custom report template each time the denormalized database is updated. In an example, a user may provide a spreadsheet file that contains the data in the format requested for a custom report. The user may reference the spreadsheet file when configuring a custom report through the platform. The platform may analyze the spreadsheet, such as the formulas, formats, data values, data names, macros, and the like to generate a custom report template to replace the spreadsheet report. At the next update of the denormalized database, such as a based on a user request, the platform may access the domain model and the database to retrieve relevant data, perform calculations as needed to deliver data that matches the spreadsheet data into the denormalized database.

Figure 7:
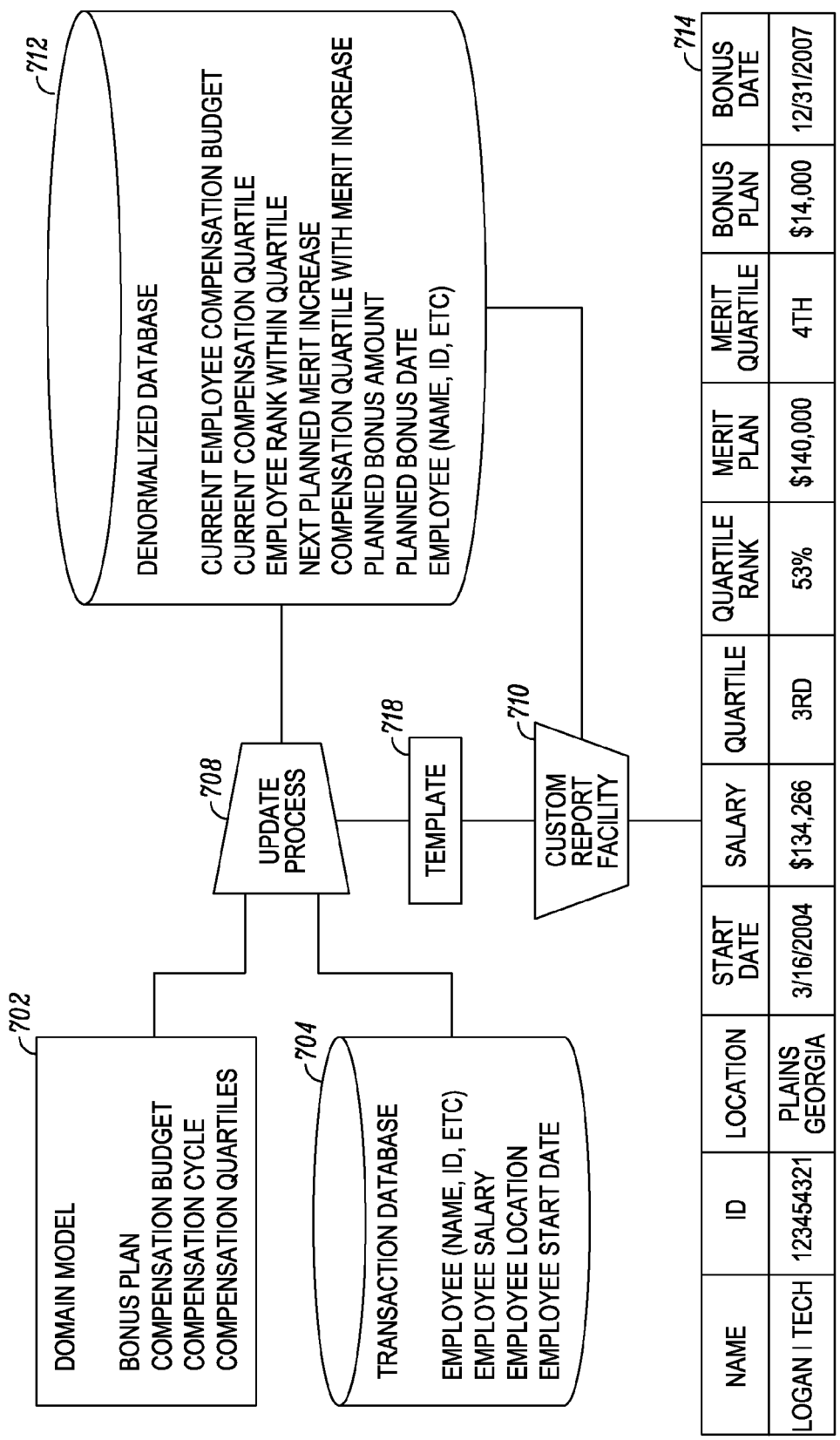
FIG. 7 depicts platform reporting flows.

Referring to FIG. 7 which depicts an exemplary report that has been generated from an updated denormalized database, exemplary data that may be recorded in a denormalized database is shown. The denormalized database 712 may be updated through update process 708. The update process 708 may reference custom report template 718 to determine aspects of data to be included in the denormalized database 712 update. Updating may include performing calculations, consolidation, extrapolation, sorting, and other operations on data such as data from the domain model 702 or the transactional database 704. Updating may also include copying data from any of the data sources. Updating may include modifying one or more preexisting entries in the denormalized database 712 so that data associated with a preexisting entry reflects data provided by the update process 708. Updating the denormalized database 712 may also include replacing entries, creating new entries, deleting entries, replacing a portion or the entire denormalized database 712, creating an alternate to an existing denormalized database 712, and the like. Updating portions of the denormalized database 712 may include incremental updates to one or more entries. In an example of incremental updating, the update process 708 may compare data from a preexisting entry in the denormalized database 712 to updated data for the preexisting entry and apply the updated data based on the results of the comparison. If the updated data is different than the preexisting data, the update process 708 may replace the preexisting entry data with the updated data. If the comparison result indicates the updated data is not different, then the preexisting entry data may not be replaced with the updated data.

The denormalized database 712 may include a date/time field that may indicate the date and/or time of the most recent update. The date/time field may apply to the entire denormalized database 712, a portion of the denormalized database 712, or individual entries in the denormalized database 712. The date/time field may be used by the update process 708 to determine which preexisting entries in the denormalized database 712 to update. Data provided to the update process 708 may include a similar date/time field to indicate the most recent change to the data. The update process 708 may compare the date/time of the most recent change of the source data with the date/time of the most recent update of the preexisting data to determine which data to update. In an example use of date/time fields associated with updating the denormalized database 712, a preexisting entry in the denormalized database 712 may have most recently been updated yesterday and its associated source data may have been most recently changed today. The update process 708 may determine that the source data has changed more recently than the preexisting data has been updated and, as a result replace the preexisting data with the updated data. The update process 708 may query the domain model 702 and/or the transaction database 704 so that only data changed more recently than the most recent update of the denormalized database 712 is provided. In this way, the update process 708 may utilize the query capabilities of the platform when updating the denormalized database 712.

The template 718 may identify aspects of data associated with a custom report 714. The update process 708 may reference the template 718 when requesting or obtaining data for reporting. The template 718 may include one or more data fields that may identify an entry or entries in the domain model 702 and/or the transactional database 704. The data fields may include employee name, employee salary, compensation cycle, and the like. A template may identify data that does not exist in any data source and therefore may have to be produced; such as by update process 708. Denormalized database 712 data that has to be produced may alternatively be produced by one more applications, such as a compensation application and stored in the domain model 702, the transaction database 704 or another data storage that may be accessed by update process 708. Data that may be produced may include various computations, calculations, and other combinations or processing of source data. In an example of produced data, current employee quartile may be calculated from current employee compensation package, and compensation quartiles. In the example, if the employee compensation package is $134,266 and the third quartile covers a compensation range of $120,000 to $150,000, the employee compensation quartile would be computed to be the third quartile. This computed data may be stored in the denormalized database 712 so that it could be reported by the custom report facility 710 and presented to a user, such as the example custom report 714 of FIG. 7.

The platform may support various templates. Templates that may be used by the update process 708 may include spreadsheet work files or work books from applications such as Microsoft Excel, Microsoft Works, and the like. Template formats supported may include xml files, custom report format files, existing compensation, performance, and benefits report generation format files, and the like. A template may identify specific data entries, data entry types, data groups, data sources, various other aspects of data, and the like.

A plurality of templates 718 may be associated with a custom reporting facility 710 to support generating various custom reports. Each template may identify data to be included in an update of the denormalized database 712. The update process 708 may combine templates so that data that is common to more than one template 718 may be retrieved from the domain model 702 and/or the transactional database 804 once. The common data may be stored in the denormalized database 712 in more than one location so as to facilitate generating custom reports 714. Alternatively, data commonly identified in more than one template 718 may be stored as a single entry in the denormalized database 712.

The platform may support ad-hoc reporting that may be used to easily create reports. Ad-hoc reporting may directly access the domain model, the transactional database, or may report from the denormalized database. Ad-hoc reporting may facilitate a user creating a set of report preferences that may be used in a query of the model to filter or select preexisting model objects for reporting. Ad-hoc reporting may be template based, menu based, code based, and the like. A query language such as SQL may be used in an ad-hoc reporting facility. The platform may support creating a user specific ad-hoc profile, storing the user-specific profile, exporting report data to third party software such as Microsoft Excel, generating ad-hoc reports in HTML, PDF, and other display formats.

The platform may support standard reporting. Standard reporting may support predefined reports. Standard reporting may be template-based to facilitate deployment and integration. Ad-hoc and standard reporting may report off of the domain model rather than the transactional database.

Figure 8:
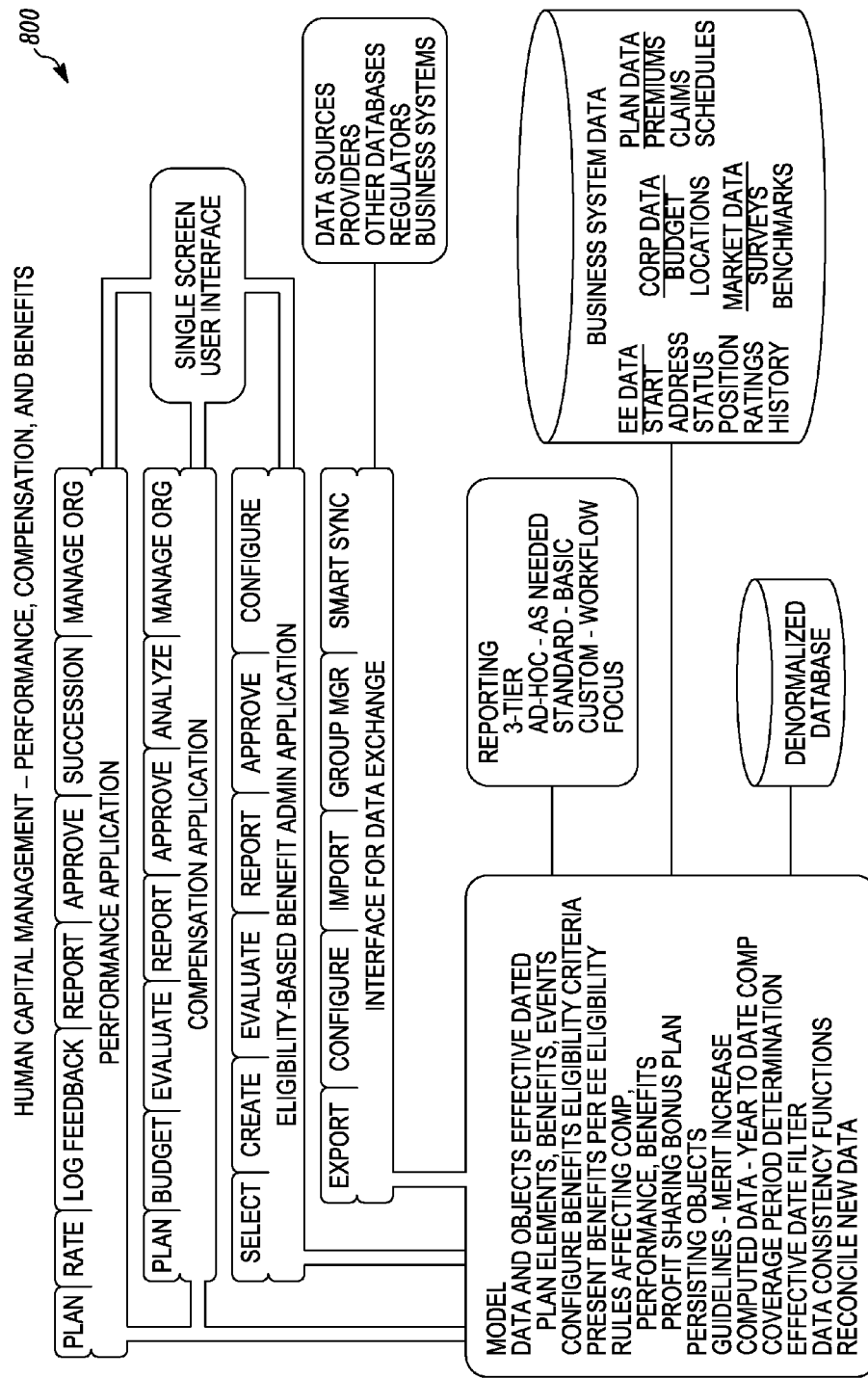
FIG. 8 depicts a unified human resources management platform.

Referring to FIG. 8, compensation, performance, and benefits applications may be combined in one product that may provide a uniquely employee-centric human resource management platform—a comprehensive human capital management (HCM) platform 800. This may include pulling the entire benefits administration application into the performance-driven compensation application to produce a HCM platform 800 that provides capabilities beyond a straightforward combination of applications because various user roles will have the ability to do a rainbow of activities within the HCM 800 based on the services that are deployed. A user role may encompass a benefits client role, a compensation client role and a performance/succession client role as an employee, hr manager, administrator, benefits manager, and the like.

The HCM 800 may be configured to take advantage of group manager hierarchy features to consolidate rules within the combined business applications and to leverage the sophisticated capabilities of security, data independence, data isolation, and the like to ensure each user role has proper visibility to relevant data while excluding access to non-relevant or sensitive user data. This concept of visibility may be moved to a lower level or to an application specific level in the HCM 800. The HCM may be embodied as an integrated management suite that may be accessible through a single user interface screen.

Figure 9A:
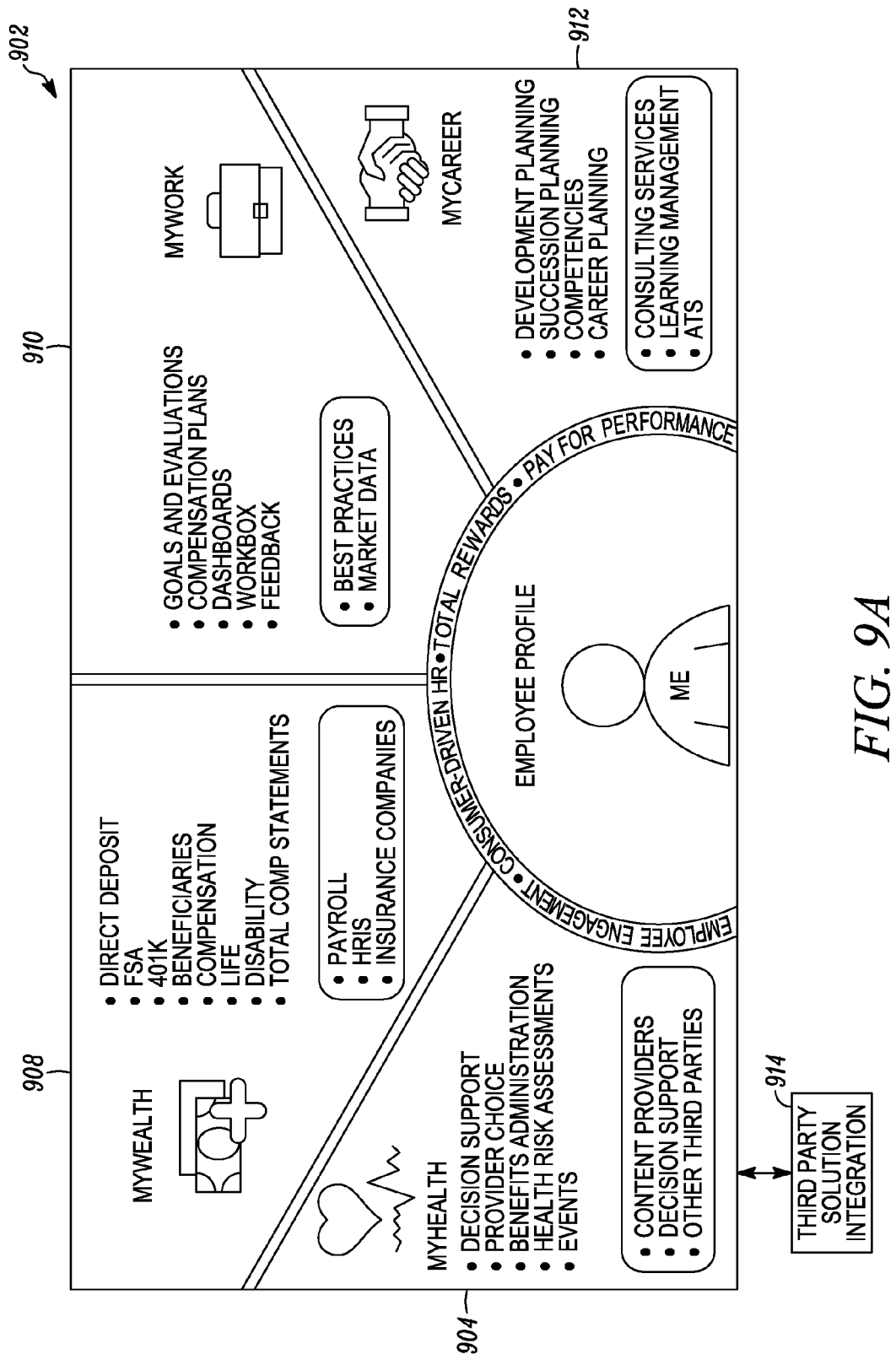
FIG. 9A depicts an employee-centric view of the unified platform of FIG. 9A.

Referring to FIG. 9A a user-centric overall offering may depict an overall offering employee view 902 of services available through the HCM 800. These services may pertain to health ('My Health' 904), finance ('My Wealth' 908), workflow ('My Work' 910), career development ('My Career' 912), and some other types of services relevant to the employee. The overall offering employee view 902 may be designed in order to provide at least a visual segregation of these services.

The 'My Health' 904 service may provide the employee with applications related to health services such as support for health decisions, options and choices regarding health care providers, administration service for health benefits, health risk assessments available, events and promotions, and some other services. For example, through 'My Health' 904 service, the employee may be able to obtain information related to a free eye check up camp organized by a health agency. In an embodiment of the present invention, such events and promotions may be organized in coordination with the employer of the employee.

The entities that may be interfacing with this service of the HCM platform 800 may include content providers that may supplement the information and content related to health services and benefits; decision support parties that may assist with the decision oriented activities (e.g., choice of health care provider); and other third parties. For example, health care events may be hosted by other third parties such as hospitals, NGOs, cultural organizations (Rotary Clubs, Red Cross, among others), and some other third parties.

In accordance with an embodiment of the invention, the other third parties may also be involved with solution integration.

The 'My Wealth' 908 service may provide the employee with applications related to financial services such as deposit account (e.g., facilities, statements), beneficiary and compensation benefits (e.g., bonus, overtime payments), life insurance (e.g., premiums), disability compensations, payroll statements, and some other types of financial services. For example, through 'My Wealth' 908 service, the employee may be able to access the monthly statement regarding the compensation and benefits accrued or the employee may be able to directly submit premium payments for medical or life insurance through this service.

Payroll department, Human Resource Information System (HRIS), and third parties such as insurance companies are the entities that may interact through this service.

Similarly, the 'My Work' 910 service may be responsible for providing a collection of workflow oriented applications and services to the employee. These applications and services may include but may not be limited to goals and evaluations, compensation and salary plans, dashboards and workbox, feedback, and some other applications and services. For example, the employee may be able to view various salary options provided by the company, such as fixed or variable component of the salary, and may be able to customize the salary structure according to the needs. In another example, dashboards and workbox applications may facilitate better management of workflow and productivity. In addition, these dashboards may provide effective visualization or presentation options (e.g., providing a graph or chart to track the progress of ongoing projects). Feedback, appraisals, evaluations, and recommendations may also be submitted and viewed by the employees through this service.

In accordance with an embodiment of the present invention, the 'My Work' 910 service may also include best practices and market data related to workflow. For example, this service may complement other services that may help the overall workflow (e.g., time-tracker services).

Likewise, the 'My Career' 912 service may be focused on the career development aspects of the employee. This service may include various applications related to career development and planning, succession or promotion planning, competencies (specialized or generic), and some other types of applications. For example, the employee may be provided with some additional training and certification courses for enhancement of skill set.

The 'My Career' 912 service may involve other entities such as consulting services, learning management service providers, ATS, and some other options for supporting career oriented needs of the employee.

In accordance with an embodiment of the present invention, a third party solution integration facility 914 may be provided to unify various services (related to employee's health, wealth, work, and career) of the HCM platform 800.

The overall offering employee view 902 benefits the overall human resource management process by providing an active and effective environment for employee engagement in various human resource activities, rewards for both the employer and the employee in terms of work, productivity, and benefits; a transparent solution for driving pay-for-performance, and a consumer-driven human resource.

Figure 9B:
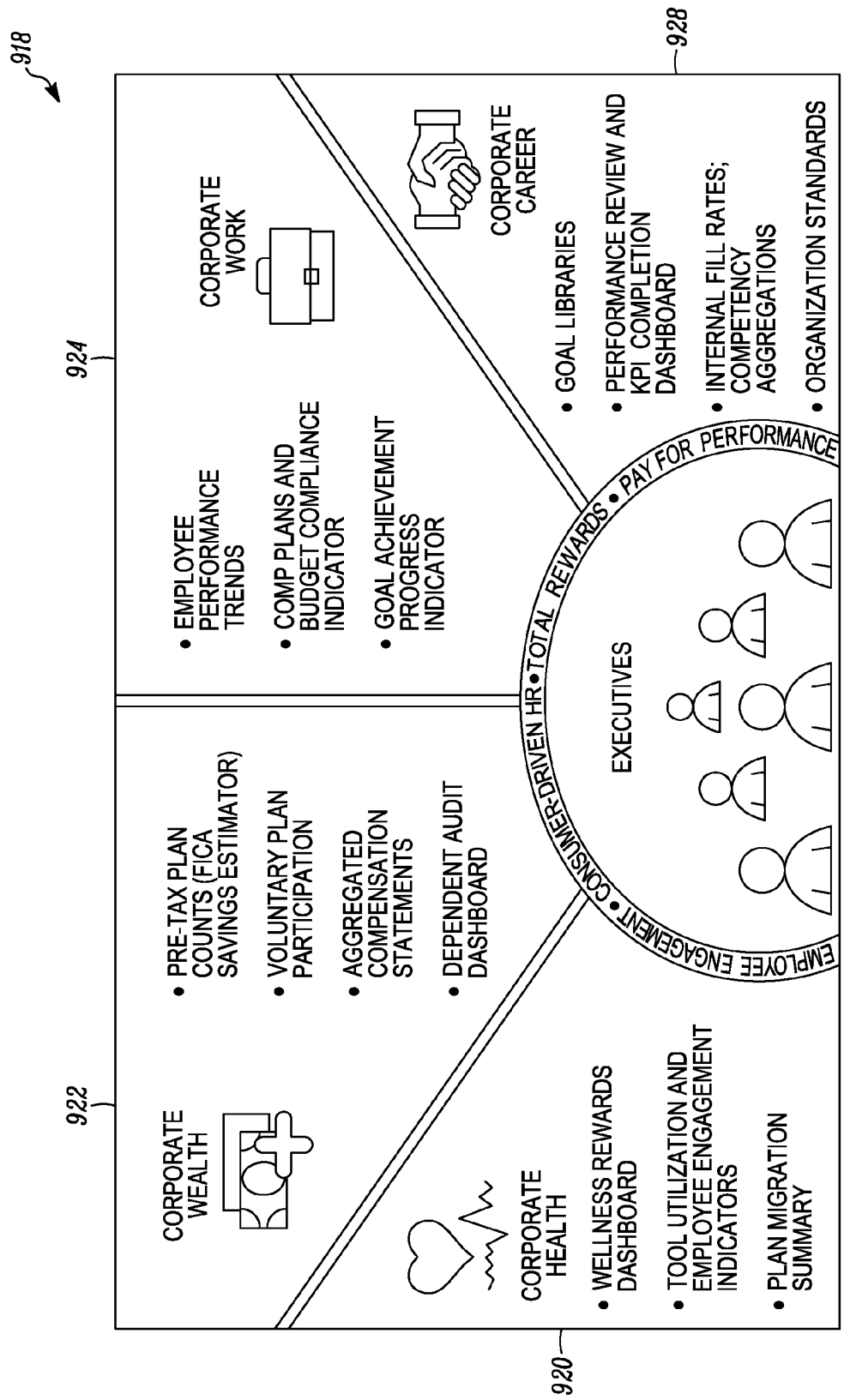
FIG. 9B depicts an administrator-centric view of the unified platform of FIG. 9A.

FIG. 9B depicts an overall offering administrator view 918 for human resource (HR) administrative and executive team. The administrator view 918 may include services pertaining to health ('Corporate Health' 920), finance ('Corporate Wealth' 922), workflow ('Corporate Work' 924), career development ('Corporate Career' 928), and some other types of services (i.e., for all the employees). The applications in these services may help the HR administrative and executive team assess various trends and indicators pertaining to employees' health, finance, workflow, and career.

The 'Corporate Health' 920 may include applications related to health and wellness rewards and benefits, tool utilization and employee engagement (indicators and trends), health plan migration summaries and other documentations. For example, a dashboard may be provided in 'Corporate Health' 920 that tracks the number of sick leaves availed by the employees. In addition, such a dashboard may provide facilities for rewarding employees who have not taken any sick leave in a given period. The rewards may be monetary, gifts, vouchers, coupons, certifications, and some other types of rewards.

The other service in the corporate interface screen 918 may include the 'Corporate Wealth' 922. This service may include applications such as dashboards for audit trails, pre-tax plan counts (e.g., Federal Insurance Contributions Act (FICA) savings estimator), voluntary plan participation, aggregated compensation statements, dependent audit dashboards, and some other types of applications.

Similarly, the 'Corporate Work' 924 service may encompass work-flow activities with regard to the entire organization. Some of the applications in this service may be employee performance trends, company plans and budget compliance indicators, goal achievement progress indicators, and some others. For example, the 'Corporate Work' 924 service may provide the invoice status of all projects. In another scenario, sales per employee ratios or workforce productivity ratios may be provided by this service for assessing the overall productivity of the organization.

Yet another service, 'Corporate Career' 928 may include a compilation of every employee's Key Performance Areas (KPAs), corporate goal libraries or repositories, a dashboard for reviewing performance appraisals/evaluations and Key Performance Indicators (KPIs), internal fill rates, competency aggregations, organization's standards, codes of conduct, and some other applications and functionalities. For example, a brief overview (requirements, procedure, preparations, guidelines, etc.) regarding the hiring process may be provided by 'Corporate Career' 928.

In accordance with another embodiment, various aspects of corporate career such as 'Corporate Social Responsibility' or 'Employee Initiatives' may also be provided by this service.

Configuration is a means by which a system's look or behavior can be changed to meet client requirements without programming. Configuration in the platform 100 includes model-based aspects, primarily through an XML file that includes structures, data, parameterized strategies, and scripting to tailor the platform's look and feel and behavior. The platform 100 may support build-time configuration that may be applied before the platform 100 is deployed to produce a targeted solution. Build-time configuration may provide a way that the platform 100 can maintain speed and scalability by having the configuration compiled into the platform 100 rather than manipulated as data at runtime. Most configurations of the platform 100, however, are runtime configuration, which can be loaded into a running platform 100 without taking it down and rebuilding it. Some types of effective dated configuration may be loaded while the platform 100 is running, without affecting current users.

The platform 100 offers several means for configuring applications including offline configuration tools, online configuration tools, user interface configuration, and the like. Offline configuration may be supported through configuration files that are loaded as XML files and may be created by configuration programs, filed, and the like that may be associated with the platform 100. These tools may enable business analysts to create the configurations through intuitive user interfaces, and export them into XML files. The files may be used in build-time configuration or used in run-time configuration and loaded into a running system. These tools are especially beneficial if the configuration model is complex or effective dated. Online configuration may partitioned so that a subset of runtime configuration may be available only to authorized users through application functionality, such as: administrator functionality that facilitates changing the details of a dimensional guideline rule, adjusting bonus calculations or updating performance ratings; role management that may facilitate defining roles and managing assignments to individuals and groups; group management that may facilitate maintaining reporting hierarchies, budget groups and other group and hierarchical organizations of employees; and the like. Configuration capabilities of the platform may include user interface configuration. The platform may support several configuration points in the user interface, such as: internationalization that may be supported through configurable resource files, for locale-specific text, formats, and content; application configuration files that may be loaded into the presentation tier to configure application flow; cascading style sheets that may be used to tailor the look and feel of the user interface; and the like.

The human resource management platform 100 may include data access components or elements for insulating applications and services from the details of data transformation and mapping. Data access components may include features that facilitate persistence of data, such as single domain objects such as a "noun" or a "component". Persistence of data attributes such as mapping of data formats may also be provided by the data access components. Data access components may also provide services for the human resource management platform 100 such as creating, reading, updating, and deleting data. Aspects of the human resource management platform 100 that may use data access components include, without limitation, internal applications, business services, external applications, and the like. Data access components may be implemented by building XML documents from SQL/JDBC results sets.

The human resource management platform 100 may include a plurality of data access components wherein each component may provide data access services as herein described for different data sources. For example, a data source such as a third party employee insurance database may require a different set of data access functions than an internal employee vacation accounting database. Reading a record from the external insurance database may include mapping data such as employee insurance member ID so that automatic premium payments may be properly credited by the human resource management platform 100.

As changes are made to data sources, an associated data access component may, or may not, need to change to support the changed data source. In an example, a data source that is changed to include security features associated with a user interface of the data source, may not impact the data access component for that data source. Whereas, a data source that changed field names or definitions may impact a data access component, requiring a new mapping between the data source and the human resource management platform 100 functions or business services accessing the data source. Data access components may combine, dissect, generate, and persist XML documents to facilitate business functions and services performing tasks.

The user interface gives end users information they need to make decisions, and those decisions ultimately result in changes persisted in the database. This section describes Workscape Technology Platform capabilities that enable our application suite to maintain and store data accurately and efficiently.

The platform 100 may include an object model and may implement object-relational mapping. Application logic may be centered in a business logic layer 204 on a server, such as in an object model implemented in Java. Generally, a good object design combines state and behavior. In the platform 100, the behavior may be embodied in business logic and encapsulated in object methods. When changes to data associated with the model are committed, the object state is translated to the database in an automated fashion, such as by using JBoss Hibernate, an object-relational mapping tool. Hibernate is an example of a tool that can be adapted to successfully manage large amounts of data, such as by revising code to enhance the tool.

Transactions with the model and database may be most effective if they are controlled outside the business logic layer 204. In the platform 100, transactions are initiated before application logic is invoked and the application logic signals synchronization points to the persistent database 114 so that the actual transaction management is performed by the underlying persistence layer 208, adding security and robustness to the platform 100.

The platform 100 provides support for enterprise level and down market small size client deployments. Features of the platform 100 may minimize effort for deploying to low-complexity clients, such as alternative data input, no customization, limited configurability, deployment options, and the like. Alternate data input may include input via spreadsheets so that clients with limited volume and complexity may be able to provide their data through spreadsheets that may be supplied with the platform 100. The spreadsheet may have embedded functionality that automates the transformation and loading of information, giving the customer more control and limiting deployment or startup effort. Because customizations take time and expertise they add to implementation costs. When client requirements fall within the range of configurability of the platform 100 (e.g. within run-time configurability), the platform 100 can be quickly configured and programming may not be required. Further, when client requirements can fit within a limited set of configurable options, the time to configure the system is reduced, and some configuration responsibility may be transferred to the client. Testing time may also be drastically reduced. As described above, the platform 100 may store each client data in its own schema, which facilitates easier deployment through a template approach for configuration, installation, and use, and template use for supporting third party data configuration ERPS, such as SAP, and the like.

The deployment of the platform 100 may involve a single package of files and several scripts to complete integration with a client environment. One or more business applications can run on a computing resource, such as a virtualized resource, with one or more clients being served by the applications. A database server can host multiple client deployments per database instance or place clients in a separate database instance. The platform may support deploying all components of the platform 100 on dedicated hardware, or packaged into an appliance for remote hosting within a firewall protected network. Deployment may also support deploying different portions of the platform (presentation layer, business application layer, model layer, and data persistence layer, for example) to be executed on different systems to facilitate distributed processing environments.

The human resource management platform 100 may include a user interface that may be accessed through a web browser of a computer such as a networked computer facility. The user interface may include various screens for facilitating a user interacting with the platform 100. In addition to the various screens as herein described for interacting with applications, and the like, the user interface may also facilitating issuing alerts to users. Alerts may be issued based on a range of criteria that is described elsewhere herein. An alert issued through the user interface may include a configurable visual indication on a computer display such as a pop-up window, or other visual notification. The alert may include a configurable audible aspect as well that may play through a speaker system of the computer through which the user interface is accessed. Alerts may be context specific so that an alert issued through the user interface may be based at least in part on the current activity of the user. In an example, a visual alert of a violation of a budget guideline may be presented to the user while the user is modifying budgets. Alerts may also be included in real-time decision support features of the human resource management platform 100.

The user interface, or one or more portions of the user interface, may be based on computer programming technology including without limitation DHTML, ADOBE FLEX, AJAX, JAVA, JAVASCRIPT, ADOBE FLASH, a combination thereof, or a combination of one or more thereof and other computer programming languages, constructs, technology, images, graphics, menus, and the like.

Alerts presented through the user interface may guide the user in such a way that the user can take appropriate action by interacting with the alert. In an example, a user may be changing a budget allocation that impacts another user's budget. An alert indicating that the other user's budget is impacted may be issued to the user and may provide a one-click action button to notify the other user of the budget impact. The alert may also provide a one-click action button to escalate the alert to other users, such as those higher in the user's reporting hierarchy.

The Workscape Technology Platform provides a robust security model that combines an adaptable authentication mechanism with role-based authorization. The platform provides standard integration points for connecting it into the client's SSO of choice. For clients who do not wish to integrate into an authentication service, the platform supplies an alternate username and password authentication model, with configurable password generation and management. Authorization is controlled by configuration of roles and permissions, and associating roles with individuals or groups of individuals. Permissions are keys that unlock product functionality, and open access to certain type of information to those who hold the permission. Roles can be created and configured that bundle together sets of these permissions, and then the roles can be assigned to individual users or assigned automatically to those who meet certain criteria. The platform automatically resolves the permissions granted to a user when the user logs in, and enforces the data visibility and functionality restrictions at a very low level, below where configuration or business logic operates. Permissions are used to control visibility to data at a low level in the architecture. Queries into the database are filtered at a low level, to avoid pulling information into the system that the user is not authorized to access.

Authorized users are recognized when they log in and are presented with additional administration functions based on their roles. Administrators may have access to functionality, or read-only access to certain employee data, or full rights to act as certain employees. Certain administrators may also be able to affect runtime configuration parameters of the application, changing its behavior in real time. The human resource management platform 100 may include information that is confidential and personal about employees, employers, corporate or business plans, and the like. To facilitate providing appropriate protection of such confidential and personal information, the user interface of the human resource management platform may include security services. Security services such as unique user names, user login names, secret passwords, authority access levels, and the like may be embodied in the human resource management platform 100. The user interface may include initial login validation through a secure access method such as requiring a potential user to enter a user name and associated secret password. This first level of security may be configurable through one or more services such as UpdateUser, ProcessLogin, and CancelLogin. An authorized administrator may access one or more of these services to establish and manage user accounts for the purposes of securing the human resource management platform 100 login processes. Alternatively, one or more of these services may be automated and may be invoked by a user interacting with the human resource management platform 100 through a login screen of the user interface. In an example, an administrator may invoke the UpdateUser service to change a user password, such as in response to a request from the user. In another example, a user may successfully login to the human resource management platform 100 with a valid username and password and manually invoke the UpdateUser service to change an aspect of the user's account (e.g. password). A user manually invoking UpdateUser may be considered a self-service aspect of the human resource management platform 100. Services such as ProcessLogin and CancelLogin may be invoked automatically. In an example, a user selecting a 'login' type button on a login screen of the user interface may automatically invoke the ProcessLogin service to perform user credential validation. If the credential validation fails, CancelLogin may be automatically invoked. Manual use of these services may support an administrator creating login credentials for a user account (ProcessLogin) or removing a user (CancelLogin).

The human resource management platform 100 may include publication change services to facilitate publishing changes to data or data elements. Changes to data, such as databases of the human resource management platform 100 that are made by both internal and external applications may be published. In an example, an internal application that makes a change to employee email contact information may publish that information so that subscribers to the publication change service may receive the updated employee email contact information. Similarly, an external application, such as a third party health insurance application, may publish information about changes to employee status (e.g. change in coverage selected, change in coverage status) and the like. Publication change services may also provide queue management for subscribers to the service so that a higher priority publication may be pushed higher in a queue of a subscriber than a lower priority publication. In this way, urgent changes or changes that may be required to fully support subsequent changes may be processed before less urgent or dependent changes. Internet publication and change notification methods such as RSS may be supported by the publication change services of the human resource management platform 100.

The human resource management platform 100 may use a publication change service to manage subscription to third party or external applications to facilitate receiving information. The business functions and other element of the human resource management platform 100 may use the publication change services to facilitate timely updating any externally supplied data used by the business functions. Such inbound data may be published to the human resource management platform 100 with certain policies and attributes determined by the source system of the data. The publication change services may process the attributes to ensure compliance with the policies is maintained as data is published within the human resource management platform 100. Publication methods such as RSS may be included in the publication change services inbound capabilities.

Publication change services may work cooperatively with other elements of the human resource management platform 100 so that the publication change service may receive a confirmation of receipt from the other elements. Alternatively, the publication change service may issue announcements or push changes to subscribers without accepting or requiring a confirmation of receipt.

The publication change services may monitor a data repository or some portion of a data repository so that any changes made to the data repository can be published. Monitoring may be based on events—such as changes, on a schedule—such as each hour, on a request—such as a business function initiated subscription request, and the like. Although the publication change services may monitor a data repository to detect changes to the repository, the publication change service may be configured to only publish certain data elements or classes of elements. In an example, a data repository that contains employee confidential and non-confidential information may be monitored, yet only changes to the non-confidential information may be published when a change is detected. The human resource management platform 100 may support data in a data repository that can be published without using the full capabilities of the publication change services. In an example, data in XML file format in a data repository may be published to applications of the human resource management platform 100 that use XML formatted data simply by transferring the XML formatted data to the applications.

Elements of the human resource management platform 100, such as internal applications, business services, business functions, data access components, platform services, publication change services, and the like may use XML or JAVA to communicate. XML Schema such as OAGIS 8.0 and HR-XML standards may be employed in communications. Communications may also be accomplished by forming, exchanging, and decoding Business Object Documents that may themselves be encoded in XML. A business object document of the human resource management platform 100 may include an application area (e.g. for identifying a sender) and a data area (e.g. for defining a business operation).

A business object document may include an XML verb—such as add, delete, lookup, and the like, and a noun—such as a data value, data field, and the like. A business function or service receiving the business object document may use the data referenced in the noun to perform the function described by the verb. In an example, an UpdateDependents verb with a Dependent noun may add the name of the dependent to the employee's list of dependents. The business service or function that performed the UpdateDependents may provide a business object document response that includes information such as date of update, status of the update, flags or messages returned by the business service, and the like. The business object document communication flow may include request-response XML verb pairs that define a service method. In an example, a lookupDependents business service method accepts an XML document conforming to the LookupDependents schema and responds with an XML document conforming to the ShowDependents schema. Communicating through business object documents also facilitate making changes to functions, services, and applications, such as program or algorithm changes, without having to change aspects of the communication or the interfaces to the human resource management platform 100 elements.

Business object documents may be used in communication between the human resource management platform 100 and external services, applications, users, devices, and the like. To provide security, and maintain compatibility with industry standard messaging and communication systems, a business object document may be wrapped in an envelope such as is used in web service requests defined by S O A P. Security, error checking, and the like may be supported by through the enveloping process, thereby allowing the human resource management platform 100 elements to focus on the content of the business object document.

The human resource management platform 100 may also include business services to provide service to applications. Business services may include managerial services for managing proxies and authority delegation, payroll services for processing employee related pay, compensation services for planning and managing compensation plans and programs, benefits services for beneficiary and dependent management, communication services for handling corporate communications, corporate services for corporate wide data such as job descriptions and directories, worklist services for individuals to access work items, self-service services for employees to access and maintain information, security services for managing users and access, budgeting services for administering and monitoring budgets, reporting services, integration services for providing transfer management, hierarchy services for establishing and maintaining employee hierarchies, process services for defining and monitoring business processes, and performance management services for facilitating performance rating and goals management.

The platform may support off-cycle changes to any aspect of compensation, performance, and benefits. Off-cycle changes may be integrated with focal transactions so that a user, such as a manager, may access and maintain both off-cycle and focal transactions through a single user interface. Such integration may facilitate giving a manager the ability to plan all compensation changes for an entire compensation cycle (e.g. one calendar year) through a single interface. The same interface may be used throughout the year for off-cycle changes and maintenance, such as for approving a compensation plan and for acting on the approved plan. The single user interface for focal and off-cycle changes may also be facilitated by budget sharing, application logic and rule sharing, and the like. In an example, an employee may achieve a performance goal that has associated with it a compensation increase. The employee achieves the performance goal in May and the next on-cycle compensation adjustment is December, so the employee's manager initiates an off-cycle change. The manager may use the single interface herein described to perform all the necessary steps to execute the off-cycle adjustment. In this example, because the compensation adjustment is included in the compensation plan since it was tied to a performance goal, the manager may review and approve the change to the employee's compensation plan through the single interface. The manager may, within the same interface establish any new compensation plans, such as any changes that may be approved at the end of the current compensation cycle. A single interface for focal and off-cycle compensation, performance, or benefits changes and maintenance eliminates needing to learn separate interfaces for off-cycle and on-cycle compensation planning and maintenance activity. The single interface also allows automatic coordinated access to plans and budgets, rather than using a disconnected off-cycle system, such as separate spreadsheets. Such disconnected or off-line methods prove impractical and error prone when applied to organizations with a large number of employees.

The human resource management platform 100 may include applications targeted to solve a variety of human resource, compensation, and performance management problems. Applications of the human resource management platform 100 may include business applications such as performance driven compensation. A performance driven compensation application may provide a single solution for driving employee performance and organizational success by automation of goal setting, performance measurement, and employee rewards by directly linking performance results to rewards. By joining compensation planning and goal and performance management, a performance driven compensation application may facilitate extending pay for performance programs throughout an organization. Applications of the human resource management platform 100 may be implemented based on various technologies to provide easy integration. In an example, applications may be written in the Java programming language, and they may be built as a web-based system with a user interface using ADOBE FLEX technologies.

A performance driven compensation application may provide a variety of features to achieve pay for performance integration in an organization. A user interface of the application may include presenting all relevant information, feature selection, notifications, and user information on one computer display screen. Such a user interface may facilitate operation and training to operate the application, while preserving time efficiency during use or maintenance.

The application may include integration with other applications of the human resource management platform 100 as herein disclosed. Integration may facilitate providing visibility for the user and the features of the application into Key Performance Indicators (KPI) that may improve control and governance as can be determined through KPIs. Integration of compensation planning with performance driven compensation may provide additional benefits to strategic and tactical, or short term planning activities. In an example, visibility into the current performance of an organization may facilitate compensation planning for the organization. An organization that is performing above expectations as determined perhaps by KPIs, can be anticipated to continue to perform above expectations in a future compensation period being planned.

Goals management, a crucial aspect of performance driven compensation may be supported in the human resource management platform 100 through goal achievement planning and assessment within a corporate objectives setting. By providing visibility into goal achievement, the human resource management platform 100 can apply performance driven compensation so that it can be tracked to corporate objectives. By linking, such as through visibility, goal achievement and corporate objectives, performance driven compensation can facilitate driving compensation to groups or individuals in the corporation who contribute to corporate objectives. Although managers and other participants in the human resource management platform 100 may have flexibility in some aspects of compensation allocation, compensation for goals achievement focused on corporate objectives can be automated within a performance driven compensation application.

Another aspect of performance that may be included in a performance driven compensation application is competency management. Competency management studies, tests, and other measures may be associated with performance driven compensation through competency libraries or standards. Competency libraries or standards may be established within an organization using the human resource management platform 100, or may be supplied by or facilitated by a third party. The human resource management platform 100 may provide, such as through data access components, access to external competency libraries that may be available through professional certification programs and organizations, government agencies, industry watch dog groups, trade unions, and the like. A performance driven compensation application may provide competency management a place within an assessment scheme so that compensation can be driven based at least in part on competency. In an example, an electrician may be required to take a test to be certified to work in the state of Massachusetts. The tests may provide assessment for basic certification for a journeyman electrician, and advanced certification for a master electrician. An employee's compensation may be impacted by his/her level of certification. In another example, another state, such as New York may have similar tests, yet the assessment criteria may be somewhat different. Competency libraries may facilitate compensating a master electrician in New York equitably with a master electrician in Massachusetts by establishing a consistent relationship between the external certification of each state and the performance driven compensation guidelines within the human resource management platform 100.

When goal management and competency management are aligned, performance driven compensation plans may be improved. In an example, when an employee's goals include competency preparation and assessment, they are in alignment. Therefore, an employee who focuses on competency is also focusing on goals. Compensation aspects of competency management may be automated in a performance driven compensation application of the human resource management platform 100.

A performance driven compensation application may also include features to facilitate employee development planning Features for employee development planning may include automated evaluation workflows to facilitate timely performance reviews. Performance reviews are often delivered late, and with less specificity than needed for efficient use of a performance driven compensation application. However, the implications of late performance reviews extend beyond an impact on a human resource management platform 100. Implications can include performance and achievement deficiencies, and increased anxiety of employees. Ensuring timely performance reviews may provide timely input to a performance driven compensation application regarding performance related aspects of compensation. It may also give an employee an opportunity to receive some performance review input even if a manager may be delayed in completing a subjective or written portion of a review.

If compensation in the human resource management platform 100 is based at least in part on a measure of employee performance, then timely employee performance reviews can also provide needed measures of the employee performance. In an example, an employee review may be required for the employee to receive an annual compensation adjustment that may include a performance bonus. An automated performance review workflow may provide at least some of the measures of the employee performance when needed to deliver a timely compensation adjustment and/or performance bonus. At least some of the measures may include deliverables identified in the employee's performance plan such as may be defined in a goal management, competency management, KPI, and the like. Automated performance review workflows may also automatically identify manager performance measures such as when a manager does not complete a performance review on time.

Automated performance review workflows may integrate with other aspects of the human resource management platform 100, or other applications such as time scheduling and management applications by providing an integrated task inbox. Linking aspects of the human resource management platform 100 through an integrated task box may facilitate a manager viewing how completion of each task, such as completing a performance review, can impact other tasks. Likewise an integrated inbox may provide a mechanism for a manager to view how a late performance review can cause other tasks that depend on the performance review completion, can become overdue, or otherwise critically impact aspects such as planning cycles, dispersing bonuses, and the like.

The human resource management platform 100 may facilitate automated performance review workflows through the use of online evaluation forms. The online evaluation forms may be integrated with the other aspects of the human resource management platform 100 such as goals management, competency management, KPI, corporate objectives, compensation plans, and the like to facilitate use and data consistency throughout all the aspects of human resource management supported by the human resource management platform 100. Online evaluation forms may include configurable performance review forms that support the best practices of the corporation. Aspects of the forms may be configurable specifically to ensure best practices are observed, while other aspects of the form may be configurable to support individual manager or employee needs.

The human resource management platform 100 may also support online evaluation form creation and management. The human resource management platform 100 may also support template based creation of online evaluation forms. In an example, a template may identify specific configurable areas of an evaluation form that may be specified by a facilitator of the human resource management platform 100. These areas may include corporate best practices, industry or government standard review criteria, employee based information from other aspects of the human resource management platform 100, and the like. The template may also include user configurable areas that may be configured by a manager and/or an employee to support aspects of performance review not covered elsewhere in the form. In an example, a goals achievement portion of a performance review may be identified in a template as restricted from manager or employee changes because the information would be imported from the goals management portion of the human resource management platform 100.

Online evaluation forms may facilitate harmonizing performance evaluation across departments, business units, geographies, subsidiaries, languages, and international laws, while offering the flexibility to support a wide variety of management styles, employee input, performance driven compensation plans, and the like.

A performance driven compensation application may include reporting facilities. Reporting may include standard reports and ad hoc reporting capabilities to support a wide range of reporting requirements. Reporting and analytics that may be integrated with the performance driven compensation application within the human resource management platform 100 may facilitate easy access to actionable data and analysis results. In an example, an analysis of compensation, such as a gap analysis, may be included in the performance driven compensation application so that the gap analysis may be reported per employee, per group, and the like. The report may include data that is associated with aspects of the human resource management platform 100 such as compensation plans, payroll activity, hold backs, bonus calculations, performance based compensation, goals achievement, and any other information that may provide actionable analysis of compensation gaps.

The human resource management platform 100 may include audit features such as audit trails and feedback logs. Audit features may be associated with the performance driven compensation application. Audit features may support establishing audit monitoring tools to facilitate automated auditing of transactions associated with the platform. Automated auditing may facilitate compliance with accounting and other standards such as Equal Employment Opportunity Act of 1972, Sarbanes Oxley, OSHA, Fair Labor Standards Act, Minimum Wage Standards, and the like. Auditing may include confirming an effective payroll function has been established, all employee data in the system is accurate and appropriate to the personal issues of the employee, confidentiality of personnel data is maintained, payroll data is completely and accurately accumulated in underlying financial records in the proper accounting periods, salary and other payments to employees (e.g. basic payments, additions to basic pay, bonuses, performance based compensation) are properly calculated and authorized, tax legislation is being followed (national and local legislation) entry verification, users are identified and their actions tracked, payroll costs are in line with budgeting objectives, and the like. Audit trails may facilitate recovery of entries, downloads, and changes in data associated with the platform 100. Feedback logs may be associated with the performance driven compensation application so that any form of feedback such as employee feedback, auditor feedback, visitor feedback, manager feedback, and the like may be recorded. Feedback logs may periodically reviewed by management, an administrator of the performance driven compensation application, or other participant in the platform 100. The review of feedback logs may be automated by a computer system performing keyword matching of feedback logs against a list of critical keywords or phrases. This may allow a feedback log entry that meets a criterion associated with keyword and keyphrase matching may automatically be presented to an administrator, management, or other appropriate participant in the platform 100. In this way, although all feedback logs may be recorded and permanently stored, those meeting an escalation criterion are sure to receive a human review by the appropriate person.

The performance driven compensation application may facilitate configuration of performance programs. Performance programs may be configured by a participant of the human resource management platform 100 such as a client. Performance program configuration may include configuring compensation plans, future accounting periods (e.g. upcoming year performance target plans), and the like. Configuration options associated with the performance driven compensation application may accommodate complex compensation plans, such as plans that incorporate goals management, competency management, employee development planning, employee performance reviews, performance based bonus, automated bonus payment, and the like.

The human resource management platform 100 may be associated with input compliance verification facilities. Compliance of input may be valuable and useful to a performance driven compensation application by providing spelling checking, legal language checking, and the like. Compliance of input verification may include verifying input meets corporate and legal standards (e.g. minimum wage standards), and the like. Spelling checking may facilitate reducing mistakes in data records such as employee names. In an example, an employee name being input may be compared to all valid employee names and the input may be flagged for further verification if it does not match any of the valid employee names. This may also be useful to help distinguish between similar employee names, such as employees Robert Smith from Bobby Smith when the name Bob Smith is entered. Legal language check may facilitate ensuring that comments, goals, or other performance-related information or other requirements on which performance may be based does not violate any regulations, corporate policy, contracts, and the like. In an example, in describing an employee, a manager may choose an inappropriate word to describe her or her performance. As a system of record for this information, the application will prevent the user from committing this information to the database until the offending word is removed. This may provide visual, audible, and other alerts to the user making the input.

A performance driven compensation application may include support for complex organizations. Large corporations and other large entities are commonly organized as a matrix that includes multiple levels of hierarchy for reporting, performance, planning, and compensation. Therefore, by supporting multiple levels of hierarchy and matrix organizations, the performance driven compensation application may meet the critical needs of large organizations. Hierarchy and matrix support may include individual hierarchy (e.g. employee-manager), group or division hierarchy (e.g. department within a group within a division), entity hierarchy (subsidiaries), and multi-national ownership (e.g. Daimler Chrysler), municipal (school dept within a town government), and the like.

Career development may be associated with the human resource management platform 100 such as through a performance driven compensation application. Career development may be useful and beneficial to employee career planning by providing a visible or tangible benefit to achieving a level of performance included in the modeling. The performance driven compensation application may allow employees to interact with the platform 100 to model various career alternatives based on aspects of performance such as competency, goals, performance, development, promotion, and the like. In an example, an employee who is interested in achieving a promotion to a senior contributor position may view the performance, goals, competency, and other requirements of the position through the platform. The employee can further model his/her career for achieving various aspects of the requirements, such as taking and passing a professional exam or other competency measurement.

A human resource representative, manager, or the like may use compensation modeling because it can streamline evaluation of compensation alternatives. In an example, a manager may model compensation for his department based on alternatives such as goal achievement to determine how he can keep within compensation guidelines or rules and yet provide an environment for compensation growth for the employees in his department. The manager may use the information gained from the modeling to guide individual employees such as through a performance or development plan associated with the performance driven compensation application.

The performance driven compensation and benefits business application may include a user interface for inputting and presenting compensation related information. The user interface may present a single screen of information that may allow a user, such as a manager, to perform at least essential functions related to compensation planning and management. The single screen may alternatively allow a user to view and interact with all of the information related to compensation planning and/or management. The single screen may combine the functionality of several related but independently presented screens in contemporary compensation planning systems. By including and effectively presenting the information and functionality of several screens into one, an entity using a performance driven compensation and benefits application may realize substantial time and cost savings, particularly when the platform 100 supports thousands of employees.

The user interface of the performance driven compensation and benefits application may be configured to present compensation information, receive user input, and direct the user input to the functional modules of the platform 100, resulting in one or more updates of the information presented in the user interface.

The performance driven compensation and benefits application user interface for inputting and presenting compensation related information may be configured with additional support screens that may be displayed in coordination with the single screen. The support screens may facilitate presenting information associated with compensation planning and/or management that may not be presented on the single screen. Associated information may include calculations of information presented in the single screen. The support screens may present information used to derive the data presented in the single screen such as formulas, rules, guidelines, sources of information, pending information, and the like. The support screens may also facilitate inputting information that may affect the single screen or the compensation application, but may not be necessary to display on the single screen, such as an employee's social security number, or an employee's educational degree, and the like. This information may facilitate identifying the employee who is the subject of the compensation planning activity on the single screen. Information such as the number of employees having similar job functions, their average salary, and the like are other examples of support screen information.

Figure 10:
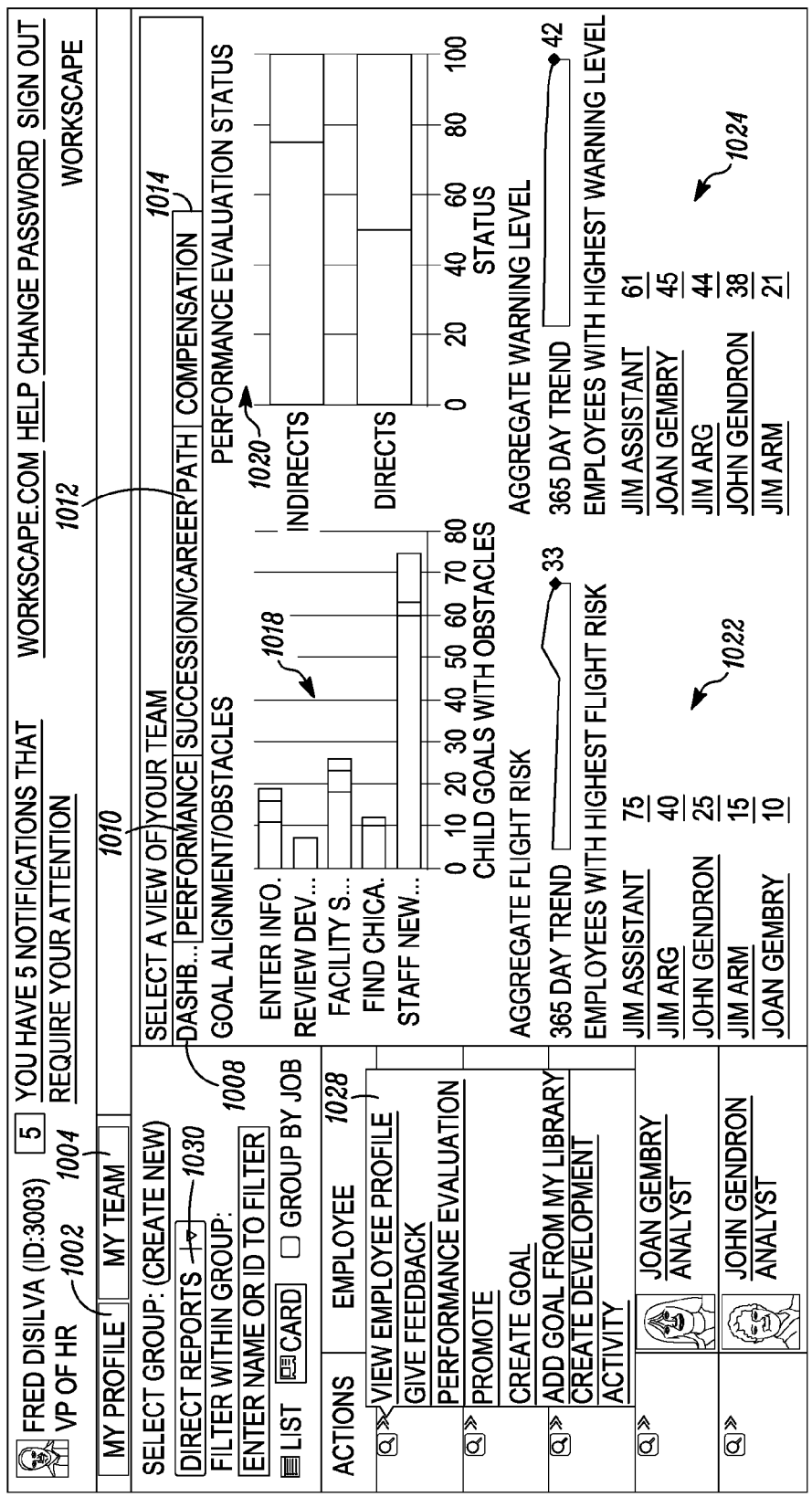
FIG. 10 depicts a dashboard view of a team in a human resource management system.

Referring to FIG. 10, the human resource management system 100 may be accessed by a user interface. The user interface may be used to view an employee profile 1002 or a team profile 1004. In either view, an employee may have access to a dashboard view 1008 of selected functions, measures, and the like, or may switch the view to the individual performance 1010, succession/career path 1012, or compensation 1014 tabs. In the dashboard view, goal alignment/obstacles 1018 for the individual or team may be displayed, a performance evaluation status meter 1020 may be shown, the aggregate flight risk 1022 for the team may be displayed, the aggregate alert level 1024 for the team may be shown, and the like. Flight risk 1022 may be a quantitative measure for likelihood of leaving the organization which is based on certain factors related to an employee. In an embodiment, certain factors, such as commuting distance, dissatisfaction with salary, limited growth potential, and impending retirement may all factor into flight risk. For example, flight risk may be calculated algorithmically and each factor may contribute incrementally to the calculated flight risk. Factors may be selected by managers or employees. It should be understood that other factors may also contribute to flight risk. The dashboard view may show a ranking of employees by flight risk. Alert level 1024 may be a quantitative measure for evaluating the disposition of an employee. Alert level 1024 may be an algorithmic combination of at least two of number of successors, flight risk, and loss impact. It should be understood that other factors may also contribute to alert level. The dashboard view may show a ranking of employees by alert level.

Figure 12:
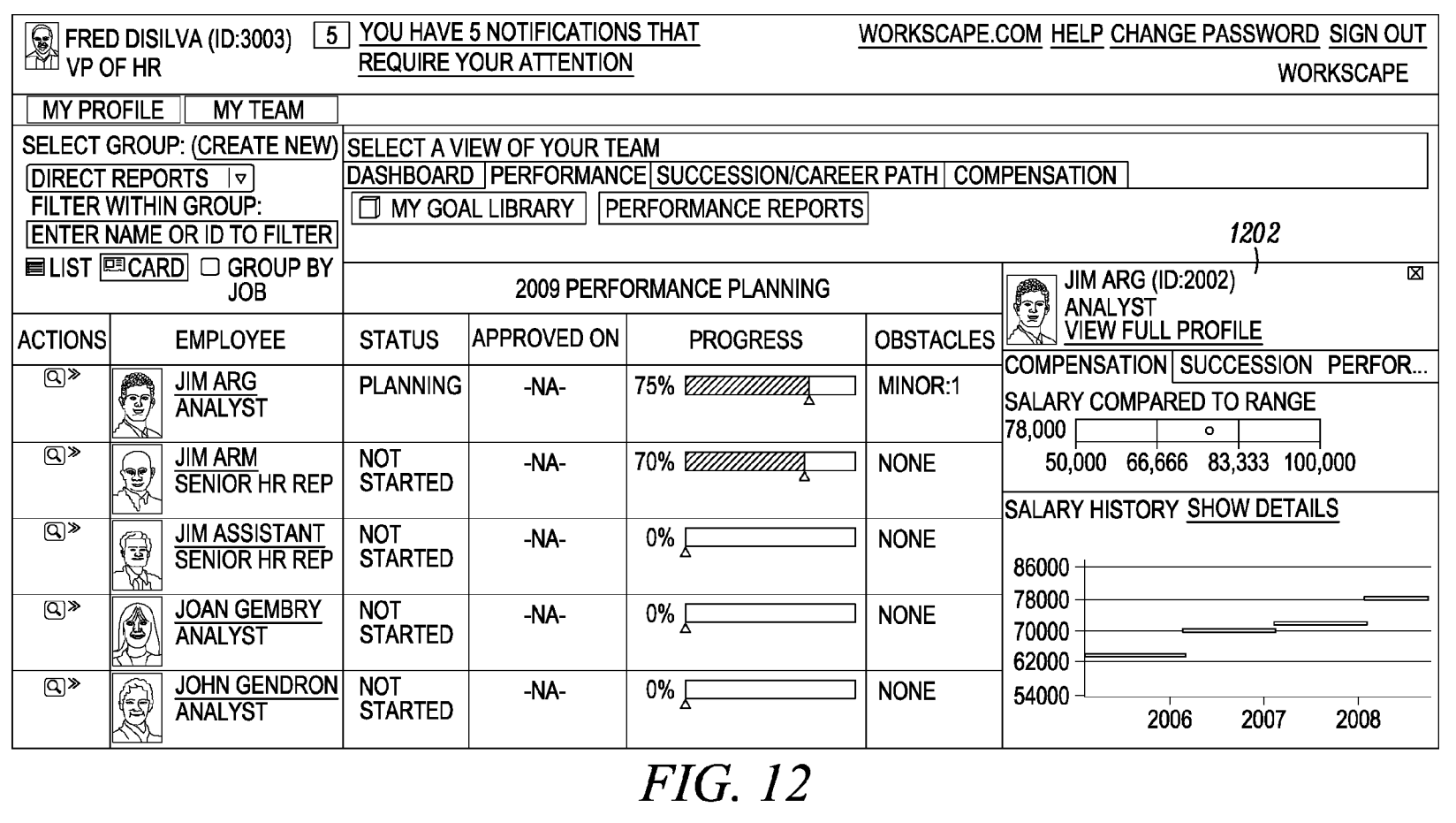

Referring to FIG. 11, a performance tab 1010 in a human resource management system 100 may comprise access to performance reports 1104, access to a goal library 1102, performance planning information 1108, performance ratings 1110, and the like. For example, for each employee or team member, a progress meter 1112 may demonstrate progress towards setting goals for a time period. Goals may be set either by the employee, the manager, or a third party. Status, approval dates, and obstacles associated with performance planning may also be shown. Ratings 1110 may be self-ratings, manager ratings, peer ratings, or third-party ratings FIG. 12 depicts selecting an individual in the performance tab 1010 of a human resource management system 100. While the figure depicts selection of the individual in the performance tab 1010, selecting an individual in any of the tabs of the human resource management system 100 may bring up a snapshot of the individual profile 1202. The snapshot 1202 may have tabs for compensation, succession, performance, and the like. For example, in the compensation tab, a salary meter may show the employee's salary as it relates to a salary range. A salary history over time may also be shown, along with the potential to view additional history.

Referring to FIG. 13, a succession/career path tab 1012 in a human resource management system 100 may comprise access to an organizational chart 1302, a depth chart 1304, a succession report 1308, a Nine Box, number of successors, values for flight risk, loss impact, alert level, and career path, potential, and the like. A Nine Box is a succession report identifying where each individual lies on intersecting continua for potential and performance. Number of successors is the number of other employees who could replace the employee should they leave the organization. Loss impact may be an estimate, either calculated algorithmically or indicated manually, of the impact of employee loss on the organization. Career path indicates the number of potential advancements available for the employee within the organization. Potential indicates how much potential the employee possesses, as evaluated by the manager or other party, such as a high, medium, low, or no potential. Flight risk and alert level are as described previously herein.

Referring to FIG. 14, a compensation tab 1014 in a human resource management system 100 may comprise access to a team plan 1402 or an employee plan, a compensation report 1404, a salary range meter 1408 depicting the current salary with respect to a salary range, a hire date 1410, an indication of FLSA eligibility 1412, and the like.

Figure 15:
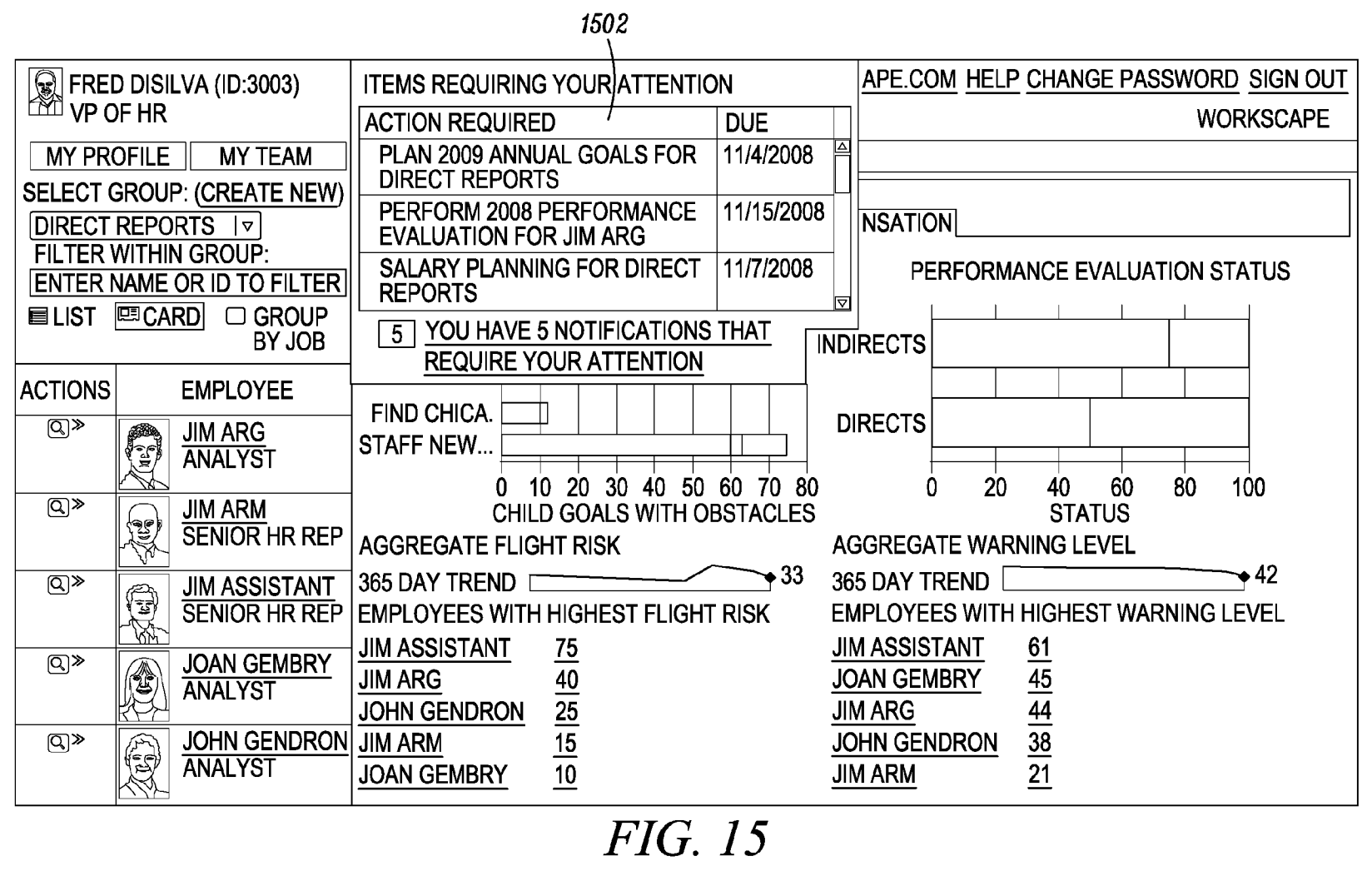

Referring to FIG. 15, a notifications window 1502 of a human resource management system 100 may indicate items requiring the individual's attention, their due date, and the like. For example, notifications may include a reminder to perform a performance evaluation, do salary planning for direct reports, plan annual goals for direct reports, and the like.

Figure 16:
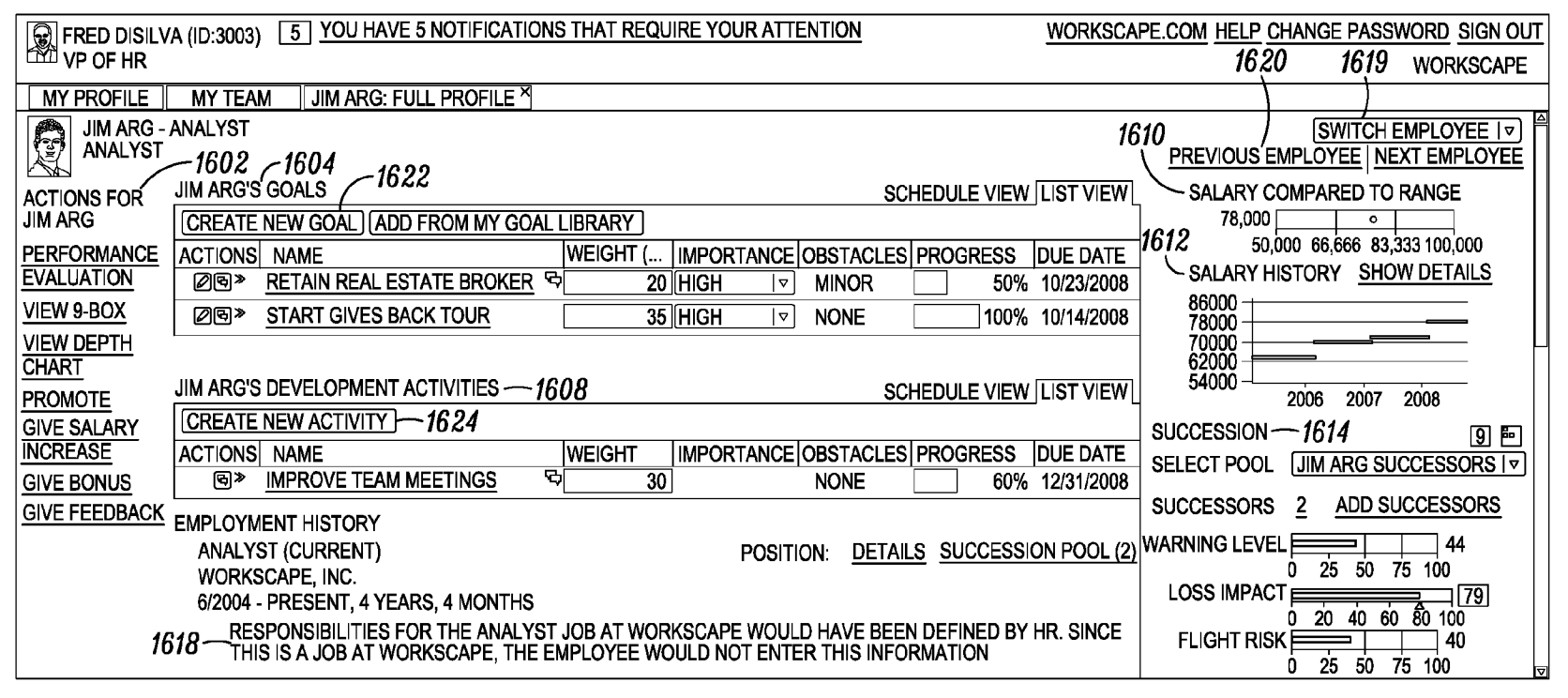

Referring to FIG. 16, a full individual profile of a team member or employee in a human resource management system 100 may include a list of actions 1602 that can be taken for the individual, goals 1604, development activities 1608, salary 1610 as compared to range, a salary history 1612, succession information 1614, employment history 1618, and the like. In the full profile view, a manager may switch employees, such as by using a pull down menu 1619, navigation links 1620, or the like. The manager may be able to create a new goal 1622, create a new development activity 1624, and the like.

Figure 17:
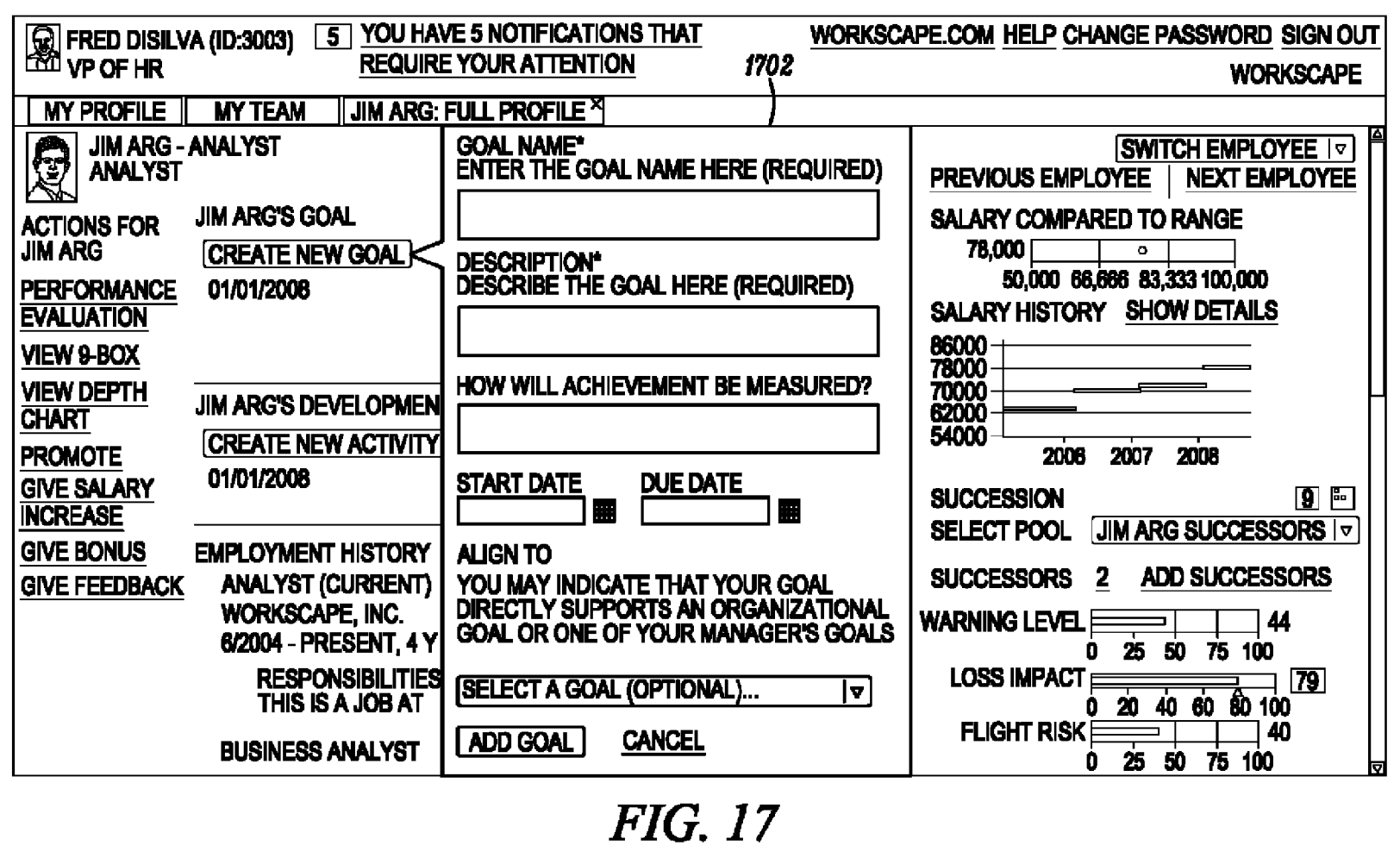
Figures 18A, 18B:
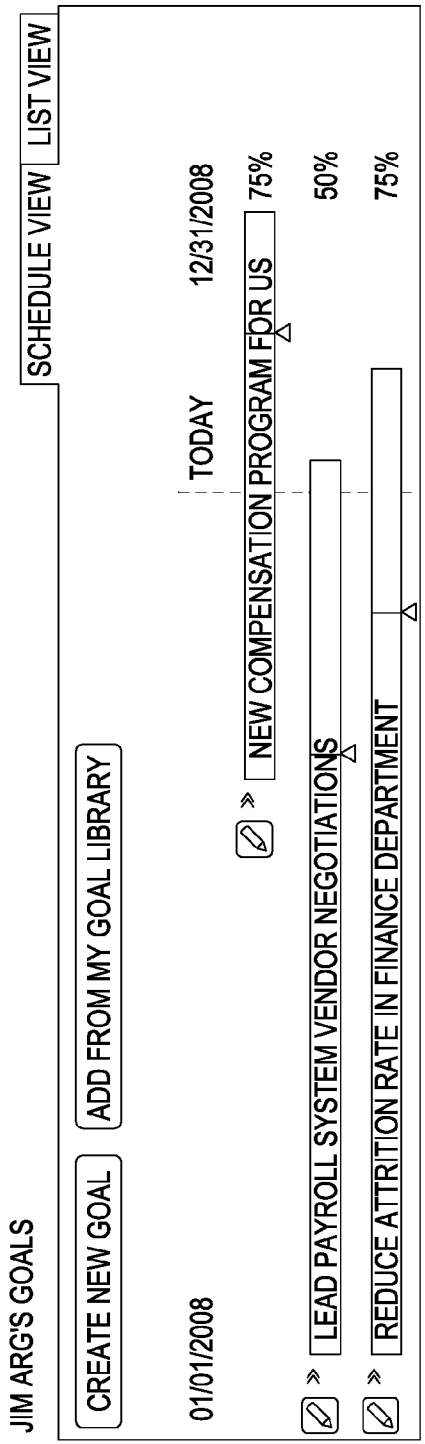
FIG. 18A depicts a list view of a goals section of a profile.
FIG. 18B depicts a schedule view of a goals section of a profile.

For example, and referring now to FIG. 17, when a manager or employee may want to create a new goal, they may select a 'Create New Goal' button, which may cause a new goal creation window 1702 to appear. A Goal Name may be assigned and a Goal Description may be entered. The manager or employee may indicate how achievement will be measured with respect to the goal. A start date and a due date may be given for the goal. The goal may be aligned to another goal if it directly support an organizational goal or a manager's goal. Referring additionally to FIGS. 18A & B, FIG. 18A depicts a list view of the goals section of the profile. In this view, goals may be added from a goal library 1802, actions 1804 may be taken with a goal, the name of the goal 1808 may be shown, the weighting 1810 with respect to other goals, the importance 1812 of the goal, the obstacles associated with the goal 1814, the progress 1818 towards reaching the goal, the goal due date 1820, and the like. FIG. 18B depicts a schedule view of the goals section. In this view, the goal progress is indicated along a timeline.

Figures 19A, 19B:
FIG. 19A depicts a goal library window of a human resource management system.
FIG. 19B depicts a goal assignment window of the goals library.
Figure 20B:
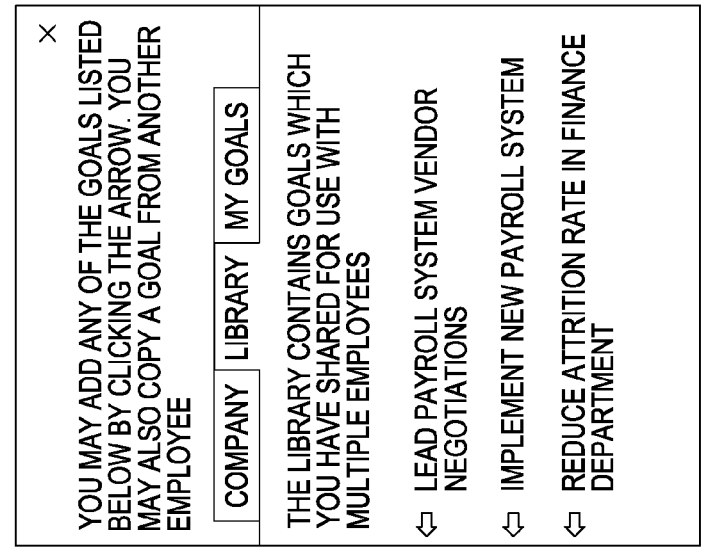
FIG. 20B depicts selecting a goal from the library.
Figure 20A:
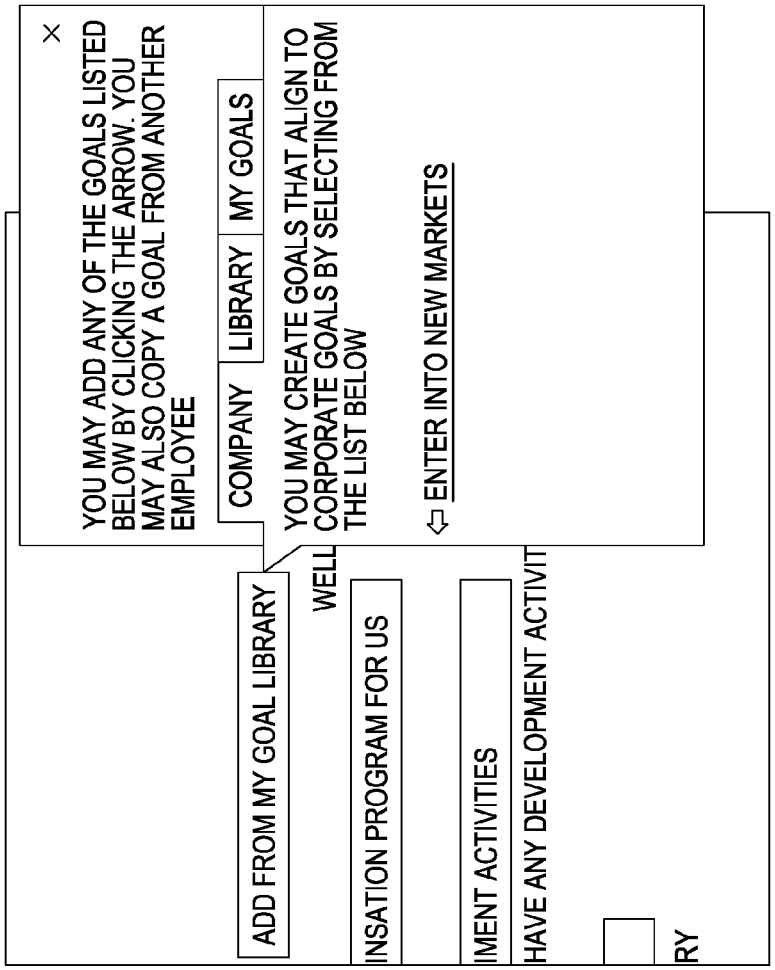
FIG. 20A depicts selecting a company goal.
Figure 20C:
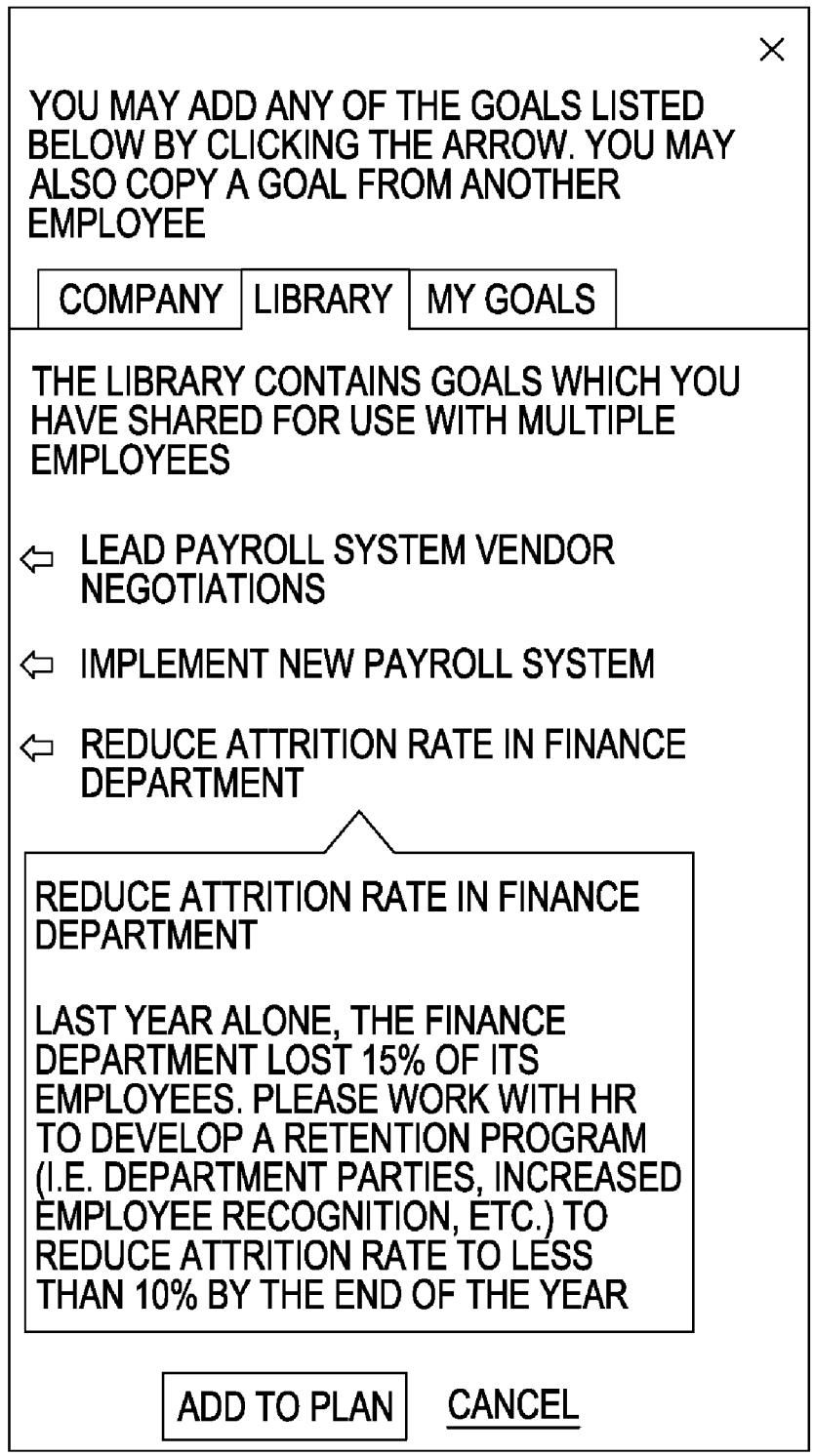
FIG. 20C depicts obtaining additional information about a goal.

Referring to FIG. 19A, a goal library window 1902 may include capabilities for creating a new goal 1922, assigning a goal to an employee 1904, suggesting a goal for an employee 1908, and the like. The goal library 1902 may show the goal name, who the goal is assigned to, who the goal is suggested to, the popularity of the goal, when the goal was last updated, and the like. In FIG. 19B, the goal assignment window 1910 appears after selecting the action of assigning the goal. Assignees of the goal may be selected from direct or indirect reports or the manager herself. The goal may be assigned to multiple employees. Goals may be assigned to an employee or several employees by selecting a name from a list and dragging and dropping the name on to a goal assignment window or selecting the action of assigning the goal. Goals may be added from a library. For example, in FIG. 20A, a goal may be added that is selected from the company goals, a library of goals, as in FIG. 20B, shared for use with multiple employees, the manager's goals, another employee's goals, and the like. Selecting the goal may bring up additional description, as in FIG. 20C, of the goal and the option to add the goal to a plan, to an employee's goals, to a manager's goals, and the like. Managers may be able to copy goals across several employees.

Figure 21A:
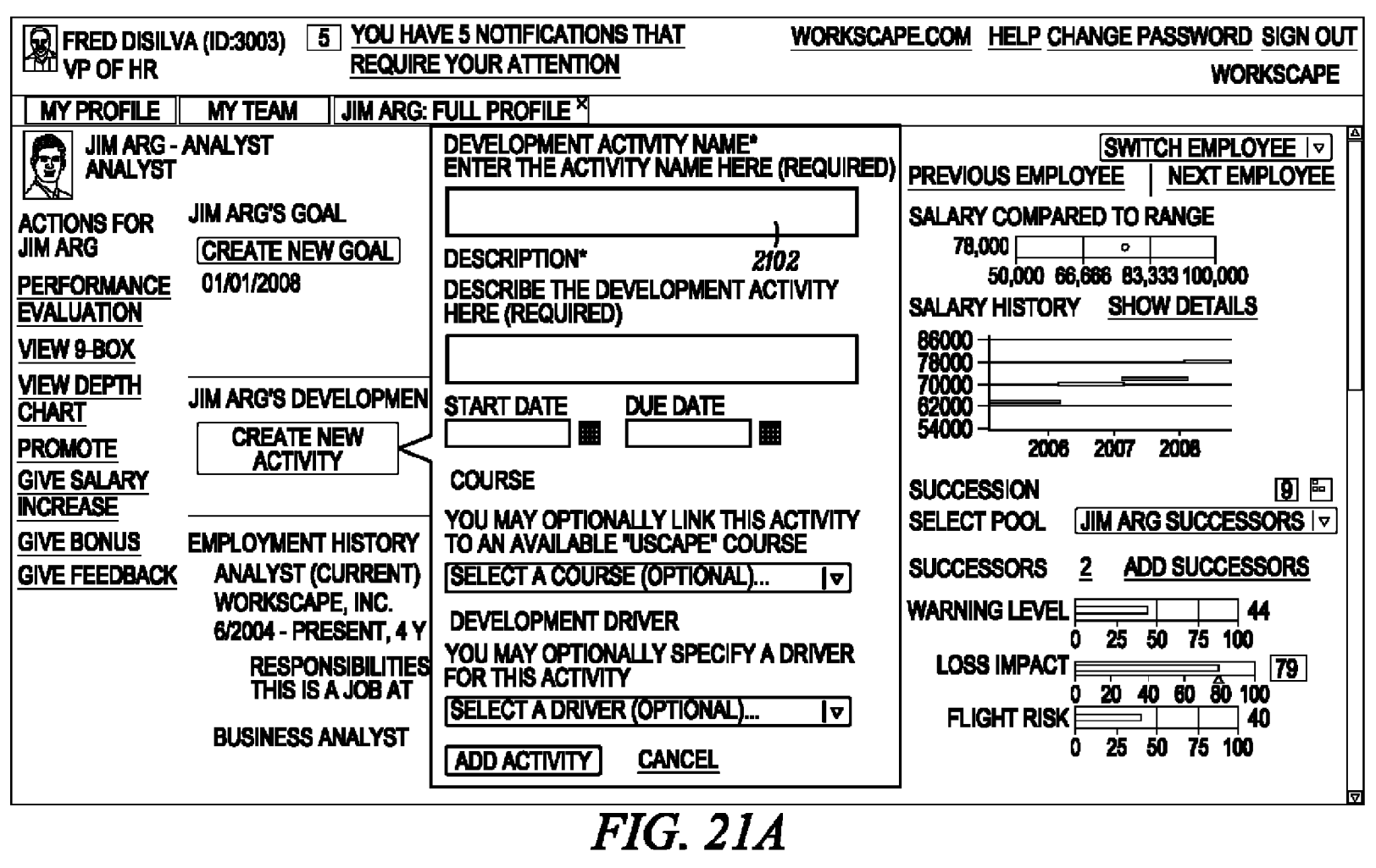

Referring now to FIG. 21A, a new development activities window 2102 may appear after selecting the action of adding a new development activity 1624. The development activity name, description, start date, and due date may be indicated. A course 2104, seminar, meeting, or the like may be linked to the development activity, as in FIG. 21B. A development driver may be specified for the development activity. An option for adding the activity may also be provided. FIG. 21C shows an enlarged view of the development activities section showing the activity added in FIG. 21B on a schedule view.

Figure 22:
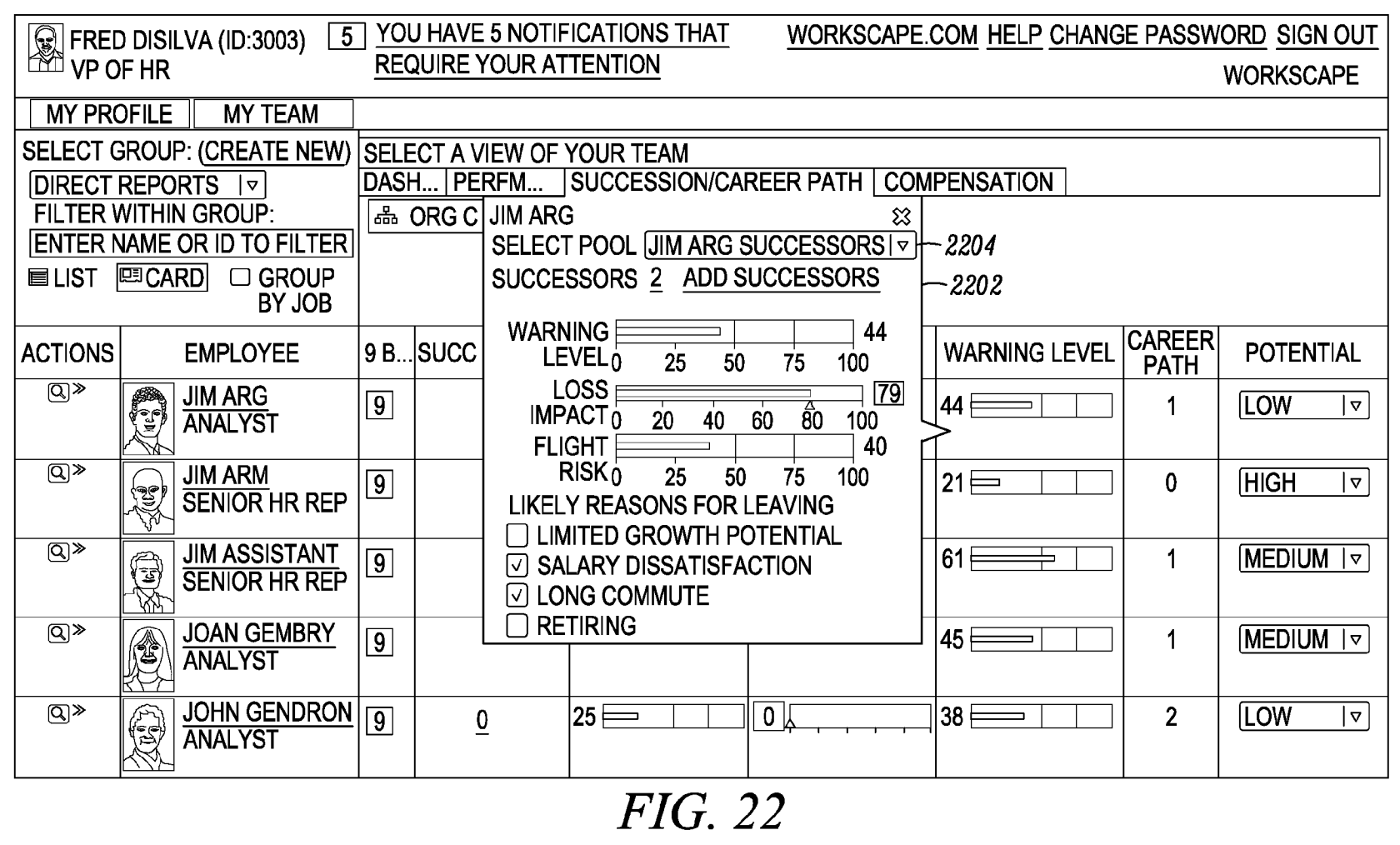
Figure 23B:
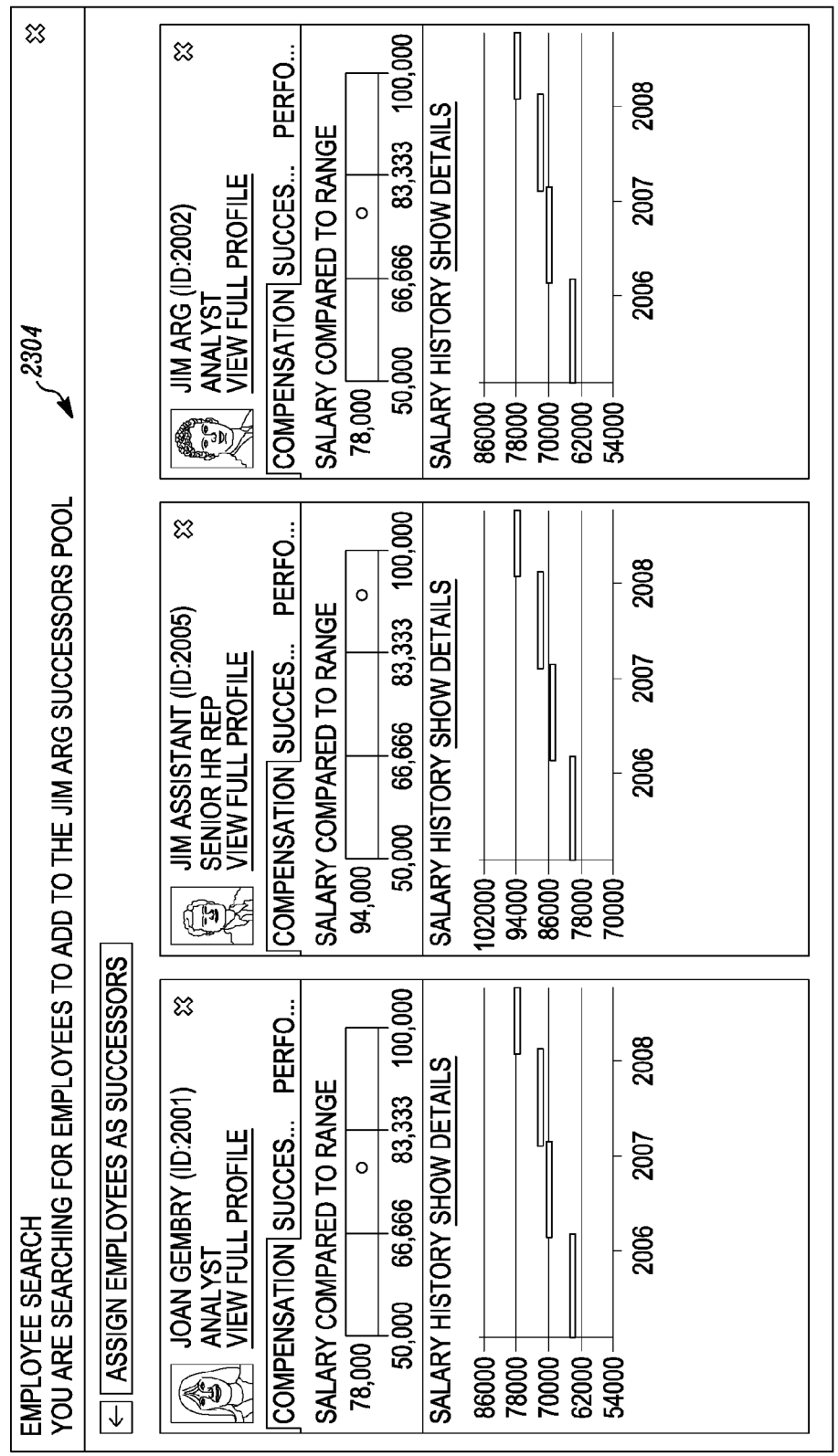
FIG. 23B depicts a result of the search of FIG. 23A.

Referring to FIG. 22, a succession/career path snapshot 2202 of a team member is shown. The snapshot 2202 displays the number of successors, an option for adding successors, an option for switching the view to the employee's successors, alert level, flight risk, loss impact, likely reasons for leaving and the like. A manager or an employee may select reasons for leaving in the snapshot 2202, which get used in the calculation for alert level, flight risk, loss impact, and the like, as described previously herein. FIG. 23A depicts a search window 2302 for searching for an employee to add as a successor. Search may include search by name, search by keywords, search with filters on, such as within certain departments, within the entire organization, only high potential employees, only low flight risk employees, only employees of a certain performance rating, only employees with a certain salary or salary range expectation, and the like. The results of the search may pull up employees. The search results may include the employee's name, job title, promotion potential, willingness to relocate, and any number of other items associated with and/or known for the employee. Options for assigning the selected successor and comparing selected employees are provided. FIG. 23B demonstrates an employee comparison window 2304 of the human resource management system 100. For instance, snapshots 1202 of multiple employee profiles may be shown in an adjacent view for comparison.

Figure 24:
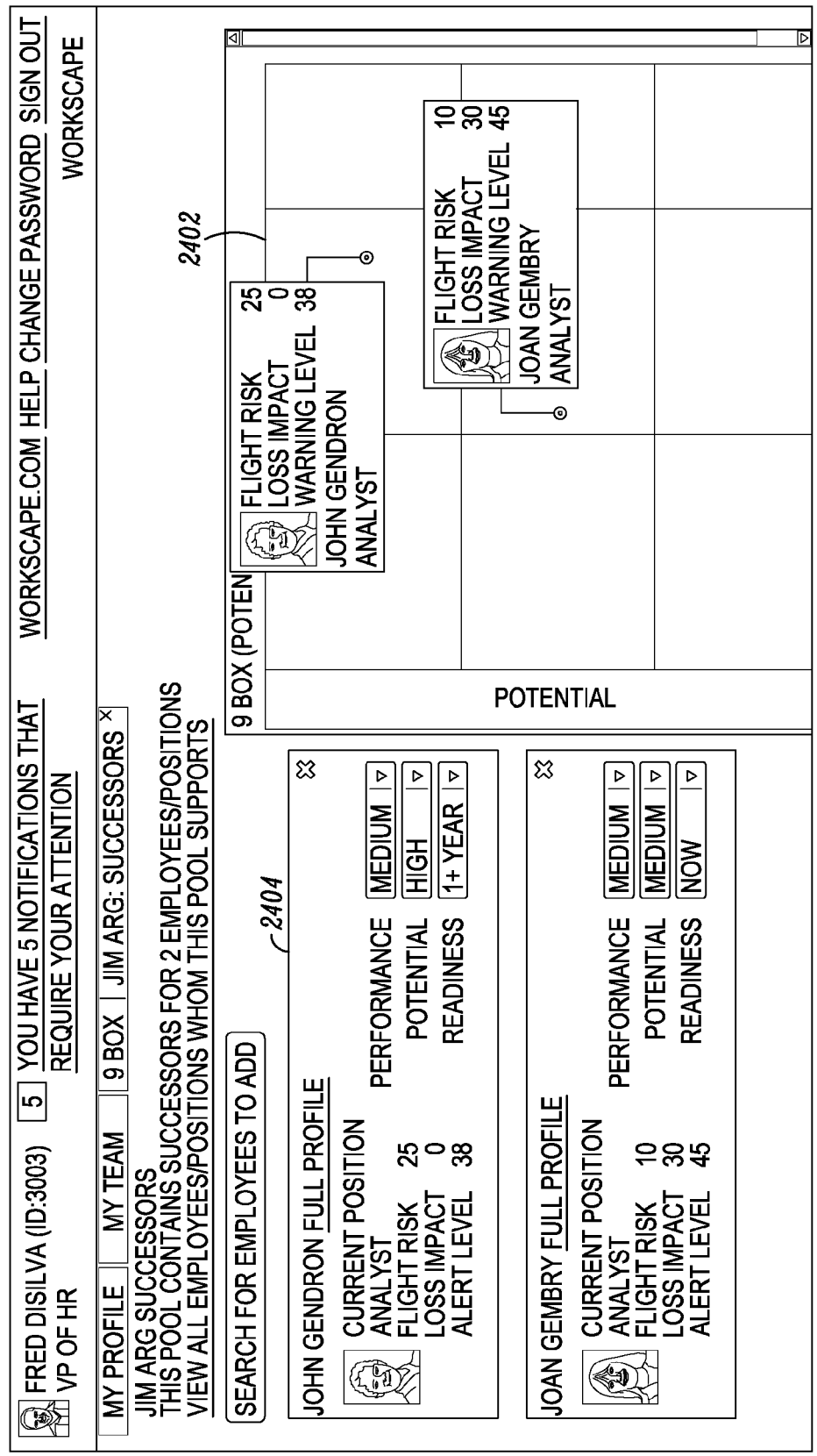
FIG. 24 depicts an enlarged view of a Nine Box from a succession/career path tab.

FIG. 24 depicts an enlarged view of a Nine Box selection from a succession/career path tab for an employee. In this example, the Nine Box 2402 includes data for two employees; however, an option for viewing all employees/positions that the successor pool supports may be accessed. A snapshot 2404 showing the successor's name, title, flight risk, loss impact, alert level, performance, potential, readiness, and the like may be shown, along with an option to view the successor's full profile. The successors may be plotted along the performance-potential graph.

Figure 25:
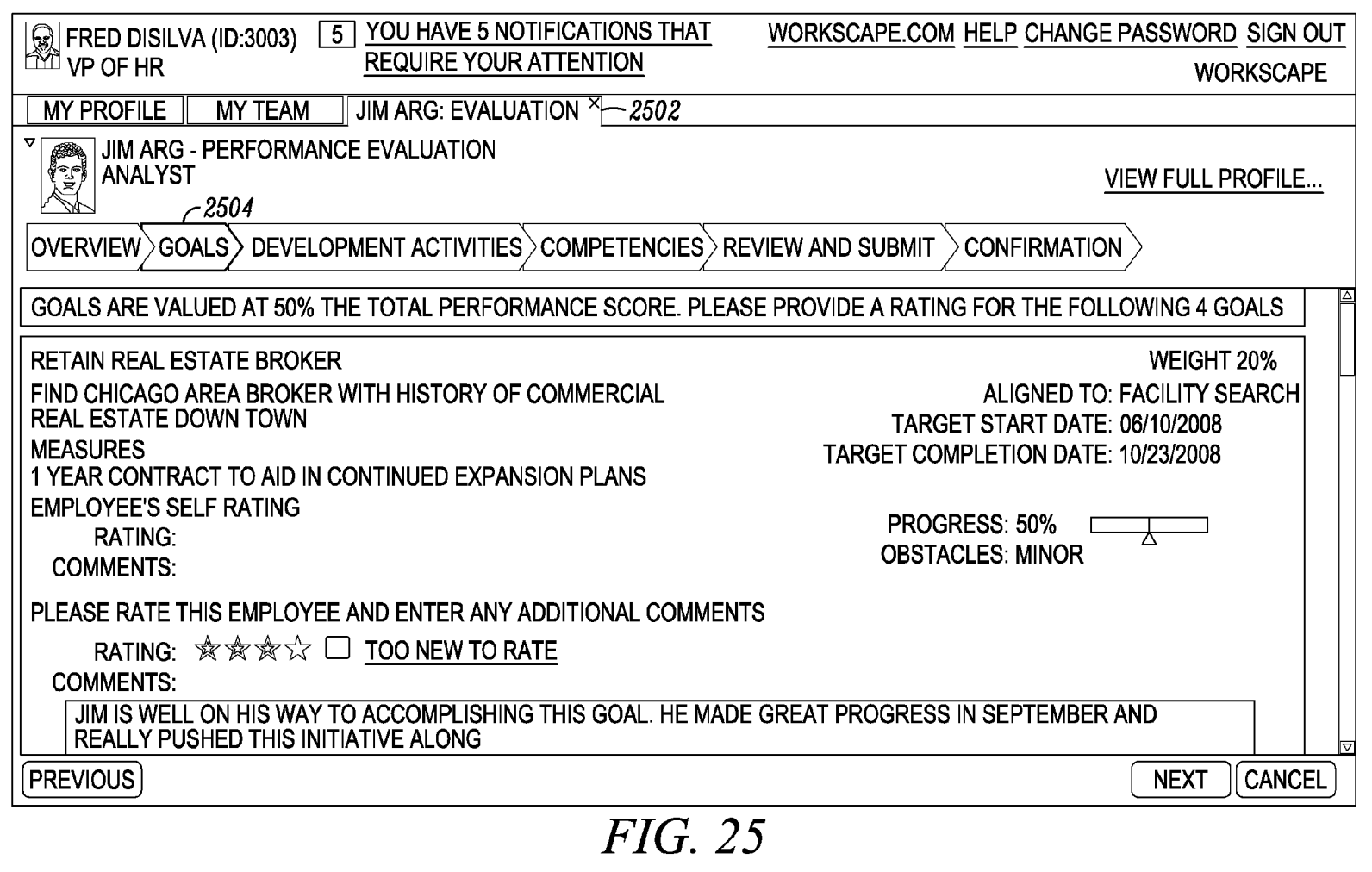

FIG. 25 depicts a goals tab 2504 of a performance evaluation 2502. In performing a performance evaluation, the goals the employee was attempting to meet during the time period of the evaluation may need to be reviewed. Any information related to the goal may be displayed, such as weighting, alignment, start date, completion date, measures, and the like. An employee self-rating, progress towards the goal, obstacles, and the like may be displayed. There may be an opportunity for a manager or other party to rate the employee with respect to the goals, provide commentary, indicate that the goal or the employee is too new to rate, and the like.

Figure 26:
FIG. 26 depicts a Development Activities tab of a performance evaluation.

FIG. 26 depicts a development activities tab 2602 of a performance evaluation. In performing a performance evaluation, the development activities the employee was attempting to perform during the time period of the evaluation may need to be reviewed. Any information related to the development activities may be displayed, such as weighting, alignment, start date, completion date, and the like. An employee self-rating, progress towards the development activity, obstacles, and the like may be displayed. There may be an opportunity for a manager or other party to rate the employee with respect to the development activities, provide commentary, indicate that the development activity or the employee is too new to rate, and the like.

Figure 27:
FIG. 27 depicts a Competencies tab of a performance evaluation.

FIG. 27 depicts a competencies tab 2702 of a performance evaluation. Competencies may be valued at a percentage of the total performance score. For example, one competency may be accountability. Competencies may have themes. For example, a theme of accountability may be goal achievement. There may be levels of accountability. Employees may self-rate their competency at the level of the competency, theme, level, or the like. Competencies may be evaluated by studies, tests, measures and the like. Competencies may be provided by an internal competency library, an external competency library such as one available through professional certification programs and organizations, government agencies, industry watch dog groups, trade associations, and the like.

Figure 28:
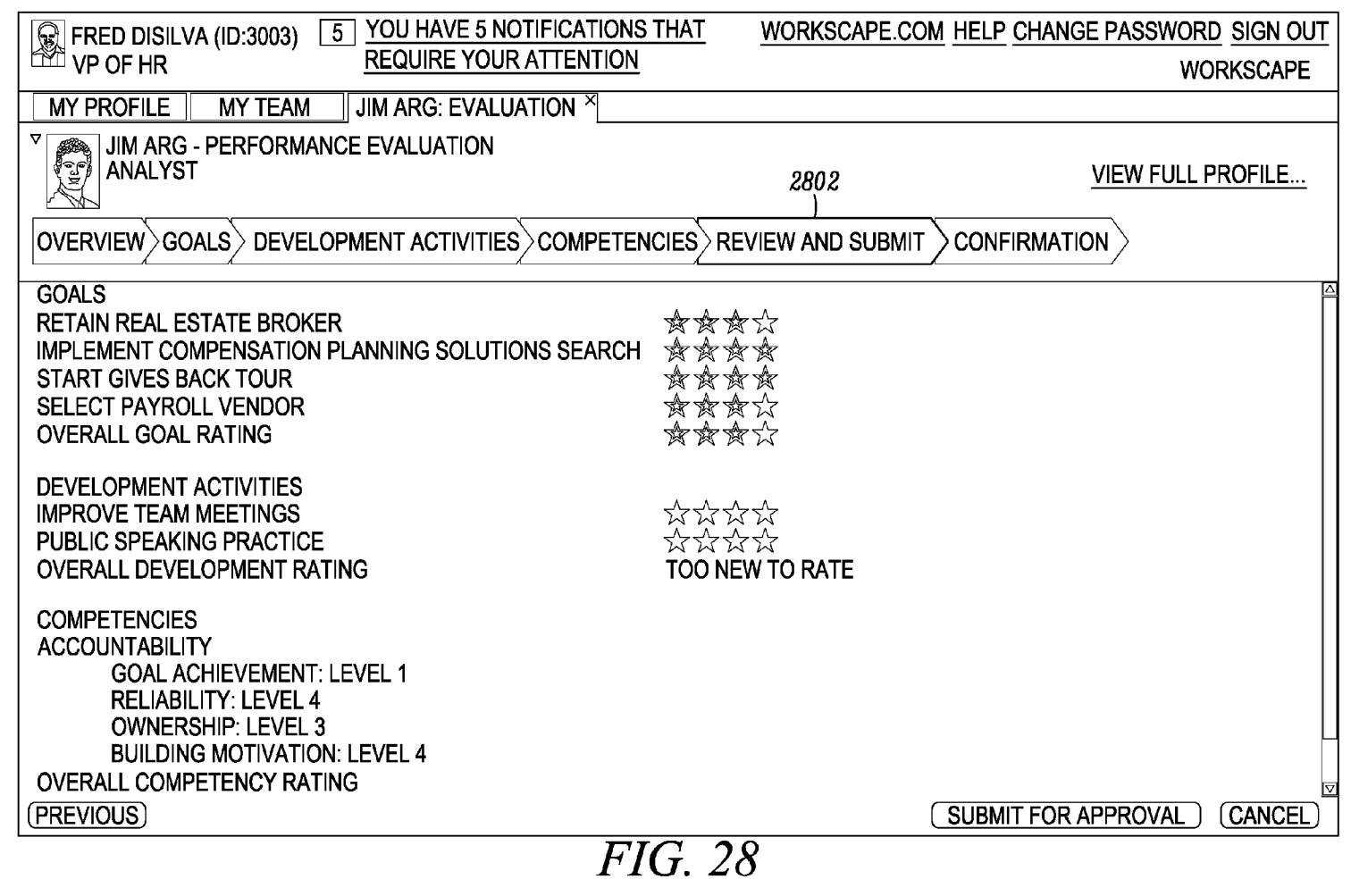

FIG. 28 depicts a review tab 2802 of a performance evaluation. The evaluator may see a summary of the evaluation just performed, such as goal ratings and comments, development activity ratings and comments, competency ratings and comments, and the like. The evaluator may have the option to submit the evaluation.

Figure 29:
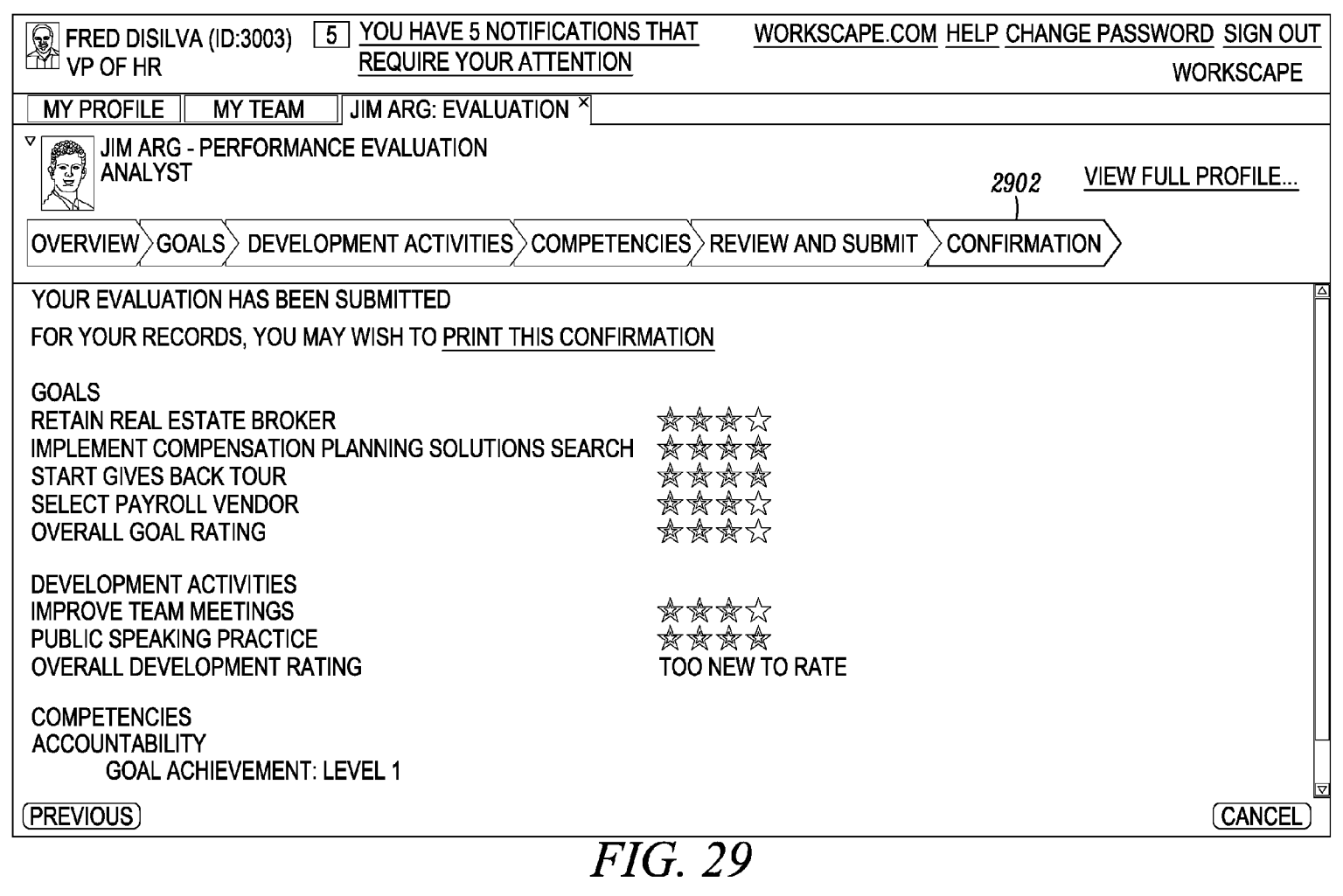

FIG. 29 depicts a confirmation tab 2902 of a performance evaluation for confirming the successfully submitted evaluation and providing the opportunity of printing the evaluation.

It should be understood that any action or function described herein may be performed by an employee in a self-service operation, by a manager, by a third party, and the like, unless otherwise indicated.

The compensation planning and management application user interface may facilitate integrating aspects of a performance application with the compensation application. Aspects of a performance application that may be integrated with a compensation application may include without limitation performance rating, such as individual performance rating, project group or department performance rating, business unit or entity performance rating, and the like. An employee may be given a performance rating and the performance rating may be input to a compensation plan and combined with guidelines of the compensation plan to provide a recommended compensation. In an example, an employee may be given a performance rating of 'exceeds expectation' and a compensation guideline for an employee who exceeds expectation may present a recommended merit increase of 7%, whereas the guideline for an employee who meets expectation may present a recommended merit increase of 4.5%. The compensation application user interface single screen may display the employee rating, information representing other aspects of the employee that relate to the compensation guideline, the recommendation, and the like. The recommendation may include, without limitation, a base salary, a merit increase, a merit increase guideline, a bonus, a one-time adjustment, and the like.

Aspects of a performance application may automatically be communicated from the performance application to a compensation application to facilitate the compensation planning, management, and modeling herein described. The communication may occur through data sharing, data replication, data indexing, and the like. Data representing aspects of the performance application may be presented to the user through the user interface in the single screen, in one or more support screens, or in a combination thereof.

The compensation planning user interface may facilitate modeling of employee compensation. By allowing a user to change one or more data elements related to the compensation plan, a model compensation plan may be presented to the user. In an example, the user may input an anticipated performance rating for an employee to see the impact on the employee's compensation and a compensation play for a department, division, business unit and the like. By changing the anticipated performance rating, aspects of the compensation plan may change.

The performance driven compensation planning and management user interface may provide a unified screen or set or screens to facilitate performance and compensation planning in an integrated way. A unified performance and compensation planning and management screen may facilitate a user, such as a manager in planning and/or managing a coordinated compensation and performance plan. Planning and management in organizations that base some portion of compensation on performance results (pay-for-performance) may benefit from an integrated user interface.

The compensation application user interface may facilitate planning and/or managing a single employee or a plurality of employees. The plurality of employees may be related through one or more of the following, without limitation—employee attributes, such as title, aspects of compensation, department, location, business unit or division, responsibilities, years of service, manager, performance rating, and the like. Compensation aspects that may relate the plurality of employees represented in the single compensation planning screen may include base salary, employment status, bonus plan, payment period, and the like. An employee employment status may include, without limitation, one or more of full-time, part time, hourly, exempt, permanent, temporary, direct, contract, and other characterizations of status such as active, inactive, retired, and the like.

The user interface, or one or more portions of the user interface, may be based on computer programming technology including without limitation DHTML, AJAX, JAVA, JAVASCRIPT, ADOBE FLASH, a combination thereof, or a combination of one or more thereof and other computer programming languages, constructs, technology, images, graphics, menus, and the like.

The platform may include feedback logs. Feedback logs may facilitate the collection and use of timely feedback on employee performance in a performance appraisal process. Feedback logs may also facilitate providing active feedback to employees throughout the entire review cycle, such as a year, thereby supporting more timely feedback rather than leaving a performance discussion as a once-per-year event. The feedback log may be configured similarly to a diary or blog of performance and may support entering notes on feedback, editing feedback, and the like. In another way similar to a blog, feedback logs may allow the review of historical entries so comments left over time may be examined. By focusing on making sure there is an opportunity for ongoing discussion or logs of employee performance, such as events for a manager to incorporate into a formal performance appraisal, the employee and the manager may work off of common information related to performance, resulting in a potentially less contentious or stressful appraisal. Timely feedback recorded in a feedback log may allow an employee to make timely adjustments toward improved performance.

The feedback logs support an entity's organization of employees. Organizational aspects such as hierarchy, departments, business units, and the like may be recognized by the feedback logs. The recognition and application of organization aspects may add integrity to the feedback recorded in the logs. Feedback logs may facilitate searching for employees to leave feedback by, for example, allowing limited access to a list or directory of employees. Feedback logs may be configured with security and use terms that ensure an employee has the opportunity to review and agree with security and use terms prior to enabling feedback on their performance through the feedback logs.

Feedback logs may include features that facilitate using and managing the logs. Feedback logs could include prompts associated with performance and/or compensation feedback. Prompts may include, without limitation, event bibliographic information such as time, date, project info, client/customer, and the like. Prompts may also include access to prior feedback left by the person leaving the feedback, such as for context. Prompts may include offering selectable performance appraisal rating alternatives, such as below, meets, and exceeds expectations. Prompts may also include, without limitation, feedback entry forms.

An individual user who has agreed to the use terms to allow others to leave feedback may configure access control associated with his/her feedback log. The access control may include, without limitation, permitting a subset of employees to have read access to a user's feedback log. Read access control may also be configured on an entry by entry basis so that a user may specify for any entry which employees may view it. In an example, an employee with a positive feedback log entry may want to allow other employees to see the feedback. The access control may also include permitting a subset of employees to have write access to leave feedback in the log. For either read or write access, specifying which employees have the access may be done through the organizational aspects supported by feedback logs. In an example, an employee may permit all employees in his department to have read and write access, while employees in another business unit may only have write access.

To make the feedback log a widely useful method of collecting feedback on employees, the employee leaving the feedback may indicate the feedback is confidential and can only be viewed by a human resources representative and/or the manager of the employee receiving the feedback. In this way, an identified employee may leave feedback without concern for the employee receiving the feedback to know the exact source.

A user interface for the feedback log or one that incorporates feedback log functionality may include templates such as a review template that may include key questions, section headings, samples, and the like to facilitate an employee leaving effective and potentially constructive feedback. A template may provide a structure for an employee to use the feedback logs as a diary to provide further context to the comments and feedback left by others. A feedback log user interface may also support structured searching of the log so that themes, projects, and other common subjects can be identified and possibly grouped. The feedback log may also include capabilities to provide feedback to the person leaving the feedback, such as an indication that the feedback has been read and/or used in a performance appraisal.

Feedback logs may be integrated with a performance planning and management application. A user interface for a performance planning and/or compensation planning system may provide access to feedback logs so that while using the performance planning user interface, such as to rate an employee, the user may access the logs. In this way, the performance rating may be based on actual timely recorded feedback rather than on a manager's memory or her current impression of the employee which may be based on only the employee's most recent achievement or performance miscue.

A user may access the feedback logs from within the performance application user interface to indicate a status regarding the use of the feedback.

The platform may include succession planning and management capabilities. Succession planning and management may integrate with a performance based compensation platform to facilitate using compensation and performance decisions within succession planning and management. As employee performance is evaluated and compensation adjusted accordingly, succession planning may incorporate aspects of employee evaluation and compensation. Succession planning and management may facilitate coordinating employee wants and needs with employer resource gaps created by attrition, promotion or other employee changes. Performance and compensation decision data and results may indicate areas of employee competency which may be applied to competency requirements for a position for which the company is managing a succession plan. In an example, an employee in a senior manager role may be evaluated on business development performance and the employee may be given an evaluation of expert in business development. A position for which the company is managing a succession plan may include extensive business development responsibility and therefore the evaluated employee may be found to be a good match for the position based on the evaluation.

Succession planning and management may be integrated with compensation and performance in that compensation and performance attributes of employees may be queried, analyzed, or otherwise evaluated against position requirements for which a succession plan is being developed. Potential candidates for such a position may be identified based on performance and a compensation budget plan may be developed based on candidate compensation. Integrating succession planning with compensation may facilitate an employer finding employees who have a minimized gap to the required position profile.

Fundamentally, companies go through rounds of planning, such as running quarterly bonus plans. Every quarter the round of planning may start with currently updated data, which may include the current year actual data and the next quarter or year planned data. Over the course of a year a lot of data that is used by the planning processes is changing. Therefore, the platform supports data independence. Data independence facilitates a client who may want to have different sets of data available to their employees and managers for various tasks ex: two different comp plans—one that is focal-based and one that is off-cycle based. Focal-based is at a focal-point in time and involves looking a changes across a static population (e.g. the population in the organization at the time the plan is prepared). Off-cycle is dominated by making changes based on current manager input. Data independence facilitates effectively stopping updating of data for a group of employees for a period of time. In an example, data independence may involve making a copy of data that a manager needs to run an application (e.g. comp planning) and freezing out any subsequent changes to that copy of the data. This may be useful because compensation and performance data may be updated regularly from customer data sources. By freezing the data for the specific purpose, other uses (e.g. off-cycle) or other focal-point activities can make and see data changes made to unfrozen data (e.g. after the data is frozen). At some point a user may want to open up the frozen data and update or not update the data. Generally, all changes made since the data was frozen are made when frozen data is updated. The owner of the frozen data may not be allowed to choose which changes to allow. In an example: when a user is specifying how to configure a compensation plan, the user may identify if the plan will use the current data stream that may be updated regularly or freeze data for processing.

In another example of data independence, performance analysis, compensation data may need to be fixed ahead of performance data to support assessing performance of the current state of the work using compensation data from an earlier planning round. Therefore, the platform supports running various compensation and performance applications in a way so that it can freeze data for an execution of the application as needed and unfreeze it for another execution of the application as needed. Generally, the current period includes data that is most up to date based on data receive from customer data sources.

In an alternative embodiment of data independence, a smart sync function may be used to draw data into an application-specific data set to form a frozen dataset for an instance of the application.

Alternatively, data independence can be similar to effective dating on a coarse level that forms a separate frozen data set for an app-instance. However, effective dating may have a performance overhead that may make it unwieldy for a large datasets.

The human resource management platform 100 may provide facilities for integrating information from a variety of sources including enterprise business systems, such as planning, budgeting, accounting, organization management, and the like. Information may be provided to the human resource management platform 100 to update the relevant data in the human resource management platform 100. In an embodiment of the invention, information from external business and other systems may be integrated on a regular basis, such as each day. Facilities for integrating this information may provide smart synchronization capabilities that may allow a user/enterprise to detect changes in information received for integration and to decide how the data in the platform reacts to the detected changes in the information. Data independence may be taken into consideration during integration so that each independent set of data (e.g. a frozen set and a current stream) can be updated uniquely. In addition, facilities for integrating changes in information received may include an audit trail facility for tracking all changes resulting from integration of the information.

In an example, compensation data integration using the smart synchronization facilities described herein may be part of regularly run process in which the platform 100 receives a stream of updated data. To facilitate proper and effective integration of externally provided data, a complete set of data (e.g. updated since the last time the external data was integrated) is received rather than change data which by itself may not include sufficient detail. The smart synchronization facilities perform a reconciliation process to determine the changes in the received data. The reconciliation process may include comparing received data to data existing in the platform.

In another example of compensation planning that may include focal planning as described herein and elsewhere, compensation plans may be impacted by a personnel change, such as an employee transferring from a first manager to a second manager. The business system information received may reflect the change in employee reporting by representing the employee now reporting to the second manager. The reconciliation process ensures that the data reflecting this change results in certain actions being taken within the platform to ensure that all elements that depend from the employee-manager relationship are properly updated. Actions may require that budgets be readjusted to reflect the employee change. This may require money from the first manager budget to be transferred to the budget of the second manager. Pending authorizations (e.g. for a merit increase for the employee) may need to be changed based on the employee reporting change from first manager to the second manager. Bonus or award data associated with the employee may need to be changed based on the new manager rules for bonus or awards. Similarly, a bonus plan for the second manager's department may be impacted so that the allocation of a bonus pool is not adjusted based on the increase in employee head count. All of these dependencies and others may be impacted because when an employee or group moves in a business hierarchy, the compensation-related rules of the first and second manager's departments (e.g. budget, guidelines, prorations, etc) may cause a ripple effect to other employees, and the like. In a large organization, such as an international organization with 10,000 or more employees, such a change may result in a massive impact on data in the platform. This impact may be determined, implemented, and tracked by the platform 100 as part of the smart synchronization process.

Even pending compensation or performance rating approval notification/authorization, which may be part of an approval workflow, has to be tracked and modified based on changes detected in the input data so that the impact of these detected changes is properly managed. The smart synchronization facilities of the platform 100 may automatically process these changes.

In an embodiment of the platform 100, all of budgets, guidelines, workflows, and the like may be configured into the platform; therefore by inputting any given change made outside the platform 100 (ex: an employee is hired, transferred, fired, quits, etc) it is possible to determine what the downstream impact to other parts of the platform 100 will be. Because the smart synchronization facilities of the platform 100 handles the impact of this change on other aspects of the platform 100, managers and administrators can focus on the business of the specific change (e.g. dealing with an employee resignation) rather than working through the massive impact to the data in the platform.

An example of how smart synchronization may facilitate a performance driven compensation application of the platform 100 follows. A first manager has decided to give an employee a 3% merit and this decision has already been entered in to the platform 100. Due to business conditions, merit increases are cancelled and this new information is input into the platform 100 through a regular information update process. Through the smart synchronization facilities, the platform will receive the information reflecting the change to the merit increase rules; through a reconciliation process determine that the change has been made; and re-assert the decision actions using the changed merit increase rules to ensure the proper distribution of the impact of the change throughout the system (e g taking the same actions within the platform for the earlier decision to give the employee a 3% merit increase may result in the employee receiving no merit increase, or may result in the decision being flagged as out of the plan.) The smart synchronization facility may ensure the impact of changes detected in input data are properly distributed throughout the platform data by computing again every derived data element in the platform.

Another example of how the smart synchronization facilities of the platform 100 facilitate ensure input data changes impact is properly distributed throughout the platform relates to award or bonus processing. Generally, bonuses are conditional based on performance, business, budget, and other factors. Therefore, recomputing bonus-related decision actions may be performed after other decision actions and derived data is calculated. To further describe the complexity associated with award processing, during a compensation focal planning process, potential bonuses or awards may be included to reflect a total potential compensation for each employee. This may be reflected in the platform through calculating an award/bonus entry for each eligible employee. The calculation may include compensation ratio derived from a salary range, job title, a bonus matrix, a set of bonus rules, and other factors such as group goals, group performance, individual performance, years of service, and the like. With the introduction of external business data (e.g. a daily receipt of all business system data of an enterprise) each element that contributes to an award computation must first be recomputed and then applied to the bonus/award calculation.

The performance driven compensation application of the human resource management platform 100 may facilitate off-cycle compensation planning. The application may include a web-based interface within a wizard-like environment providing managers with the tools and guidance necessary to make changes to employee data using the same rules that had been derived from an earlier focal planning process. This may allow the manager to use the same rules, groups, budgets, and the like that were used in a year-end focal planning session when executing an out of cycle change. Such changes are typically non-planned changes and may include performing compound transactions (e.g. change in manager, employee hours, compensation, budget assignment, and the like).

A performance-driven compensation application may include performance management programs and compensation management programs that may use a common platform, such as the human resources management platform 100 so that when a performance assessment process generates a rating for an employee, the rating can be applied to a compensation assessment of the employee automatically. Although the compensation and performance programs may share a common platform, the programs may run in isolated data sets that may be within the same database or within separate databases. Performance rating changes may be input to the compensation process through a regular update of business system information as described herein or through a real-time update process that utilizes the smart synchronization facilities in a real-time or near real-time mode. By utilizing the smart synchronization facilities, impacts of performance ratings may be properly cascaded throughout an organization according to the rules of the object model present in the embodiment of the platform. This may be valuable because one performance plan can impact multiple compensation plans. In an example, a performance rating for each employee in a focal planning cycle may be initialized to be the same as a previous performance rating for the employee. If an updated performance rating for the employee results in the employee receiving a much higher or lower merit increase than that which the previous performance rating would indicate, other employees in the group may be impacted in that more (or fewer) merit increase budget dollars may be available to be allocated to the other employees. The smart synchronization facilities of the platform 100 ensure this potential impact on merit increase budget dollars allocation is properly adjusted based on the performance rating update.

The platform 100 may facilitate accurate update of all items related to a change. This may result in a single decision causing a compound transaction to be performed. A compound transaction is a set of dependent actions that are performed as a result of a change made to an item of data. When a manager decides to create a change, it is not usually in isolation. For example, a job change may also mean a manager change or a location change. Previously the manager was forced to break these up into separate transactions with separate workflows. This is extremely time consuming and loses some of the context for the transaction. Compound transactions eliminate the potential for context loss and manual entry error. An example of a compound transaction may be based on a single decision that involves a promotion, a job change, a grade change, and a salary change. This is still considered one transaction (a compound transaction), even though there are several events occurring on the employee's record.

A compound transaction may be simple—a manager wants to change the status of a person from full-time to part-time and with that, needs to change the hours that the employee works from 40 to 20. However, a compound transaction may be complex—a manager wants to promote an employee, move her from one location to another, change her manager, and provide her with a new target incentive opportunity.

Business logic associated with the platform 100 and/or with a business application, such as a performance-driven compensation application may determine which actions are dependent on decisions or changes that are made in the domain model. Changes such as status change, organizational change, location change, manager change, stock award, salary decrease, merit increase, and others may be supported by action dependency rules that ensure domain object items that are affected by the decision are properly updated in a compound transaction.

The platform 100 supports very fluid business process configuration so that even if the compensation program and the performance program are running on different systems or different databases, changes in performance may be immediately introduced in to compensation through smart synchronization as described herein.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method comprising:
    storing a compensation domain model in a persistence layer of a human capital platform;
    manipulating domain objects of the domain model with compensation management applications;
    configuring the compensation management applications within a business logic layer of the platform; and
    presenting a user interface for facilitating user interaction with the applications using a presentation layer of the platform.

2. The method of claim 1 wherein the user is a manager.

3. The method of claim 1 wherein the domain model comprises domain objects representing employee compensation information.

4. The method of claim 1 wherein the domain model comprises domain objects representing employee performance information.

5. The method of claim 1 wherein the compensation management applications include a performance driven compensation application.

6. The method of claim 1 wherein the compensation management applications include a performance application.

7. The method of claim 6 wherein the performance application facilitates manager and employee self-service.

8. The method of claim 1 wherein the persistence layer includes a database for storing the compensation domain model.

9. The method of claim 1 wherein the persistence layer includes smart synchronization facilities for updating the domain model.

10. The method of claim 9 wherein updating the domain model includes bulk updating.

11. The method of claim 1 wherein the persistence layer includes group manager functionality for allocating employees to compensation management groups.

12. The method of claim 11 wherein the groups can be configured independently of a employee hierarchy that is accessible in the domain model.

13. A method of selectively updating objects in a domain model, comprising:

receiving a set of changes to domain object data;

using a processor to store a copy of a portion of the domain model, creating a shadow model;

configuring an update filter for the shadow model, the update filter determining frozen portions of the shadow model; and applying changes in data with a processor to the domain model, and to the shadow model based on the update filter.

14. The method of claim 13 further comprising committing the changes to a database that is accessible by the processor.

15. The method of claim 13 wherein the domain model represents at least one of compensation information and performance management information.

16. The method of claim 13 further comprising using the processor to change human resources data contained in the shadow model.

17. A method of updating a human resources domain model, comprising:

determining updates to portions of domain objects;

using a processor to store a copy of a portion of the domain model, creating a shadow model;

configuring an update filter for the shadow model, the update filter determining frozen portions of the shadow model; and using the processor to apply the updates to the domain model, and to the shadow model based on the update filter.

18. The method of claim 17 further comprising committing the changes to a database that is accessible by the processor.

19. The method of claim 17 wherein the domain model represents at least one of compensation information and performance management information.

20. The method of claim 17 further comprising using the processor to change data contained in the shadow model.

* * * * *